(12) United States Patent
Yamada et al.

(10) Patent No.: US 9,991,793 B2
(45) Date of Patent: Jun. 5, 2018

(54) POWER SUPPLY CIRCUIT AND CONTROL METHOD FOR THE SAME

(71) Applicant: Kabushiki Kaisha Toshiba, Minato-ku, Tokyo (JP)

(72) Inventors: Manabu Yamada, Yokohama Kanagawa (JP); Takayuki Miyazaki, Setagaya Tokyo (JP); Yoshiaki Yoshihara, Yokohama Kanagawa (JP); Kazuhisa Horiuchi, Ota Tokyo (JP); Nambinh Tran, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 15/066,358

(22) Filed: Mar. 10, 2016

(65) Prior Publication Data

US 2017/0012529 A1 Jan. 12, 2017

(30) Foreign Application Priority Data

Jul. 10, 2015 (JP) .................. 2015-138943
Jul. 10, 2015 (JP) .................. 2015-139088
Feb. 3, 2016 (JP) .................. 2016-019276

(51) Int. Cl.
*H02M 3/158* (2006.01)
*H02M 1/00* (2006.01)
*H02M 3/156* (2006.01)
*H02M 1/08* (2006.01)

(52) U.S. Cl.
CPC ............ *H02M 3/158* (2013.01); *H02M 1/083* (2013.01); *H02M 3/156* (2013.01); *H02M 2001/009* (2013.01); *H02M 2001/0009* (2013.01); *H02M 2001/0019* (2013.01); *H02M 2001/0032* (2013.01); *Y02B 70/16* (2013.01)

(58) Field of Classification Search
CPC .... H02M 3/156; H02M 3/158; H02M 3/1588; H02M 3/155; H02M 3/1582; H02M 3/157; H02M 3/1563; H02M 2003/1566; H02M 2003/1557; H02M 2001/0012; H02M 2001/0009; H02M 2001/0058; H02M 2001/0032; H02M 1/32; H04B 2215/069

See application file for complete search history.

(56) References Cited

U.S. PATENT DOCUMENTS 5,617,015 A 4/1997 Goder et al.
2012/0274134 A1* 11/2012 Gasparini ........... H02M 3/1584
307/31

FOREIGN PATENT DOCUMENTS

JP 2014-093863 A 5/2014

* cited by examiner

*Primary Examiner* — Timothy J Dole
*Assistant Examiner* — Bryan R Perez
(74) *Attorney, Agent, or Firm* — White & Case LLP

(57) ABSTRACT

According to one embodiment, a power supply circuit is adapted to turn on a switching transistor connected between an input terminal and an output node and supply current via an inductor to a capacitor connected to the output node, so as to obtain an output voltage from an output terminal connected to the capacitor. A detection signal according to current flowing in the inductor or a detection signal according to a comparison result between the output voltage and a reference voltage are detected at a predetermined time, and an ON-time of the transistor is controlled in accordance with the detection signal.

16 Claims, 67 Drawing Sheets

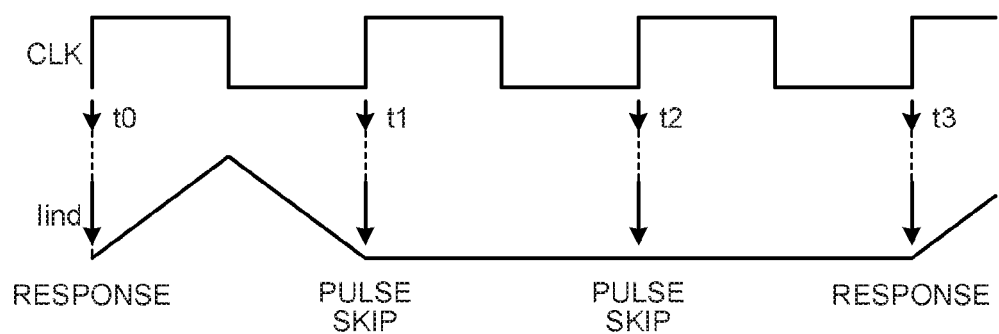
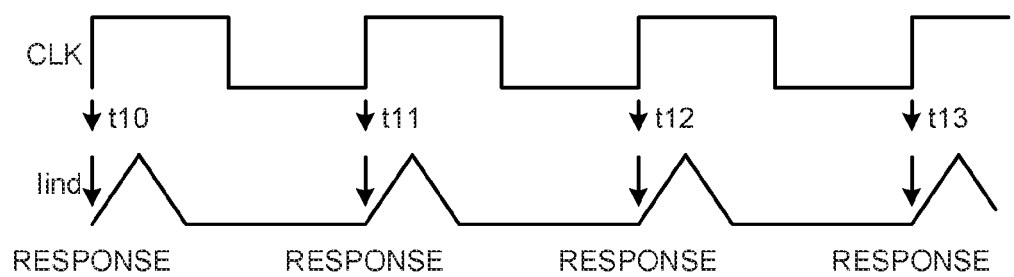

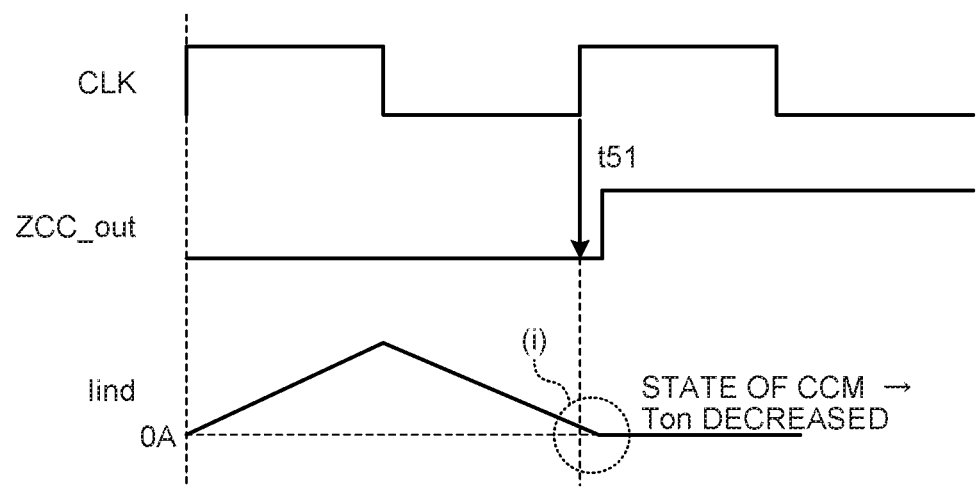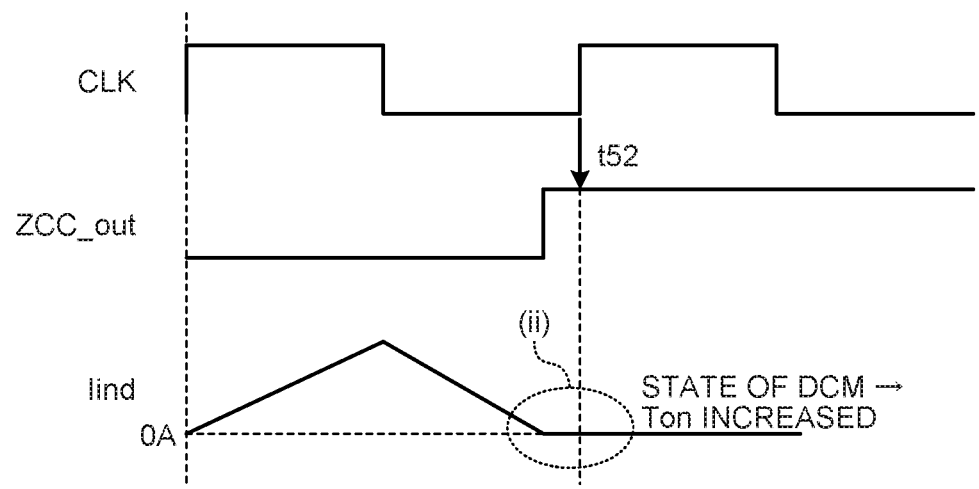

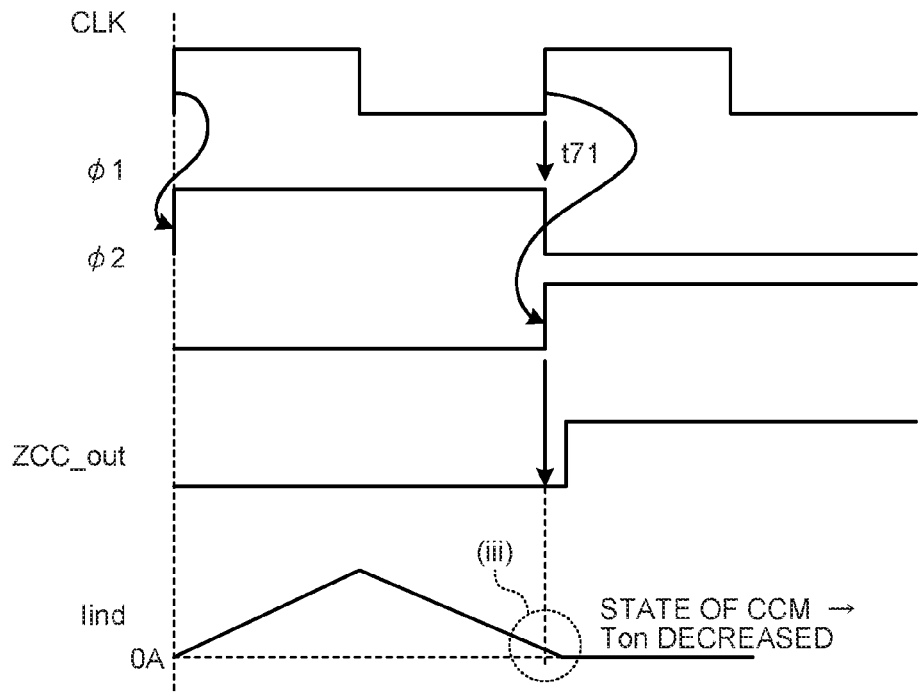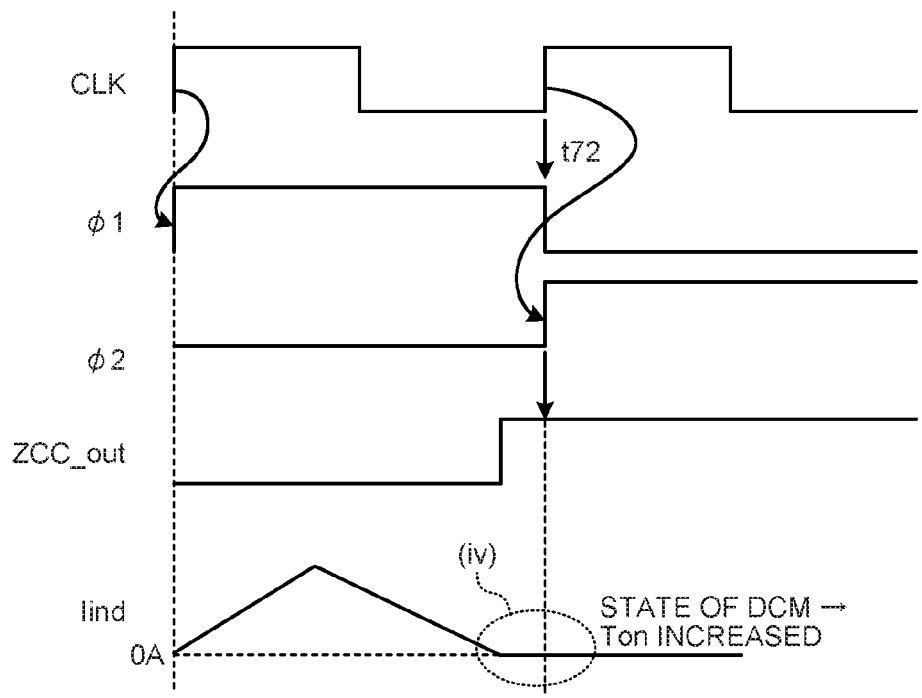

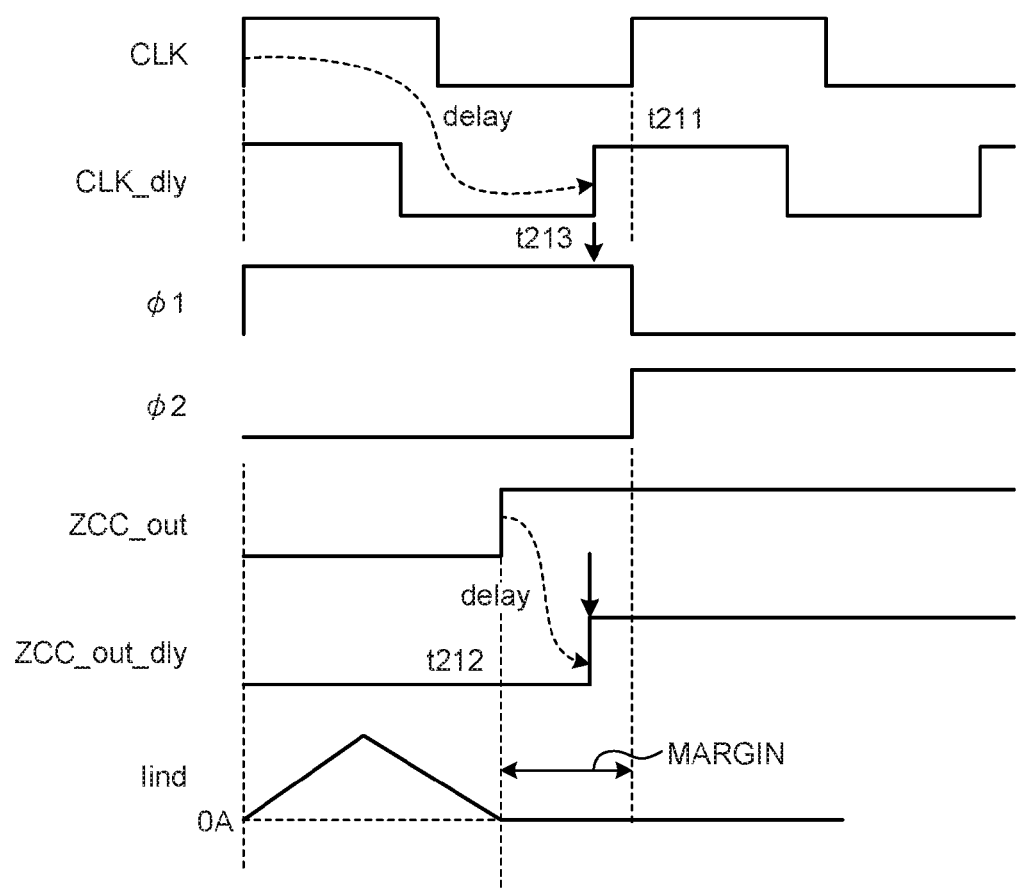

POWER SUPPLY CIRCUIT AND CONTROL METHOD FOR THE SAME

CROSS-REFERENCE TO RELATED APPLICATIONS

This application is based upon and claims the benefit of priority from Japanese Patent Application No. 2015-139088, filed on Jul. 10, 2015 and Japanese Patent Application No. 2016-19276, filed on Feb. 3, 2016 which claims the benefit of priority from Japanese Patent Application 2015-138943, filed on Jul. 10, 2015. The entire contents of all of these applications are incorporated herein by reference.

FIELD

Embodiments described herein relate generally to a power supply circuit and a control method for the same.

BACKGROUND

It is desired that a power supply circuit is configured to supply an output voltage corresponding to a load characteristic. Conventionally, a single inductor multiple output (SIMO) power supply circuit technology that enables acquisition of a plurality of outputs via a single inductor has been disclosed. In a SIMO power supply circuit, a plurality of loads are supplied with independent output voltages. The power supply circuit excellent in controllability corresponding to the states of the loads to which output voltages are supplied and a control method for the power supply circuit are desired.

BRIEF DESCRIPTION OF THE DRAWINGS

FIGS. 2A and 2B are diagrams illustrating a basic operation of the power supply circuit;

FIGS. 7A and 7B are diagrams illustrating a control method for the power supply circuit according to a fourth embodiment;

FIGS. 9A and 9B are diagrams illustrating a control method for the power supply circuit according to a sixth embodiment;

FIG. 23 is a diagram illustrating a control method for the power supply circuit according to a twentieth embodiment;

DETAILED DESCRIPTION

In general, according to one embodiment, a power supply circuit is adapted to turn on a switching transistor connected between an input terminal to which an input voltage is applied and an output node and supply current via an inductor to a capacitor connected to the output node, so as to obtain an output voltage from an output terminal connected to the capacitor. The power supply circuit includes at least one of a detection circuit that outputs an output signal according to a state of current flowing in the inductor and a comparison circuit that outputs an output signal according to whether a voltage at the output terminal is larger or not smaller than a predetermined reference voltage. The power supply circuit further includes a control circuit that controls an ON-time during which the switching transistor is turned on, according to the output signal from the detection circuit or the comparison circuit at a predetermined time.

Power supply circuits according to embodiments and control methods thereof will be explained below in detail with reference to the accompanying drawings. The present invention is not limited to the following embodiments.

First Embodiment

Figure 1:
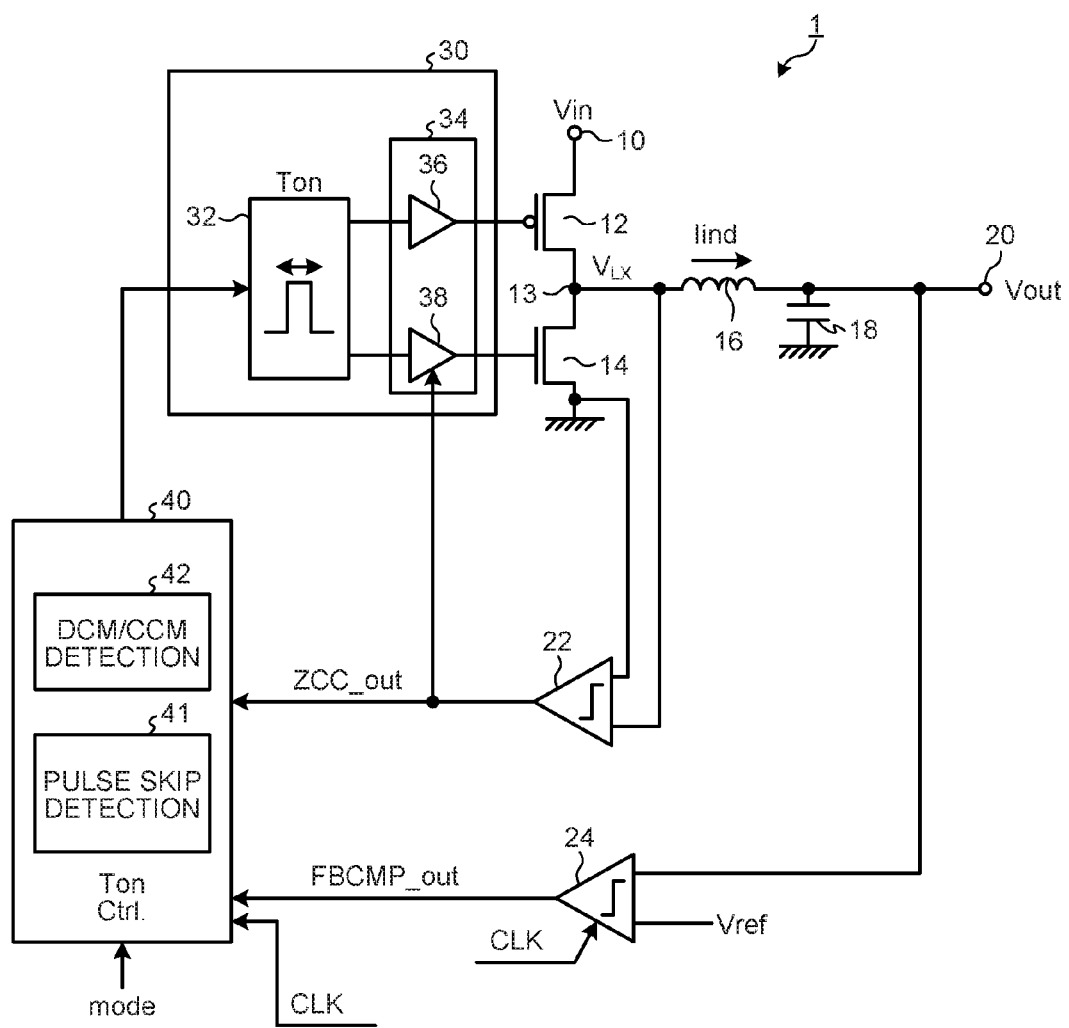
FIG. 1 is a diagram illustrating a configuration of a power supply circuit according to a first embodiment.

FIG. 1 is a diagram illustrating a configuration of a power supply circuit 1 according to a first embodiment. The power supply circuit 1 according to the present embodiment includes an input terminal 10 to which an input voltage Vin is applied. A high-side PMOS switching transistor 12 has its source connected to the input terminal 10 and its drain connected to an output node 13. A low-side NMOS switching transistor 14 has its drain connected to the output node 13 and its source supplied with a ground potential.

One end of an inductor 16 is connected to the output node 13. The other end of the inductor 16 is connected to an output terminal 20. The output terminal 20 supplies a load (not illustrated) with an output voltage Vout. One end of a capacitor 18 is connected to the output terminal 20, and the other end is supplied with a ground potential.

A voltage of the output terminal 20 is supplied to a feedback comparator 24 and compared with a reference voltage Vref. A clock signal CLK is supplied to the feedback comparator 24. The feedback comparator 24 synchronizes with the clock signal CLK and discretely compares the output voltage Vout with the reference voltage Vref to output an output signal FBCMP_out and supply it to an ON-time control circuit 40. For example, the feedback comparator 24 executes a discrete operation so as to operate only for a period of time when the clock signal CLK is at High level, thereby reducing power consumption in association with the operation of the feedback comparator 24.

The output signal FBCMP_out from the feedback comparator 24 is at High level when the output voltage Vout is lower than the reference voltage Vref, or the output signal FBCMP_out is at Low level when the reference voltage Vref is lower than the output voltage Vout. Thus, when the output voltage Vout is higher than the reference voltage Vref, the output signal FBCMP_out is at Low level, resulting in a state where the output signal FBCMP_out is not output, namely, a so-called pulse skip.

The output node 13 is connected to one input terminal of a comparison circuit 22. A ground potential is supplied to the other input terminal of the comparison circuit 22. Depending upon a state of inductor current, the power supply circuit has a state of discontinuous conduction mode (DCM) (referred to as a DCM state hereinafter) where the inductor current does not flow and the other state, namely, a state of continuous conduction mode (CCM) (referred to as a CCM state hereinafter). A voltage $V_{LX}$ of the output node 13 is changed depending on a direction in which the inductor current flows. Thus, the comparison circuit 22 compares the voltage $V_{LX}$ of the output node 13 with the ground potential, and thereby, an output signal ZCC_out dependent on the direction in which inductor current Iind flows through the inductor 16 can be obtained.

The power supply circuit 1 according to the present embodiment includes the ON-time control circuit 40 that adjusts ON-time of the PMOS switching transistor 12. The ON-time control circuit 40 includes a DCM/CCM detection circuit 42 that detects the output signal ZCC_out from the comparison circuit 22. When the output signal ZCC_out is at High level, namely, in the case of the DCM state, a control signal to increase ON-time of the PMOS switching transistor 12 is supplied to a driving circuit 30. In a first control mode, namely, in a mode where the ON-time is controlled depending on the inductor current Iind, ON-time control is performed depending on an output signal from the DCM/CCM detection circuit 42.

The ON-time control circuit 40 includes a pulse skip detection circuit 41 that receives the output signal FBCMP_out from the feedback comparator 24 and then detects presence or absence of the pulse skip. The pulse skip detection circuit 41, upon detecting the pulse skip, supplies the driving circuit 30 with a control signal to decrease the ON-time of the PMOS switching transistor 12. In a second control mode, namely, in a mode where the ON-time is controlled depending on a result of comparison of the output voltage Vout with the reference voltage Vref in synchronization with the clock signal CLK, the ON-time is controlled depending on the output signal from the pulse skip detection circuit 41.

The driving circuit 30 includes a pulse generation circuit 32. The pulse generation circuit 32 generates a pulse signal with a predetermined duration in response to the signal from the ON-time control circuit 40. A pulse width of the pulse signal generated by the pulse generation circuit 32 is controlled by the signal from the ON-time control circuit 40. For example, time of rise or fall of the pulse signal is adjusted, and thereby, duration of the pulse signal at High level can be adjusted. The rise of the pulse signal is synchronized with the clock signal CLK and time of the fall is adjusted by the signal from the ON-time control circuit 40, and thereby, it is possible to adjust the duration of the pulse signal at High level.

For example, the pulse generation circuit 32 can be configured to generate the pulse signal that falls at a predetermined delay time after rise of the pulse signal. A delay circuit (not illustrated) that produces the delay time is composed of a predetermined number of inverters and is configured to adjust the number of inverters, and thereby, the duration of the pulse signal at High level can be adjusted. The number of inverters in the delay circuit (not illustrated) is increased to prolong the delay time, and thereby, the duration of the pulse signal at High level is increased, so that the ON-time of the high-side PMOS switching transistor 12 can be increased. Contrarily, the number of inverters is increased to shorten the delay time, and thereby, the ON-time of the PMOS switching transistor 12 can be decreased. The duration of the pulse signal at High level is adjusted, and thereby, the ON-time of the PMOS switching transistor 12 can be adjusted. A series of control operations of adjusting the duration of the pulse signal at High level generated by the pulse generation circuit 32 to adjust the ON-time of the PMOS switching transistor 12 are referred to as ON-time control hereinafter.

The output from the pulse generation circuit 32 is supplied to the driving circuit 34. The driving circuit 34 includes buffers 36 and 38. A driving signal from the buffer 36 is supplied to a gate of the PMOS switching transistor 12 while a driving signal from the buffer circuit 38 is supplied to a gate of the NMOS switching transistor 14. The driving signals from the buffers 36 and 38 control on/off of the PMOS switching transistor 12 and the NMOS switching transistor 14. For example, in order to avoid a situation that the PMOS switching transistor 12 and the NMOS switching transistor 14 simultaneously turn on to produce through-current between the input terminal 10 and the ground potential, a predetermined dead time is produced in the pulse generation circuit 32.

The output signal ZCC_out from the comparison circuit 22 is supplied to the buffer 38. The buffer 38 is controlled in response to the output signal ZCC_out output from the comparison circuit 22 at the time when the voltage $V_{LX}$ at the output node 13 is lower than the ground potential to turn off the NMOS switching transistor 14, and thereby, the inductor current Iind flowing toward the ground potential or a so-called a state of backflow of the inductor current Iind can be avoided to avoid degradation of conversion efficiency.

In the present embodiment, a mode switching signal "mode" for switching the control mode is supplied to the ON-time control circuit 40. The mode switching signal "mode" switches between a first control mode in which the duration of the pulse signal at High level is adjusted in response to the output signal from the DCM/CCM detection circuit 42 to control the ON-time of the high-side PMOS switching transistor 12 and a second control mode in which the duration of the pulse signal at High level is adjusted in response to the output signal from the pulse skip detection circuit 41 to adjust the ON-time of the PMOS switching transistor 12.

Then, a control method for the power supply circuit of the first embodiment will be described with reference to FIGS. 2A and 2B. FIG. 2A is a diagram illustrating the first control mode. In the first control mode, a pulse signal (not illustrated) output from the pulse generation circuit 32 rises at time t0 when the clock signal CLK rises. The pulse generation circuit 32 generates a pulse signal (not illustrated) that turns on the NMOS switching transistor 14 after a predetermined dead time, and supplies it to the NMOS switching transistor 14 via the buffer 38.

The first control mode includes an operation that supplies the inductor current Iind via the inductor 16 from time t0 of rise of the clock signal CLK to time t1 of rise of the next clock signal CLK, namely, over the whole of one cycle of the clock signal CLK, so as to charge the capacitor 18 connected to the output terminal 20. That is, a control that maximally utilizes one cycle of the clock signal CLK from time t0 to time t1 to charge the capacitor 18 and thereby raise the output voltage Vout is performed. Because the inductor current Iind flows for a period of time from time t0 to time t1, electric charge accumulated in the capacitor 18 connected to the output terminal 20 is increased due to the inductor current Iind, so that the output voltage Vout is raised maximally. Thereby, it is possible to reduce the number of times by which the output voltage Vout is lower than the reference voltage Vref. Hence, it is possible to reduce switching frequencies of the switching transistors 12 and 14 for charging the capacitor 18, and loss of power consumption in association with switching operations of the switching transistors 12 and 14 can be reduced. Hereinafter, the first control mode is also referred to as a maximal Ton control mode.

FIG. 2B is a diagram illustrating the second control mode. In the second control mode, the pulse signal (not illustrated) generated by the pulse generation circuit 32 rises at time t10 of rise of the clock signal CLK, and thereafter, each time the clock signal CLK serially supplied rises at times t11 to t13, the switching operations of the switching transistors 12 and 14 are performed, so that the inductor current Iind is supplied to the capacitor 18. The control mode is to execute the switching operations of the switching transistors 12 and 14 in response to every rise of the clock signal CLK. In such a control mode, switching operations of the switching transistors 12 and 14 are executed for each clock signal CLK to charge the capacitor 18, and hence, it is possible to charge the capacitor 18 under suppression of the maximal value of the inductor current Iind and retain the output voltage Vout at a desired voltage. Hereinafter, this control mode is also referred to as a minimal Ton control mode. The control is to make the switching frequencies of the switching transistors 12 and 14 be coincident with the frequency of the clock signal CLK, and therefore, control of the switching frequencies of the switching transistors 12 and 14 is facilitated.

Second Embodiment

Figure 3:
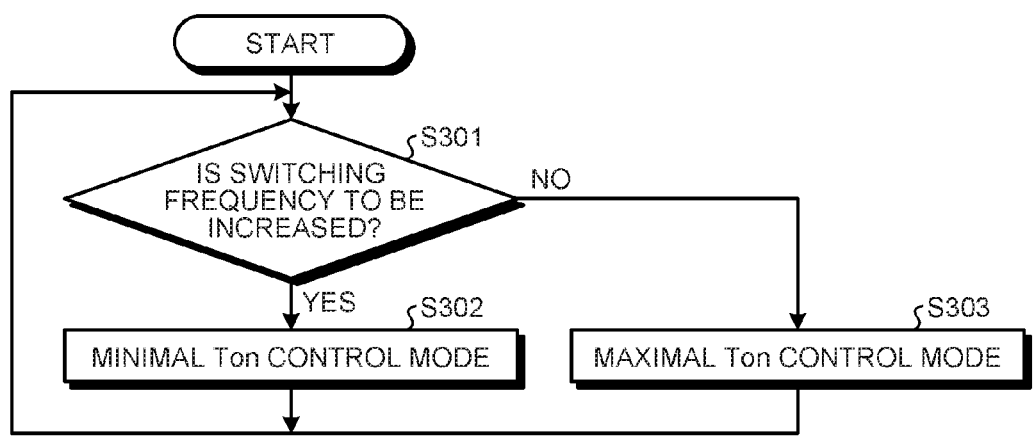
FIG. 3 is a diagram illustrating a control method for the power supply circuit according to a second embodiment.

FIG. 3 is a diagram illustrating a control method of switching between a maximal Ton control mode that is a first control mode and a minimal Ton control mode that is a second control mode. It is determined whether or not the switching frequencies of the switching transistors 12 and 14 have to be increased (S301). When the switching frequency is increased, switching to the minimal Ton control mode is executed (S302). In the minimal Ton control mode, for example, each time the clock signal CLK rises, the switching operations of the switching transistors 12 and 14 are executed to supply the capacitor 18 to with the inductor current Iind, so that the output voltage Vout rises. That is, the control is to make the switching frequencies to be coincident with the frequency of the clock signal CLK, and therefore, it is available for increasing the switching frequencies.

When the switching frequencies do not have to be increased, switching to the maximal Ton control mode is executed (S303). In the maximal Ton control mode, it is possible to supply the inductor current Iind with a high peak value to the capacitor 18 to increase the output voltage Vout, and therefore, the state where the output voltage Vout is greater than the reference voltage Vref can be sustained for a long period of time. Thereby, it is possible to increase a pulse skip that occurs when the output voltage Vout is higher than the reference voltage Vref, and hence, the switching frequencies can be suppressed.

The power supply circuit is configured to have the minimal Ton control mode and maximal Ton control mode, and thereby, control of the switching frequencies dependent on load characteristics or specifications can be facilitated. For example, when the output voltage Vout is supplied to a load (not illustrated) having a function of receiving an RF signal, an intermediate frequency of an output signal that is output from the load after frequency conversion is caused to be different from the switching frequency, and thereby, noise interference between noise generated by the switching operations of the switching transistors 12 and 14 and the output signal from the load can be avoided. Upon adjusting the switching frequencies, control in the minimal Ton control mode is performed when the noise interference is avoided by increasing the switching frequencies, and control in the maximal Ton control mode is performed when the noise interference is avoided by suppressing the switching frequencies.

Figure 4:
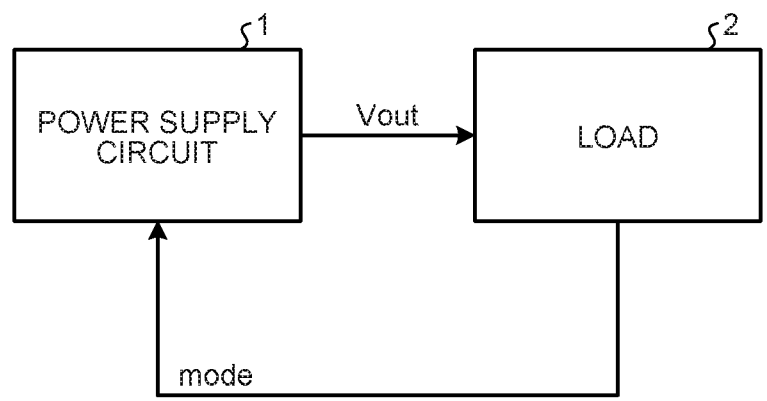
FIG. 4 is a diagram illustrating a configuration example of a connection relation between the power supply circuit and a load.

FIG. 4 is a diagram illustrating a configuration example of a connection relation between the power supply circuit and a load. For example, the power supply circuit 1 illustrated in FIG. 1 is used as a power supply circuit 1. A load 2 is connected to the power supply circuit 1. The output voltage Vout from the power supply circuit 1 is supplied to the load 2. The load 2 supplies the power supply circuit 1 with a mode switching signal _mode to switch the control mode of the power supply circuit 1 depending on a state of an operation of the load 2. The mode switching signal _mode corresponds to the mode switching signal "mode" supplied to the ON-time control circuit 40 in the power supply circuit 1 of embodiment 1 illustrated in FIG. 1. For example, when the load 2 is a high load such that a control to increase the switching frequencies is needed, the mode switching signal "mode" to switch to the minimal Ton control mode is supplied from the load 2 to the power supply circuit 1. For example, a discrimination circuit (not illustrated) provided to the load 2 can be configured to compare an amount of power consumption of the load 2 or, for example, the current flowing through the load 2 with a predetermined threshold to output the mode switching signal _mode depending on a result of the comparison, and to select one of the pulse skip detection circuit 41 and the DCM/CCM detection circuit 42 in the ON-time control circuit 40 depending on the mode switching signal "mode".

Figure 5:
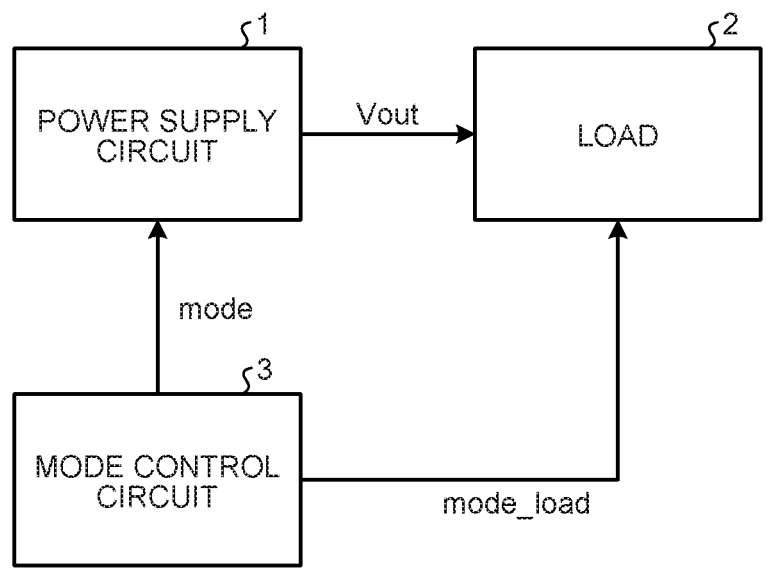
FIG. 5 is a diagram illustrating another configuration example of the connection relation between the power supply circuit and the load.

FIG. 5 is a diagram illustrating another configuration example of the connection relation between the power supply circuit and the load. The present configuration example includes a mode control circuit 3. The mode control circuit 3 outputs a mode switching signal _mode that switches a control mode of the power supply circuit 1 between the minimal Ton control mode and the maximal Ton control mode and supplies it to the power supply circuit 1. Also, the mode control circuit 3 supplies the load 2 with a load control signal "mode_load" that controls a state of an operation of the load 2. For example, the load 2 is supplied with a load control signal "mode_load" that switches the state of an operation of the load 2 to a state of a high load, and simultaneously, the power supply circuit 1 is supplied with a mode switching signal "mode" to switch the power supply circuit 1 to the minimal Ton control mode for increasing the switching frequency of the power supply circuit 1. Thereby, it is possible to preset the control mode of the power supply circuit 1, and therefore, the power supply circuit 1 is controllable depending on the state of an operation of the load 2.

Third Embodiment

Figure 6:
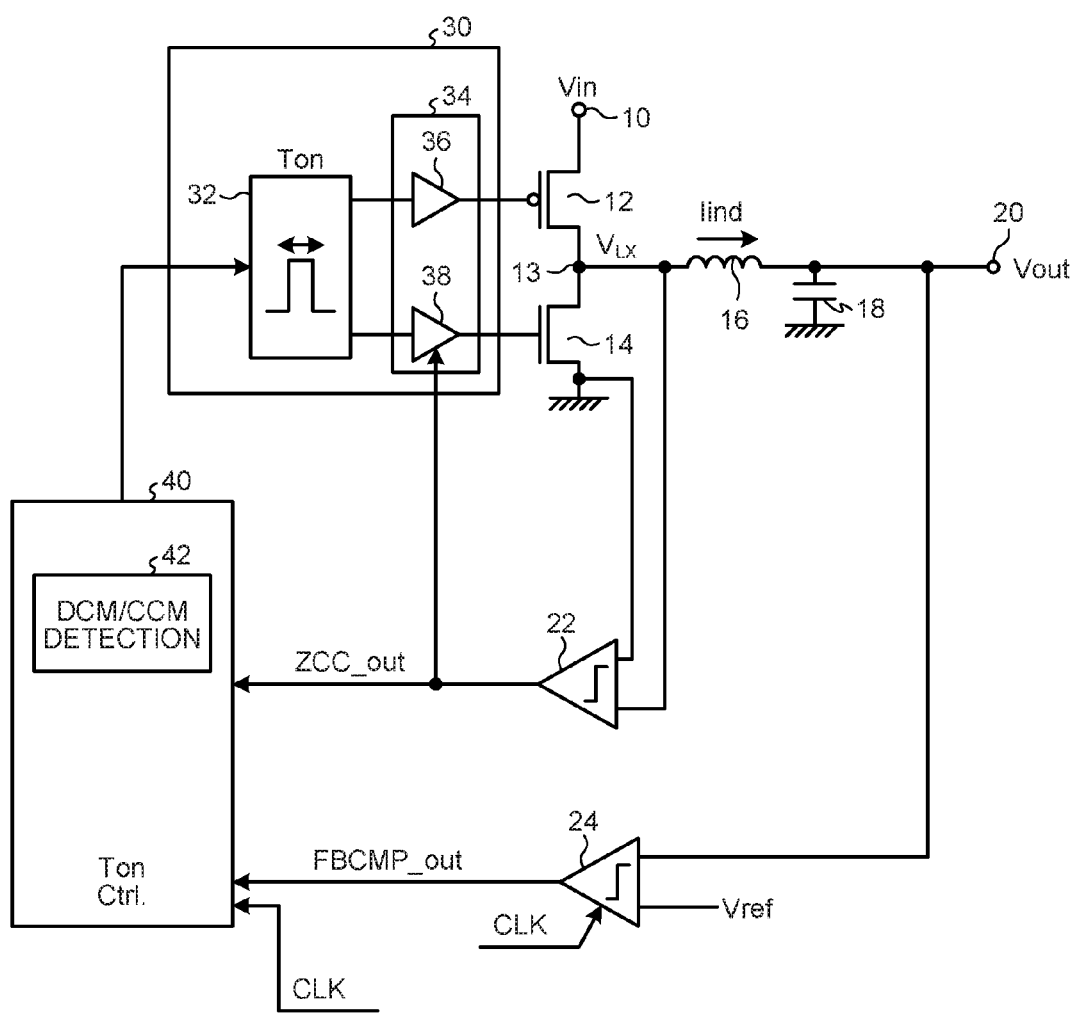
FIG. 6 is a diagram illustrating a configuration of a power supply circuit according to a third embodiment.

FIG. 6 is a diagram illustrating a configuration of a power supply circuit according to a third embodiment. Elements corresponding to those of the aforementioned embodiment are denoted by the same reference symbols. The present embodiment is set forth as an embodiment in the case of a first control mode, namely, the maximal Ton control mode. Because the configuration is provided in such a manner that the first control mode is selected, a mode switching signal "mode" supplied to an ON-time control circuit 40 is omitted. The configuration can also be provided to have only the first control mode. In this case, the mode switching signal "mode" is not needed.

The DCM/CCM detection circuit 42 in the ON-time control circuit 40 is supplied with the output signal ZCC_out from the comparison circuit 22 that compares the ground potential with the voltage $V_{LX}$ at the output node 13 to which the drain of the PMOS switching transistor 12 and the drain of the NMOS switching transistor 14 are connected.

The pulse generation circuit 32 generates a pulse signal in response to a signal supplied from the ON-time control circuit 40. The DCM/CCM detection circuit 42 detects the output signal ZCC_out from the comparison circuit 22 in response to the clock signal CLK. When the operation state is the state of CCM, the pulse generation circuit 32 is supplied with a control signal that shortens the duration of the pulse signal at High level generated from the pulse generation circuit 32 to decrease the ON-time of the PMOS switching transistor 12. When the operation state is the state of DCM, the pulse generation circuit 32 is supplied with a control signal that prolongs the duration of the pulse signal at High level to increase the ON-time.

Fourth Embodiment

FIGS. 7A and 7B illustrate an example of a control method for the power supply circuit of the aforementioned third embodiment. At time t51 of rise of the clock signal CLK, the output signal ZCC_out from the comparison circuit 22 is detected. FIG. 7A illustrates a situation that when the operation state is the state of CCM and the inductor current Iind flows toward the output voltage. In a case of the state of CCM as indicated by a dotted circle (i), namely, in the case where the inductor current Iind flows toward the inductor 16 at time t51, the voltage $V_{LX}$ at the output node 13 is lower than the ground potential. In this case, the output signal ZCC_out from the comparison circuit 22 is at Low level, and therefore, the state of CCM or the state of DCM can be detected by detecting the output signal ZCC_out from the comparison circuit 22. In the state of CCM, a control to shorten the ON-time is performed.

FIG. 7B illustrates a control when an operation state of the power supply circuit operates is the state of DCM. In a case of the state of DCM as indicated by a dotted circle (ii), the output signal ZCC_out from the comparison circuit 22 is at High level at time t52 of rise of the clock signal CLK on the condition that the inductor current Iind does not flow, the state of CCM or the state of DCM can be detected by detecting the output signal ZCC_out from the comparison circuit 22. In a case of the state of DCM, control of increasing the ON-time is performed. Thereby, a control that maximally utilizes one cycle of the clock signal CLK to supply the inductor current Iind to the capacitor 18 and thereby raise the output voltage Vout, namely, a control in the maximal Ton control mode is retained.

In the control method for the power supply circuit according to the present embodiment, the duration of the pulse signal at High level produced by the pulse generation circuit 32 is adjusted depending upon whether the state at time t51 or t52 at the end of one cycle of the clock signal CLK is the state of DCM or the state of CCM, so that the ON-time of the switching transistors is adjusted. Thereby, the control that maximally utilizes one cycle of the clock signal CLK to supply the inductor current Iind to the capacitor 18 and thereby raise the output voltage Vout, namely, the control in the maximal Ton control can be retained.

Fifth Embodiment

Figure 8:
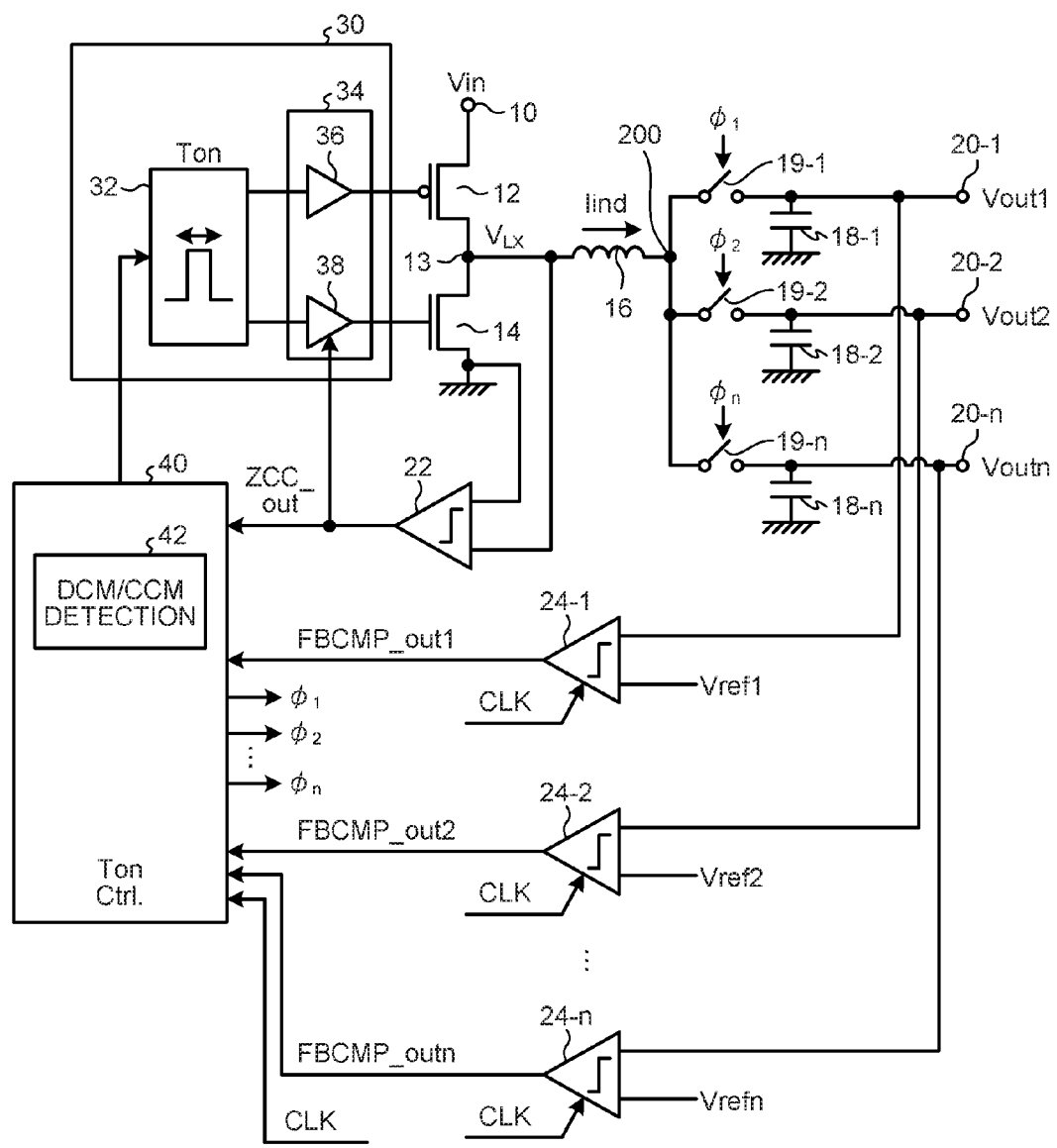
FIG. 8 is a diagram illustrating a configuration of a power supply circuit according to a fifth embodiment.

FIG. 8 illustrates a configuration of a power supply circuit according to a fifth embodiment. Elements corresponding to those of the aforementioned embodiments are denoted by the same reference symbols. In the present embodiment, there are provided a plurality of output terminals 20-1 to 20-n that are time-divisionally connected to a common inductor 16. The output terminals 20-1 to 20-n are connected to one end 200 of the inductor 16 through switches 19-1 to 19-n, respectively. Capacitors 18-1 to 18-n are connected to the output terminals 20-1 to 20-n, respectively. The switches 19-1 to 19-n are supplied, from an ON-time control circuit 40, with slot allocation signals φ1 to φn that control on/off of the switches 19-1 to 19-n so as to allocate period of times for which the output terminals 20-1 to 20-n are connected to the inductor 16.

Feedback comparators 24-1 to 24-n are connected to the output terminals 20-1 to 20-n, respectively. The feedback comparators 24-1 to 24-n compare output voltages Vout1 to Voutn with predetermined reference voltages Vref1 to Vrefn in synchronization with the clock signal CLK and supply output signals FBCMP_out1 to FBCMP_outn to the ON-time control circuit 40, respectively. The predetermined reference voltages Vref1 to Vrefn may be the same voltage or different voltages dependent on loads (not illustrated) connected to the output terminals 20-1 to 20-n, respectively.

The inductor 16 is time-divisionally connected to the output terminals 20-1 to 20-n by the switches 19-1 to 19-n, and thereby, it possible to obtain the independent output voltages Vout1 to Voutn from the output terminals 20-1 to 20-n, respectively.

Sixth Embodiment

With reference to FIGS. 9A and 9B, an embodiment of a control method for the power supply circuit in the aforementioned fifth embodiment will be described. For the sake of convenience of explanation, an example of a case where output voltages Vout1 and Vout2 from output terminals 20-1 and 20-2 are controlled will be described. It is now assumed that a path leading to a load (not illustrated) via the output terminal 20-1 is channel 1, and a path leading to a load (not illustrated) via the output terminal 20-2 is channel 2. The output terminal 20-1 and 20-2 are time-divisionally allocated to an inductor 16, and a period of time during which each of the corresponding capacitors 18-1 and 18-2 is charged is also referred to as slot. Due to slot allocation signals φ1 and φ2, switches 19-1 and 19-2 are serially turned on and thereby the capacitors 18-1 and 18-2 to are charged with inductor current Iind.

In the present embodiment, channels are switched by switching the slot allocation signal φ1 and the slot allocation signal φ2. That is, the signal φ2 rises at time t71 when the clock signal CLK rises and is applied to the switch 19-2, and thereby, a channel connected to the inductor 16 is switched to channel 2 for the output terminal 20-2. In the present embodiment, it is determined whether the operation state at time t71 when a channel is switched is the state of CCM or the state of DCM. The state of CCM or the state of DCM can be determined by detecting voltage $V_{LX}$ at an output node 13, as having already been stated in terms of the aforementioned embodiment.

As illustrated in FIG. 9A, for example, in a case where the state at time t71 is the state of CCM as indicated by a dotted circle (iii), the output signal ZCC_out from the comparison circuit 22 is at Low level. In this case, a control to shorten the duration of the pulse signal at High level and thereby shorten the ON-time of the high-side PMOS switching transistor 12 is performed. This control causes the inductor current Iind to have a smaller peak value and accordingly to reach zero at the earlier timing, and therefore, transfer to the state of DCM can be attained.

When the channel is switched to the state of CCM, energy remaining in the inductor 16 is discharged to the load connected to another channel in the next switching cycle, and the output voltage is unintentionally raised. That is, cross regulation occurs. In order to avoid the cross regulation, the inductor current Iind flowing through the inductor 16 has to be zero by time when the channels are switched by the slot allocation signals φ1 and φ2.

To this end, when the operation state at time t71 is the state of CCM, a control to shorten the duration of the pulse signal at High level generated by the pulse generation circuit 32 at the time when the next slot allocation signal φ1 is supplied, and thereby to shorten the ON-time of the PMOS switching transistor 12 is performed. Thereby, the operation state of the channel 1 at the time when the next slot allocation signal φ1 is applied can be transferred to the state of DCM. The operation state at time t71 that is the state of CCM is stored in a memory circuit (not illustrated) provided in an ON-time control circuit 40 and is used for adjusting the ON-time at time when the slot allocation signal φ1 is next applied to the channel 1.

FIG. 9B illustrates a case where the operation state at time t72 of channel switching is the state of DCM. In a case where the operation state at time t72 is the state of DCM as indicated by a dotted circle (iv), the output signal ZCC_out from the comparison circuit 22 is at High level. In this case, a control to prolong the duration of the pulse signal at High level generated by the pulse generation circuit 32 at the time when the next slot allocation signal φ1 is supplied to the channel 1 and thereby increase the ON-time is performed. The ON-time is increased in such a manner that a period of time of the slot is utilized maximally and effectively, and thereby, it is possible to charge the capacitor 18 with the inductor current Iind and accordingly raise the output voltage Vout.

In the present embodiment, when the operation state at the time of channel switching is the state of CCM, a control to shorten the ON-time at the time of next slot allocation and thereby transfer to the state of DCM is performed. Thereby, it is possible to avoid cross regulation. When the operation state at the time of channel switching is the state of DCM, a control to increase the ON-time at the time when slot is next allocated to the channel is performed. The ON-time is increased in such a manner that a period of time of the slot is utilized maximally and effectively, and thereby, it is possible to charge the capacitor 18 with the inductor current Iind and accordingly raise the output voltage Vout.

Seventh Embodiment

Figure 10:
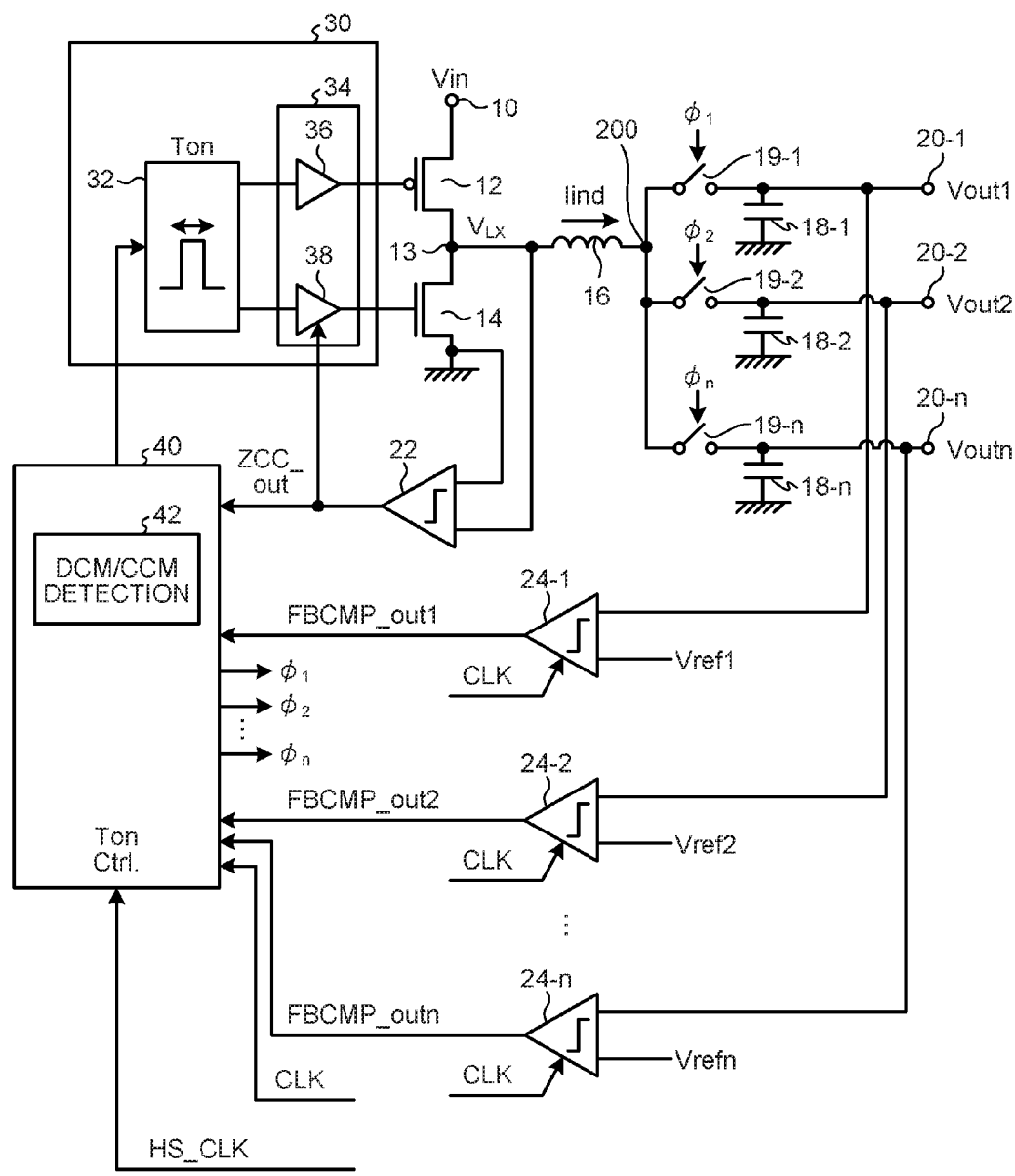
FIG. 10 is a diagram illustrating a configuration of a power supply circuit according to a seventh embodiment.

FIG. 10 is a diagram illustrating a configuration of a power supply circuit according to a seventh embodiment. Elements corresponding to those of the aforementioned embodiments are denoted by the same reference symbols. In the present embodiment, a high-speed clock signal HS_CLK with a high frequency is supplied to an ON-time control circuit 40. For example, the output signal ZCC_out from a comparison circuit 22 at the time of rise of the high-speed clock signal HS_CLK is detected, and thereby, the state of DCM or the state of CCM can be determined with a predetermined margin. In a case of the state of CCM, there is a problem of cross regulation. Hence, the margin is provided for determination of the state of DCM or the state of CCM, and when the state of CCM is determined, a control to decrease the ON-time is performed, and thereby, it is possible to avoid cross regulation more reliably.

Eighth Embodiment

Figure 11:
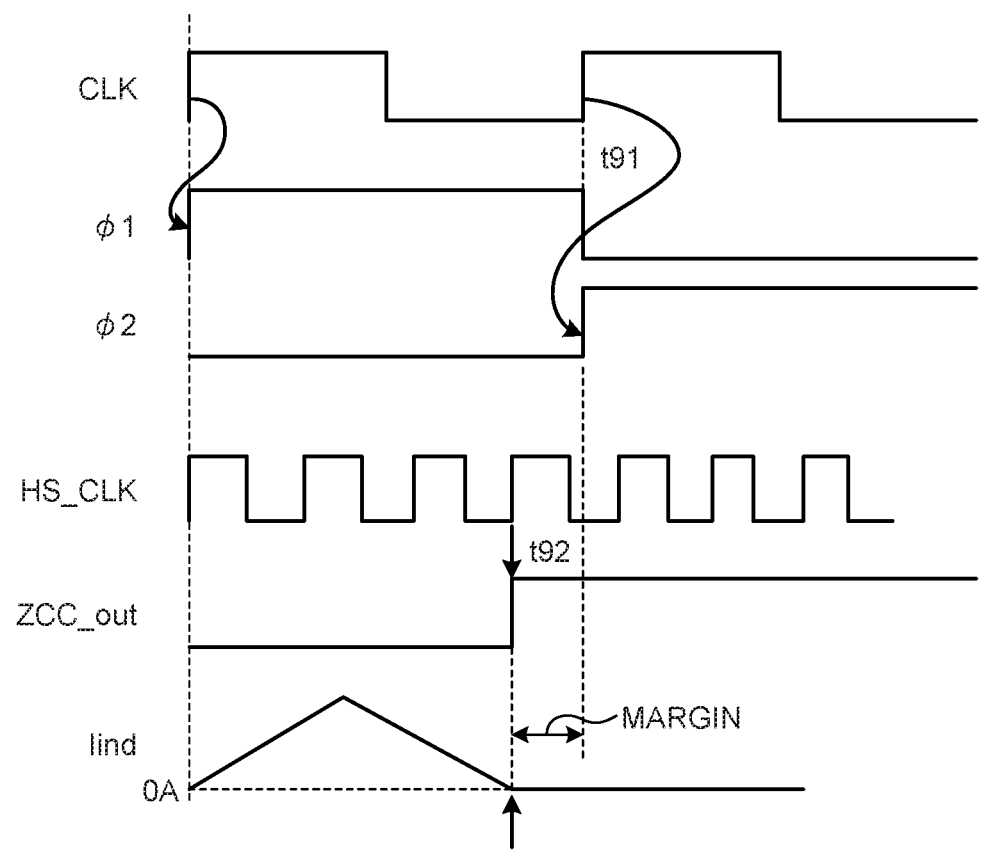
FIG. 11 is a diagram illustrating a control method for the power supply circuit according to an eighth embodiment.

FIG. 11 is a diagram illustrating an embodiment of a control method for the power supply circuit in the aforementioned seventh embodiment. In the control method according to the present embodiment, a high-speed clock signal HS_CLK with a frequency higher than that of the clock signal CLK is supplied to an ON-time control circuit 40. The output signal ZCC_out is detected at time of rise of each high-speed clock signal HS_CLK. The state of the output signal ZCC_out detected at the time of rise of the high-speed clock signal HS_CLK is, for example, latched on a latch circuit (not illustrated), and the latched signal is detected at the time of channel switching by the slot allocation signal φ2, namely, at time t91 of the clock signal CLK. When the output signal ZCC_out at High level from a comparison circuit 22 is detected at time t92 of the high-speed clock signal HS_CLK, the state of DCM is determined. In the state of DCM, a control to increase the ON-time is performed. When the output signal ZCC_out from the comparison circuit 22 is not detected at time t92 of the high-speed clock signal HS_CLK, the state of CCM is determined, and a control to decrease the ON-time is performed.

In the present embodiment, time of detection of the state of DCM or the state of CCM is not the time t91 of channel switching but at earlier time t92 of rise of the high-speed clock signal HS_CLK so that the state of DCM or the stated of CCM is determined with a margin. When the state of CCM is determined, a control to decrease the ON-time is performed, and thereby, a control to transfer to the state of DCM can be executed with the above-mentioned margin.

When the direction of the inductor current Iind is changed to provide the state of DCM, the comparison circuit 22 outputs the output signal ZCC_out at High level. In the present embodiment, even if the state of DCM is provided at the time t91 of channel switching, the state of CCM is determined in a case where the output signal ZCC_out at Hight level is not detected by a detection operation utilizing the high-speed clock signal HS_CLK, and a control to decrease the ON-time is performed. the ON-time is controlled with the margin for time t91 of channel switching, and thereby, occurrence of cross regulation in which channel switching is executed in the state of CCM can be avoided more reliably.

Ninth Embodiment

Figure 12:
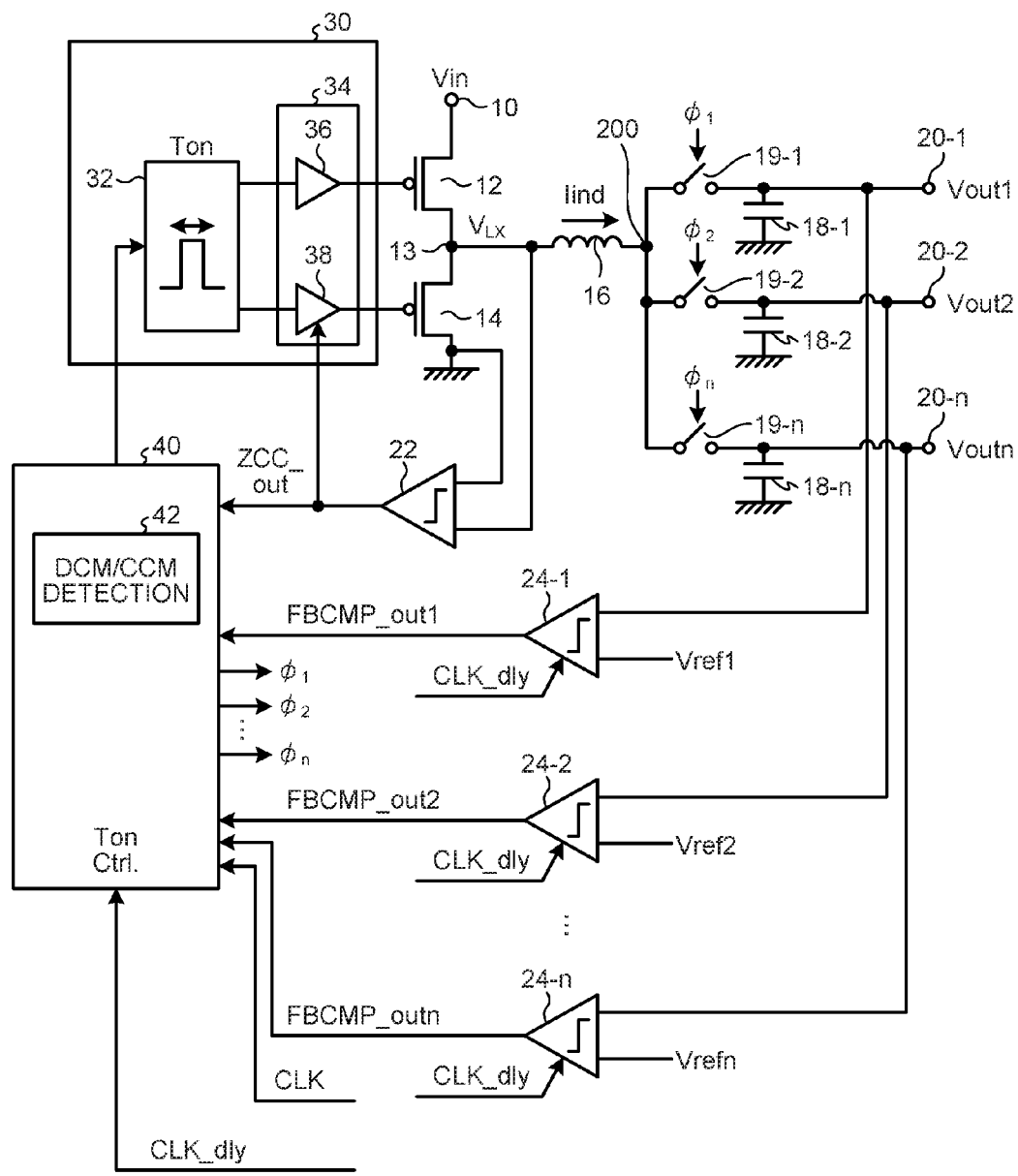
FIG. 12 is a diagram illustrating a configuration of a power supply circuit according to a ninth embodiment.

FIG. 12 is a diagram illustrating a configuration of a power supply circuit according to a ninth embodiment. Elements corresponding to those of the aforementioned embodiments are denoted by the same reference symbols. In the present embodiment, a delayed clock signal CLK_dly provided by delaying the clock signal CLK is supplied to feedback comparators 24-1 to 24-n that compare output voltages Vout1 to Voutn with reference voltages Vref1 to Vrefn, respectively. The feedback comparators 24-1 to 24-n perform comparison operations in synchronization with the delayed clock signal CLK_dly. The clock signal CLK and the delayed clock signal CLK_dly are supplied to an ON-time control circuit 40.

Tenth Embodiment

Figure 13:
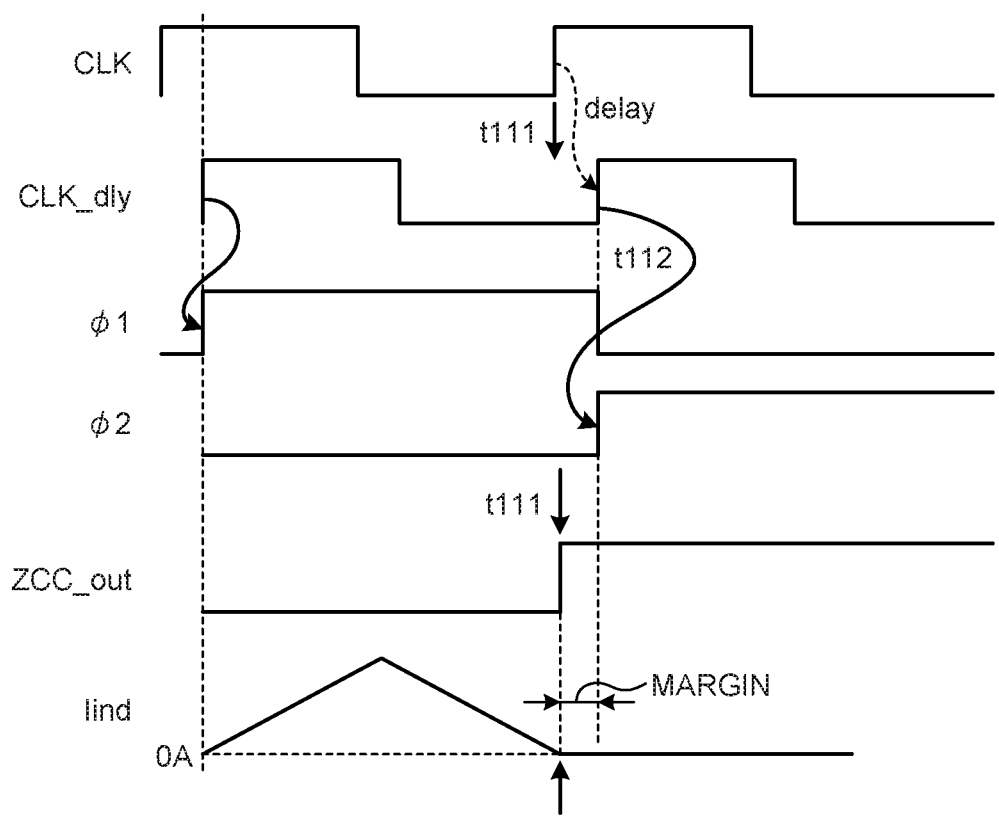
FIG. 13 is a diagram illustrating a control method for the power supply circuit according to a tenth embodiment.

FIG. 13 is a diagram illustrating an embodiment of a control method for the power supply circuit in the aforementioned ninth embodiment. The delayed clock signal CLK_dly that is delayed by a predetermined period of time relative to the clock signal CLK is used. Slot allocation signals φ1 and φ2 are produced from the delayed clock signal CLK_dly and supplied to the switches 19-1 to 19-n, respectively. An output signal ZCC_out from a comparison circuit 22 that compares a voltage $V_{LX}$ at an output node 13 with a reference potential is detected at the time of rise of the clock signal CLK.

Slot allocation to channels is controlled by slot allocation signals φ1 and φ2 produced from the delayed clock signal CLK_dly. In detection using the time t111 of rise of the clock signal CLK, the state of CCM is determined and a control to decrease the ON-time is performed when the output signal ZCC_out at High level is not detected at the time t112 of channel switching. The configuration is provided so as to latch a signal detected at time t111 of the clock signal CLK and detect the signal at time t112, and thereby, it is possible to determine the state of CCM or the state of DCM with a margin between the time when the comparison circuit 22 outputs the output signal ZCC_out at High level and time t112 of channel switching. The margin is provided for determination of the state of DCM or the state of CCM and the control to decrease the ON-time is executed when the state of CCM is determined, so that it is possible to avoid cross regulation more reliably.

Eleventh Embodiment

Figure 14:
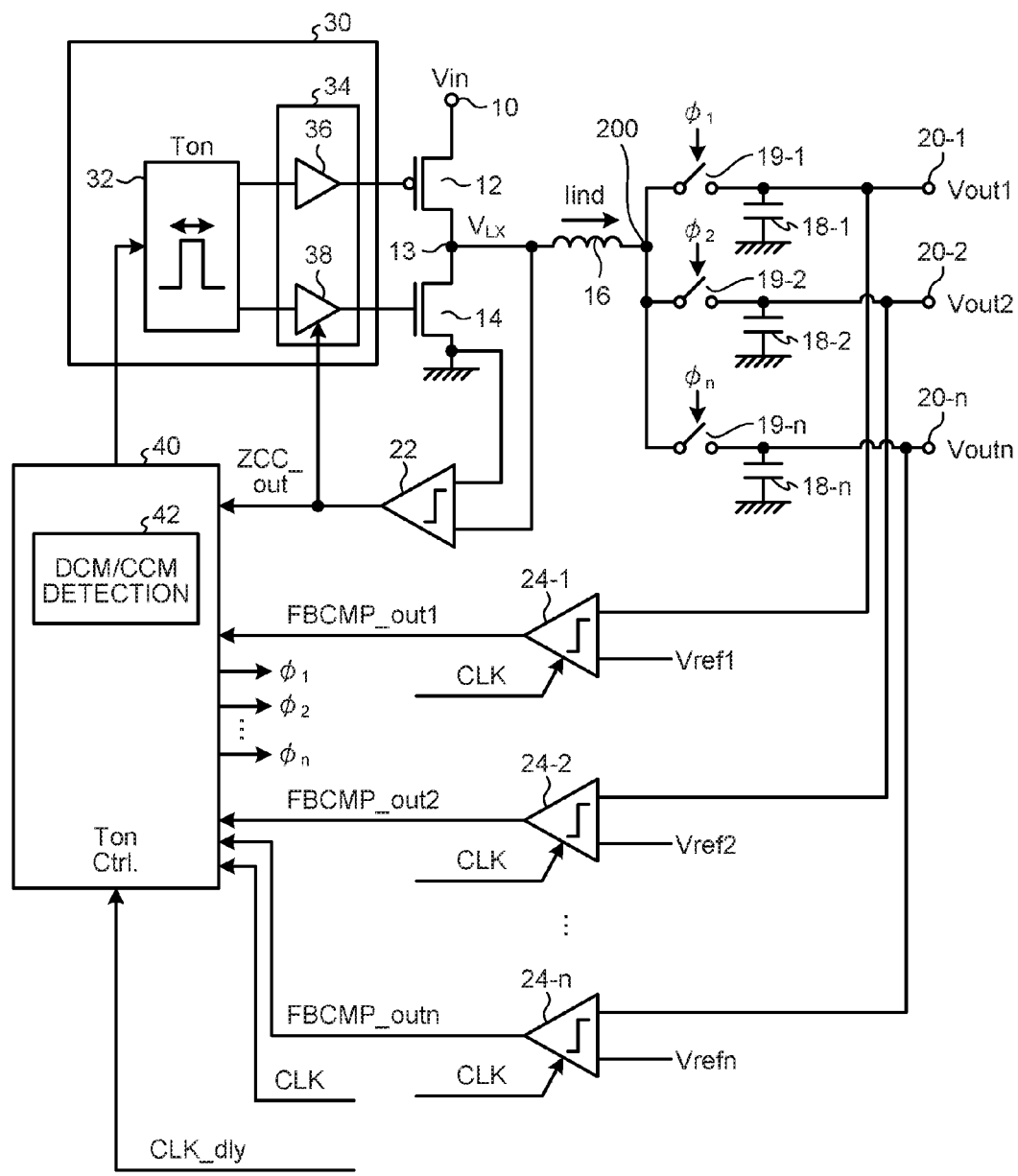
FIG. 14 is a diagram illustrating a configuration of a power supply circuit according to an eleventh embodiment.

FIG. 14 is a diagram illustrating a configuration of a power supply circuit according to an eleventh embodiment. Elements corresponding to those of the aforementioned embodiments are denoted by the same reference symbols. In the present embodiment, a clock signal CLK is supplied to feedback comparators 24-1 to 24-n that compare output voltages Vout1 to Voutn with reference voltages Vref1 to Vrefn, respectively. The feedback comparators 24-1 to 24-n perform comparison operations in synchronization with the clock signal CLK. A delayed clock signal CLK_dly provided by delaying the clock signal CLK is supplied to an ON-time control circuit 40. An output signal ZCC_out from a comparison circuit 22 that compares a voltage $V_{LX}$ at an output node 13 with a reference potential is detected at the time of the delayed clock signal CLK_dly.

Twelfth Embodiment

Figure 15:
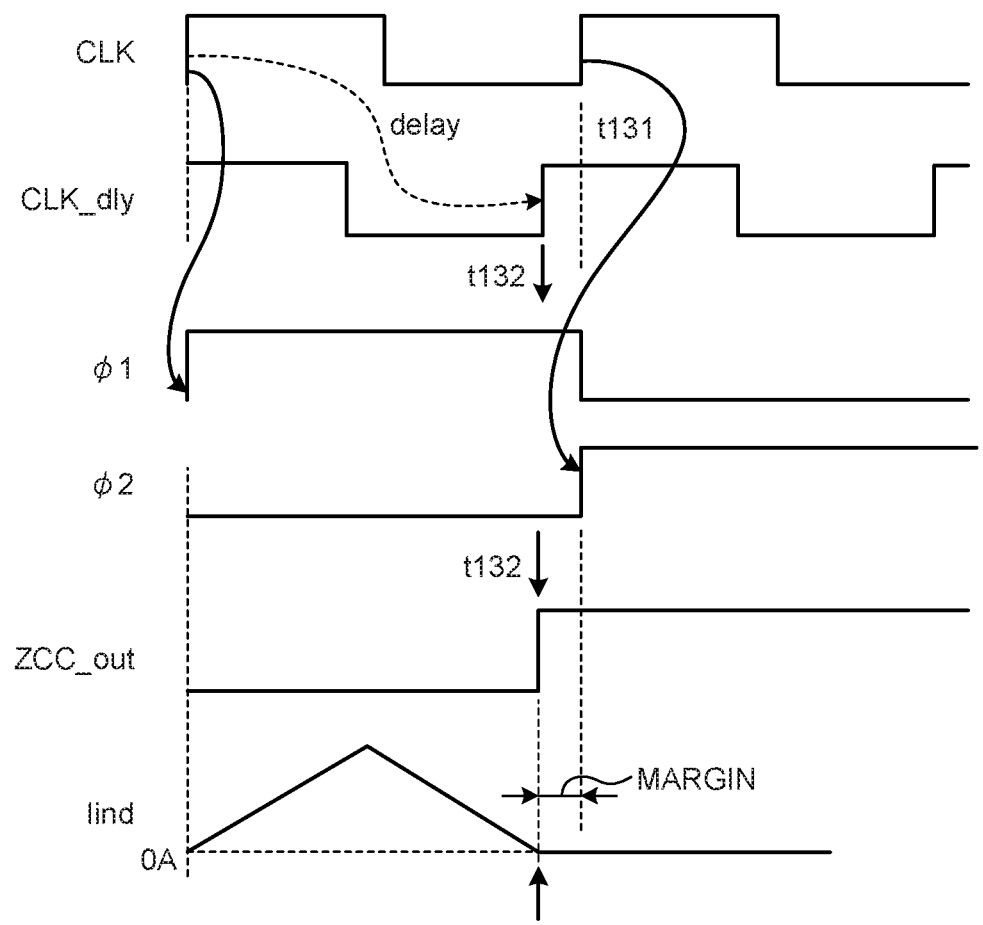
FIG. 15 is a diagram illustrating a control method for the power supply circuit according to a twelfth embodiment.

FIG. 15 is a diagram illustrating an embodiment of a control method for the power supply circuit in the aforementioned eleventh embodiment. A delayed clock signal CLK_dly that is delayed by a predetermined period of time relative to a clock signal CLK is produced. Slot allocation signals φ1 and φ2 are produced from the clock signal CLK and are supplied to switches 19-1 to 19-n, respectively. An output signal ZCC_out from a comparison circuit 22 that compares a voltage $V_{LX}$ at an output node 13 with a reference potential is detected at the time of rise of the delayed clock signal CLK_dly.

Allocation of slots to channels, namely, channel switching is executed at time of the slot allocation signals φ1 and φ2 produced from the clock signal CLK, namely, time t131 of rise of the clock signal CLK.

In the present embodiment, the output signal ZCC_out from the comparison circuit 22 is detected at time t132 of rise of the delayed clock signal CLK_dly. That is, determination of the state of DCM or the state of CCM is executed with a margin between time t132 and time t131 with respect to time t131 of rise of the clock signal CLK that is the time of channel switching. In detection using time t132 of rise of the delayed clock signal CLK_dly, the state of CCM is determined and a control to decrease the ON-time is performed when the output signal ZCC_out at Hight level is not detected at time t132. The margin is provided for detection of the state of DCM or the state of CCM and the control to decrease the ON-time is executed when the state of CCM is determined, so that it is possible to avoid cross regulation more reliably.

Thirteenth Embodiment

Figure 16:
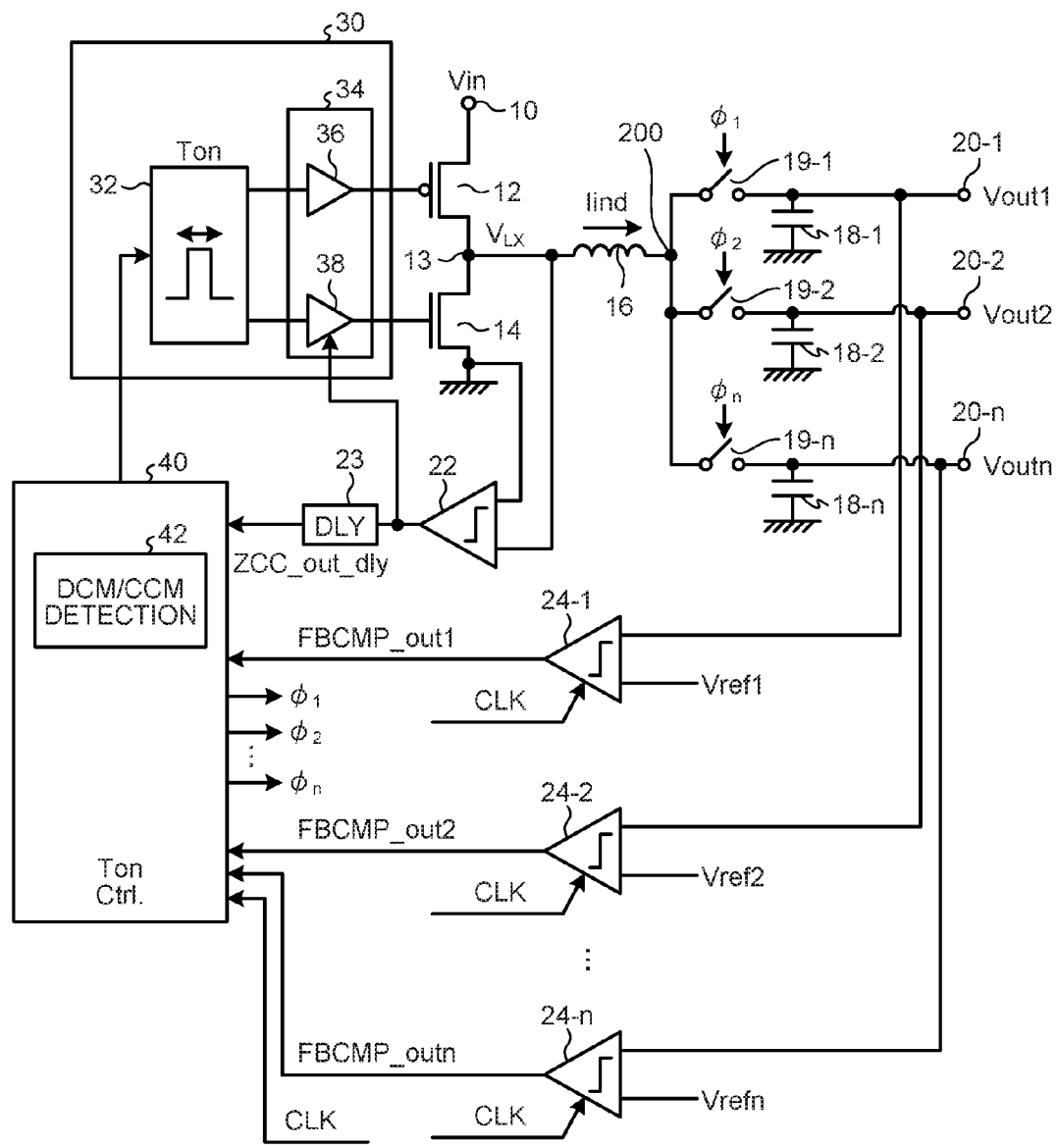
FIG. 16 is a diagram illustrating a configuration of a power supply circuit according to a thirteenth embodiment.

FIG. 16 is a diagram illustrating a configuration of a power supply circuit according to a thirteenth embodiment. Elements corresponding to those of the aforementioned embodiments are denoted by the same reference symbols. In the present embodiment, a delay circuit 23 connected to an output terminal of a comparison circuit 22 that compares a voltage $V_{LX}$ at an output node 13 with a ground potential is included. A delay output signal ZCC_out_dly that is delayed by the delay circuit 23 is supplied to an ON-time control circuit 40.

Fourteenth Embodiment

Figure 17:
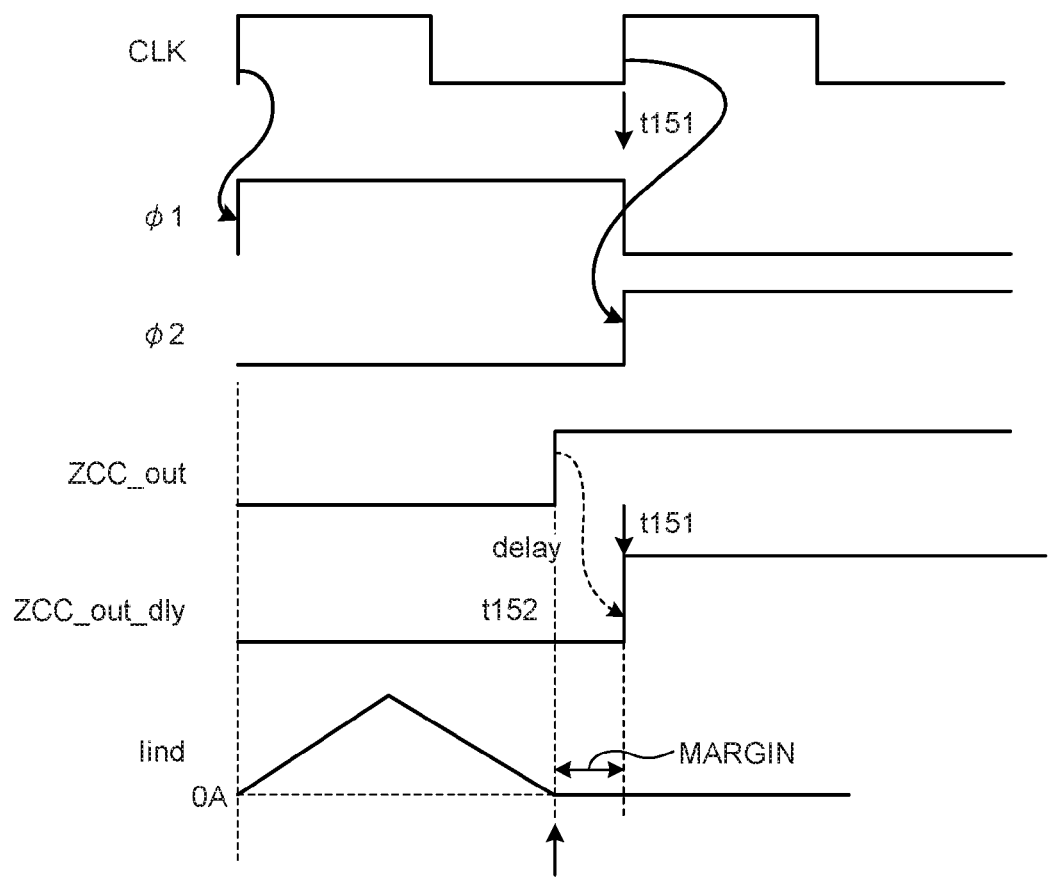
FIG. 17 is a diagram illustrating a control method for the power supply circuit according to a fourteenth embodiment.

FIG. 17 is a diagram illustrating an embodiment of a control method for the power supply circuit in the aforementioned thirteenth embodiment. Slot allocation signals φ1 and φ2 are produced from a clock signal CLK and are supplied to switches 19-1 to 19-n, respectively. At time t151 of the clock signal CLK, a delayed output signal ZCC_out_dly is detected that is provided by delaying, by a predetermined period of time, an output signal ZCC_out from a comparison circuit 22 that compares a voltage $V_{LX}$ at an output node 13 with a reference potential. When the delayed output signal ZCC_out_dly is not detected by time t151 of the clock signal CLK, a control to decrease the ON-time is performed. That is, determination of the state of DCM or the state of CCM is executed, with a margin between time t152 and time t151. The margin is provided for determination of the state of DCM or CCM and the control to decrease the ON-time is executed when the state of CCM is determined, so that it is possible to avoid cross regulation more reliably.

Fifteenth Embodiment

Figure 18:
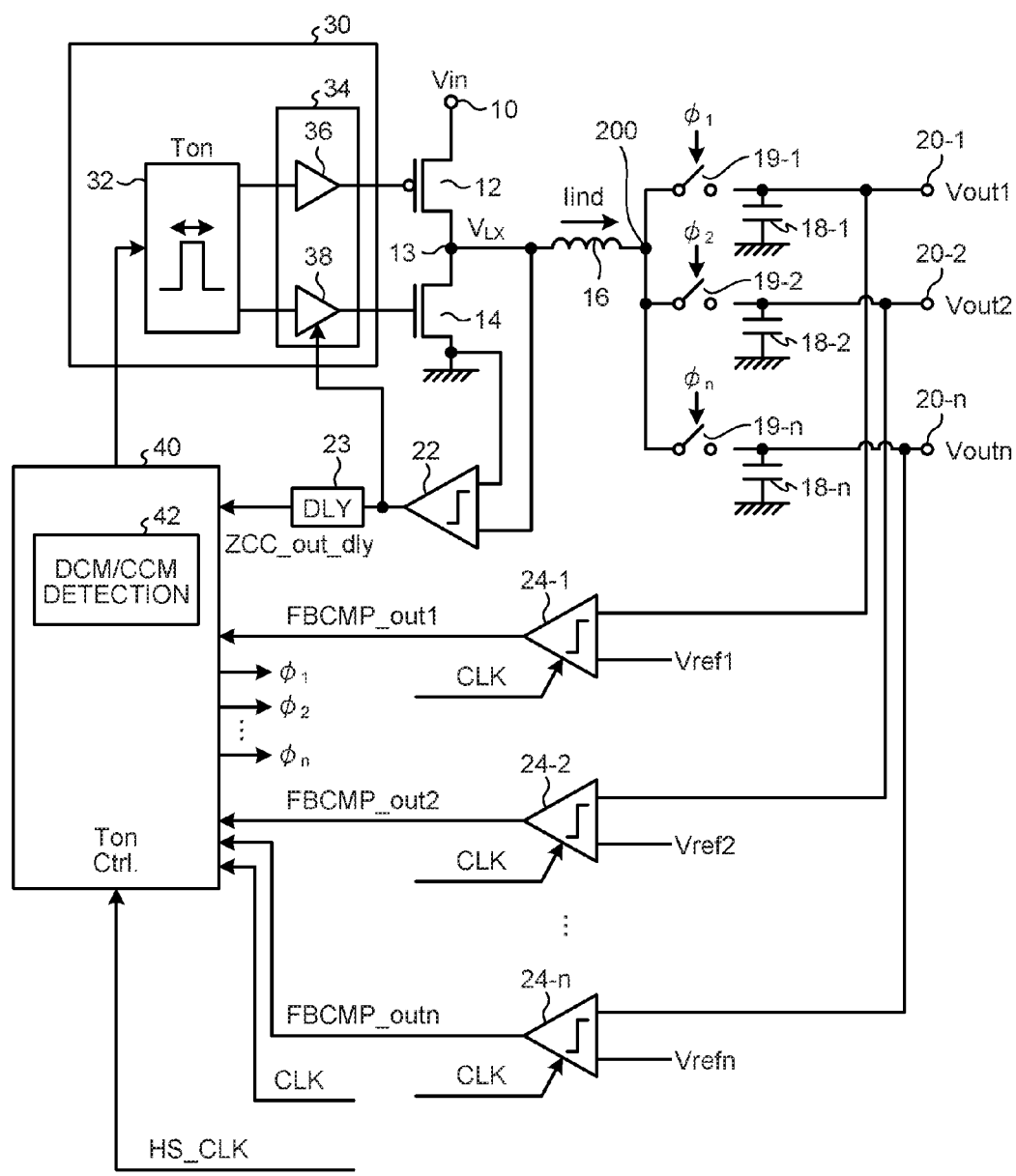
FIG. 18 is a diagram illustrating a configuration of a power supply circuit according to a fifteenth embodiment.

FIG. 18 is a diagram illustrating a configuration of a power supply circuit according to a fifteenth embodiment. Elements corresponding to those of the aforementioned embodiments are denoted by the same reference symbols. In the present embodiment, a delay circuit 23 connected to an output terminal of a comparison circuit 22 that compares a voltage $V_{LX}$ at an output node 13 with a ground potential is included. A delay output signal ZCC_out_dly that is delayed by the delay circuit 23 is supplied to an ON-time control circuit 40. A high-speed clock signal HS_CLK is supplied to the ON-time control circuit 40.

Sixteenth Embodiment

Figure 19:
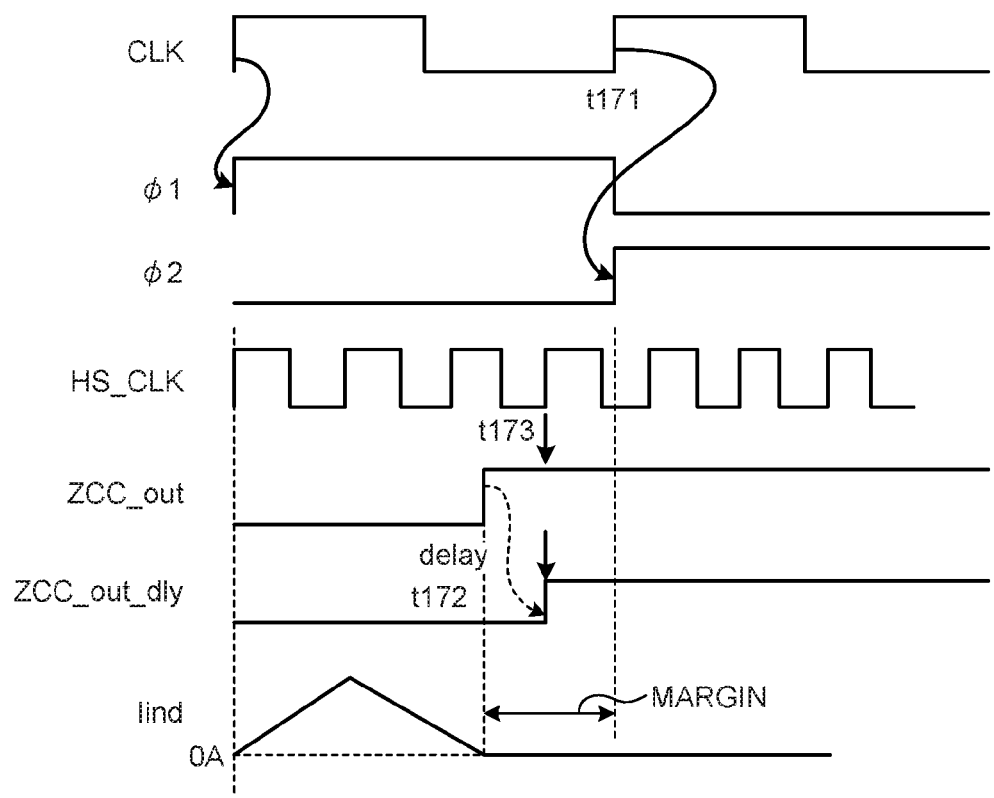
FIG. 19 is a diagram illustrating a control method for the power supply circuit according to a sixteenth embodiment.

FIG. 19 is a diagram illustrating an embodiment of a control method for the power supply circuit in the aforementioned fifteenth embodiment. Slot allocation signals are produced from a clock signal CLK. In FIG. 19, for the sake of convenience, two slot allocation signals φ1 and φ2 are illustrated. The slot allocation signals φ1 and φ2 are supplied to corresponding switches 19-1 and 19-n, respectively.

At time t173 of every rise of a high-speed clock signal CLK, a delayed output signal ZCC_out_dly is detected that is delayed by a predetermined period of time from time t171 of rise of an output signal ZCC_out from a comparison circuit 22 that compares a voltage $V_{LX}$ at an output node 13 with a ground potential that is a reference potential. For example, the state of the delayed output signal ZCC_out_dly is detected by latching it on a separately provided latch circuit (not illustrated) at the time of every rise of the high-speed clock signal HS_CLK. The state of the delayed output signal ZCC_out_dly that is latched on the latch circuit is detected at time t171 of channel switching.

When the delayed output signal ZCC_out_dly is not detected by time t171 of the clock signal CLK, the state of CCM is determined and a control to decrease the ON-time is performed. That is, time of detection of the state of CCM or the state of DCM, namely, time of detection of the delayed output signal ZCC_out_dly is caused to be earlier than time t171 when the output terminals are switched, and thereby, the state of CCM is determined with a margin. The margin is provided for determination of the state of CCM and the control to decrease the ON-time is executed when the state of CCM is determined, it is possible to avoid cross regulation more reliably.

Seventeenth Embodiment

Figure 20:
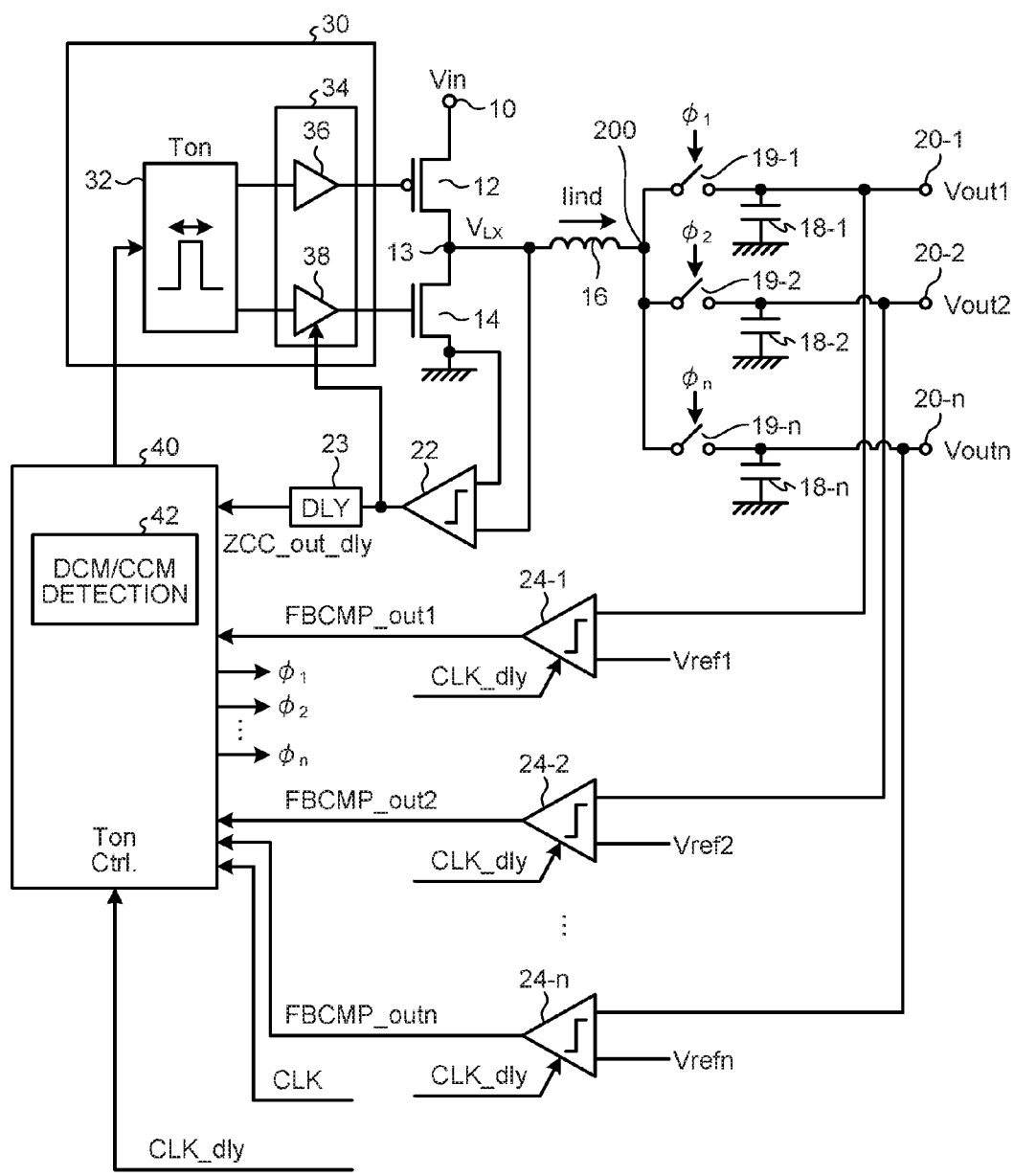
FIG. 20 is a diagram illustrating a configuration of a power supply circuit according to a seventeenth embodiment.

FIG. 20 is a diagram illustrating a configuration of a power supply circuit according to a seventeenth embodiment. Elements corresponding to those of the aforementioned embodiments are denoted by the same reference symbols. In the present embodiment, a delayed clock signal CLK_dly that is provided by delaying a clock signal CLK is supplied to feedback comparators 24-1 to 24-n that compare output voltages Vout1 to Voutn with reference voltages Vref1 to Vrefn. That is, the feedback comparators 24-1 to 24-n perform comparison operations in synchronization with the delayed clock signal CLK_dly. The clock signal CLK and the delayed clock signal CLK_dly provided by delaying the clock signal CLK are supplied to an ON-time control circuit 40. Slot allocation signals φ1 and φ2 are produced from the delayed clock signal CLK_dly and are supplied to switches 19-1 to 19-n, respectively.

Eighteenth Embodiment

Figure 21:
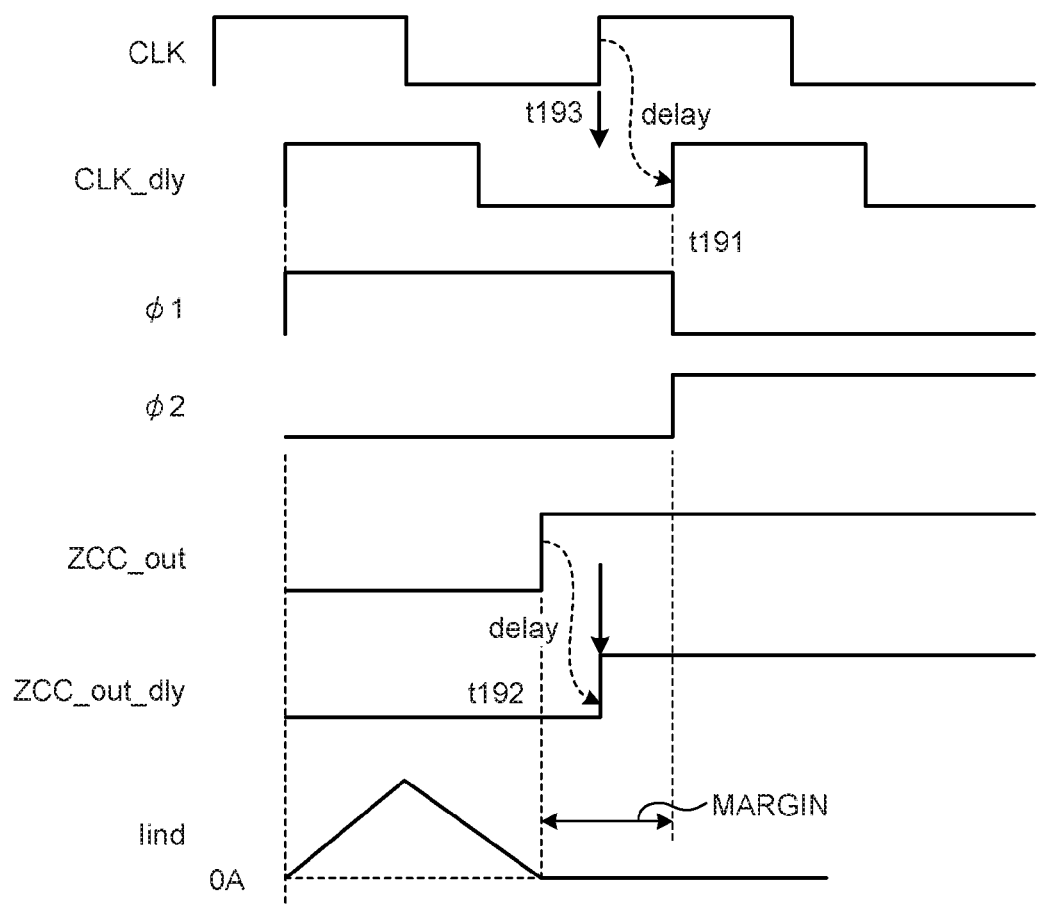
FIG. 21 is a diagram illustrating a control method for the power supply circuit according to an eighteenth embodiment.

FIG. 21 is a diagram illustrating an embodiment of a control method for the power supply circuit in the aforementioned seventeenth embodiment. Slot allocation signals φ1 and φ2 are produced from a delayed clock signal CLK_dly and are supplied to switches 19-1 to 19-n, respectively. A delayed output signal ZCC_out_dly that is provided by delaying, by a predetermined period of time, an output signal ZCC_out from a comparison circuit 22 that compares an output voltage $V_{LX}$ at an output node 13 with a reference potential, is detected at time t193 of rise of a clock signal CLK. When the delayed output signal ZCC_out_dly is not detected by time t193, a control to decrease the ON-time is performed. That is, determination of the state of DCM or the state of CCM is performed with a margin between time t192 when the ZCC_out is output from the comparison circuit 22 and time t191 of the delayed clock signal CLK_dly that is the time of channel switching, and a control to decrease the ON-time is performed when the state of CCM is determined. Due to this control, it possible to avoid occurrence of cross regulation more reliably.

Nineteenth Embodiment

Figure 22:
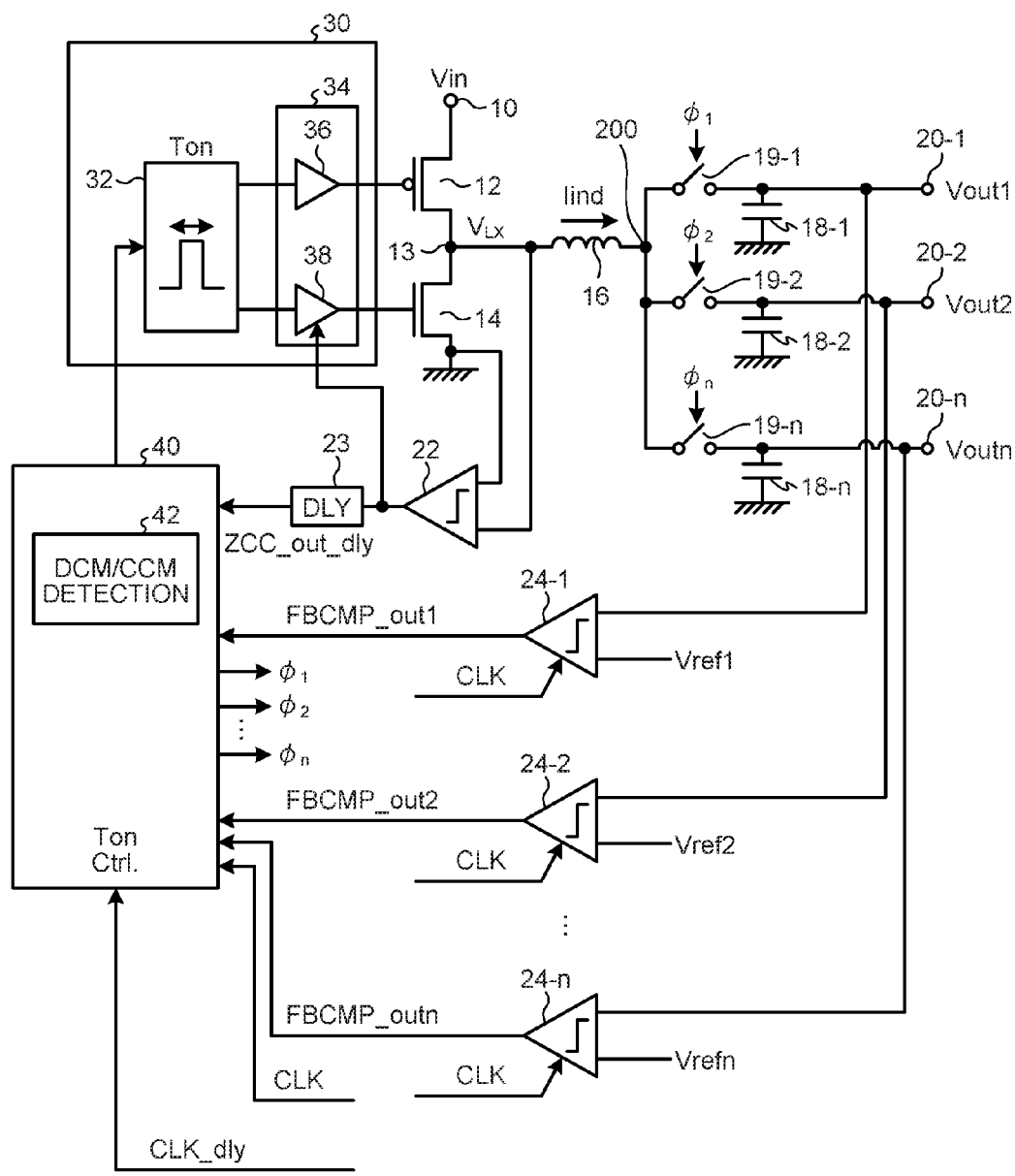
FIG. 22 is a diagram illustrating a configuration of a power supply circuit according to a nineteenth embodiment.

FIG. 22 is a diagram illustrating a configuration of a power supply circuit according to a nineteenth embodiment. Elements corresponding to those of the aforementioned embodiments are denoted by the same reference symbols. In the present embodiment, a clock signal CLK is supplied to feedback comparators 24-1 to 24-n that compare output voltages Vout1 to Voutn with reference voltage Vref1 to Vrefn. That is, feedback comparators 24-1 to 24-n perform comparison operations in synchronization with the clock signal CLK. An ON-time control circuit 40 is supplied with a delayed output signal ZCC_out_dly provided by delaying, by a predetermined period of time, an output signal ZCC_out from a comparison circuit 22 that compares a voltage $V_{LX}$ at an output node 13 with a reference potential. A clock signal CLK and a delayed clock signal CLK_dly provided by delaying the clock signal CLK are supplied to the ON-time control circuit 40.

Twentieth Embodiment

FIG. 23 is a diagram illustrating an embodiment of a control method for the power supply circuit in the aforementioned nineteenth embodiment. Slot allocation signals φ1 and φ2 are produced from a clock signal CLK and are supplied to switches 19-1 to 19-n, respectively. At time t213 of rise of a delayed clock signal CLK_dly provided by delaying a clock signal CLK, a delayed output signal ZCC_out_dly is detected that is provided by delaying, by a predetermined period of time, an output signal ZCC_out from a comparison circuit 22 that compares a voltage $V_{LX}$ at an output node 13 with a reference potential. When the delayed output signal ZCC_out_dly is not detected by time t213, a control to decrease the ON-time is performed. That is, determination of the state of DCM or the state of CCM is performed with a margin between time t212 when the output signal ZCC_out is output from the comparison circuit 22 and time t211 of the clock signal CLK that is the time of channel switching, and when the state of CCM is determined, a control to decrease the ON-time is performed. The ON-time is controlled with the margin, and thereby, avoidance of cross regulation is facilitated.

Twenty-First Embodiment

Figure 24A:
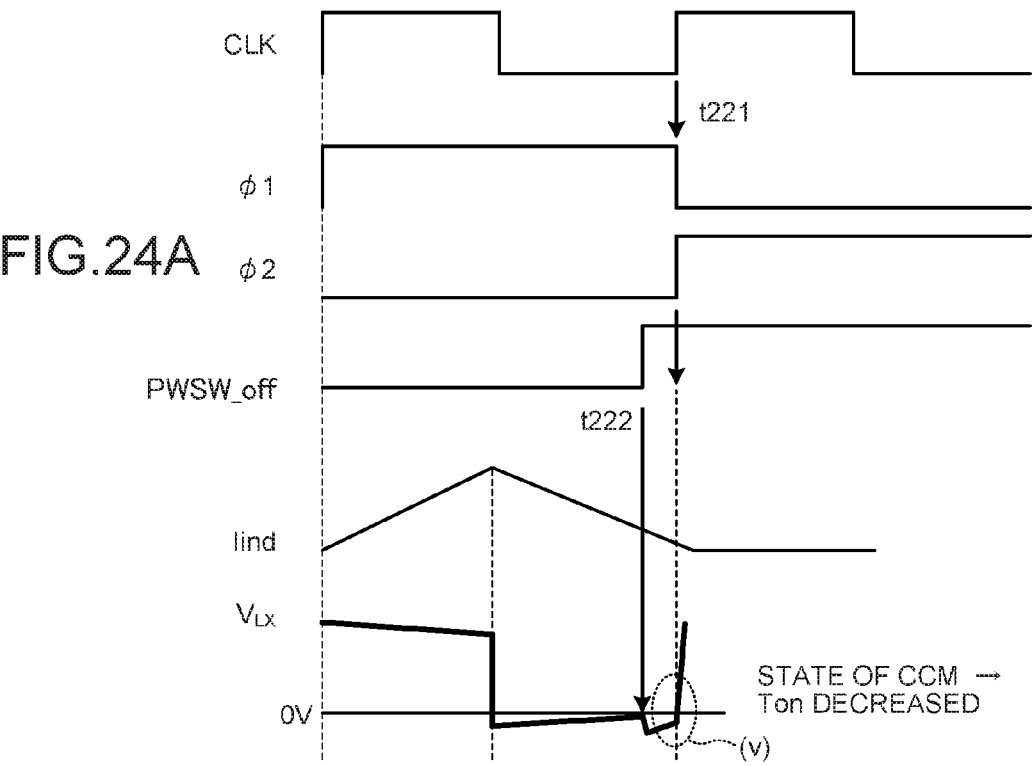
FIGS. 24A and 24B are diagrams illustrating a control method for the power supply circuit according to a twenty-first embodiment.
Figure 24B:
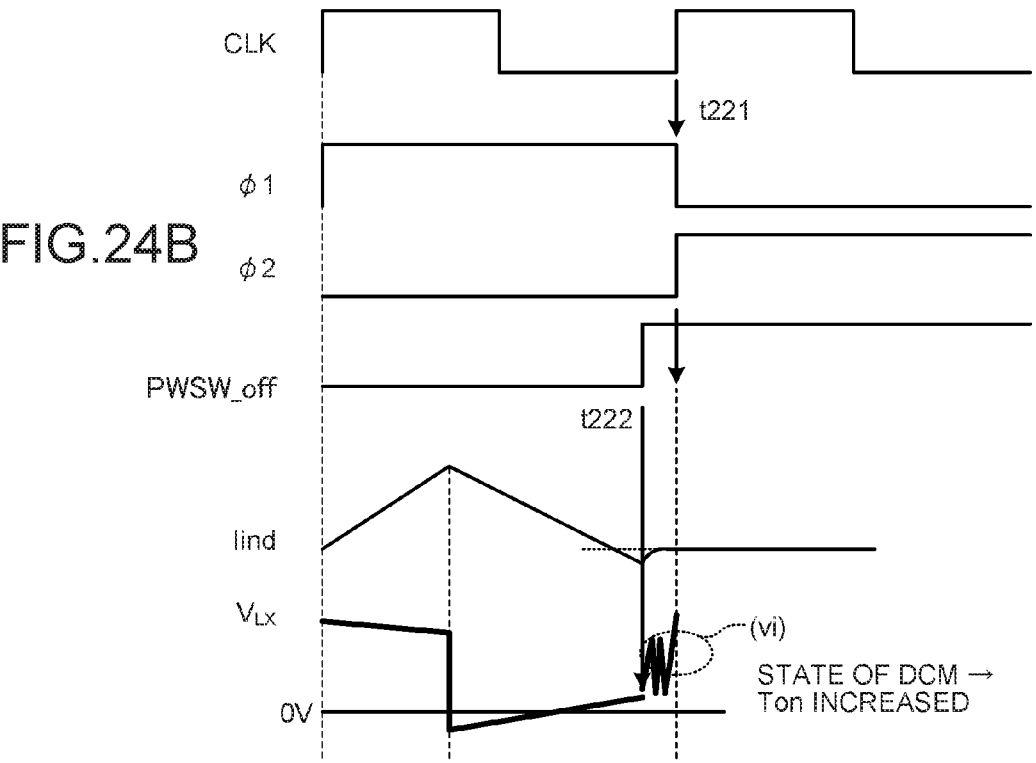

FIGS. 24A and 24B are diagrams illustrating another embodiment of a control method for the power supply circuit. In the present embodiment, slot allocation signals φ1 and φ2 are produced from a clock signal CLK. Before the channels are switched, namely, at time t222 before time t221 when the next clock signal CLK rises, a low-side NMOS switching transistor 14 is turned off. For example, a signal PWSW_off that turns off the NMOS switching transistor 14 is produced by utilizing a high-speed clock signal (not illustrated), and a buffer circuit 38 that supplies a driving signal to the NMOS switching transistor 14 is controlled, so that the NMOS switching transistor 14 can be turned off.

With reference to FIG. 24A, the control method in a case where inductor current Iind flows toward the output voltage when the NMOS switching transistor 14 turns off will be described. In the case where the inductor current Iind flows toward the output voltage when the NMOS switching transistor 14 turns off, a voltage $V_{LX}$ at an output node 13 is lower than the ground potential, as indicated by a dotted circle (v). In this case, a control to decrease the ON-time is performed, and, at the time when a slot allocation signal φ1 is next supplied, control is executed in such a manner that the channels are switched at the time when the inductor current Iind is zero. This is because cross regulation is avoided.

With reference to FIG. 24B, the control method in a case where the inductor current Iind flows from the output voltage toward the NMOS switching transistor 14 when the NMOS switching transistor 14 turns off will be described. In the case where the inductor current Iind flows from the output voltage toward the NMOS switching transistor 14 when the NMOS switching transistor 14 turns off, the voltage $V_{LX}$ at the output node 13 is higher than the ground potential. That is, ringing of the voltage $V_{LX}$ at the output node 13 is caused as indicated by a dotted ellipse (vi), and the voltage is higher than the ground potential. In this case, a control to increase an ON-time of a PMOS switching transistor 12 is performed. The ON-time is increased in such a manner that a period of time of the slot is utilized maximally and effectively, and thereby, it is possible to charge the capacitor 18 with the inductor current Iind and accordingly raise the output voltage Vout.

In the present embodiment, the low-side NMOS switching transistor 14 is forced to turn off at time t222 before the time when the high-side PMOS switching transistor 12 is turned on, then a direction in which the inductor current Iind flows is determined by detecting the voltage $V_{LX}$ at the output node 13 at time t221 when the channels are switched, namely, the time just before the PMOS switching transistor 12 is next turned on, and a control of the ON-time is performed, so that it is possible to avoid occurrence of cross regulation without using a comparison circuit 22.

Twenty-Second Embodiment

Figure 25:
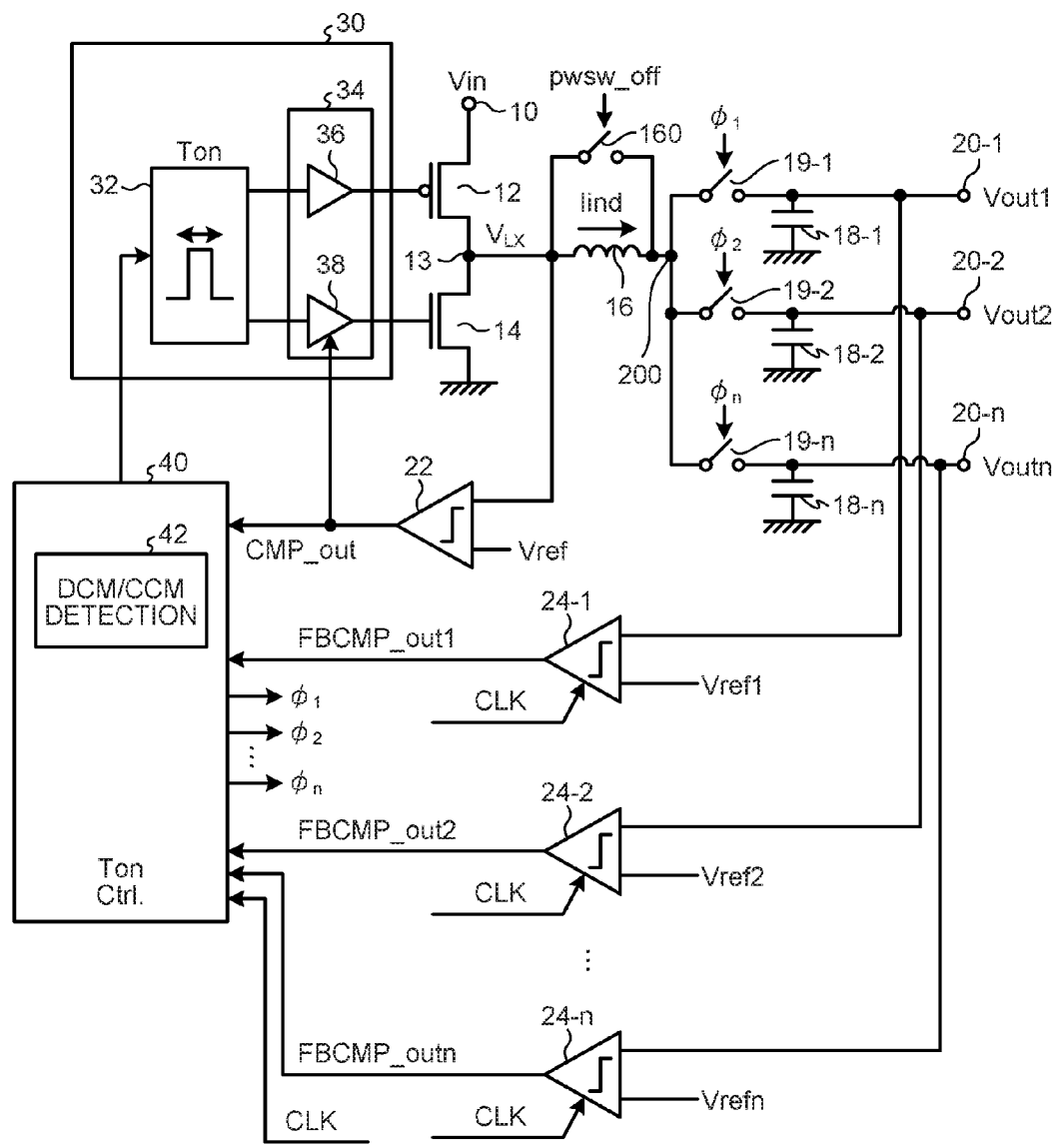
FIG. 25 is a diagram illustrating a configuration of a power supply circuit according to a twenty-second embodiment.

FIG. 25 is a diagram illustrating a configuration of a power supply circuit according to a twenty-second embodiment. Elements corresponding to those of the aforementioned embodiments are denoted by the same reference symbols. In the present embodiment, a predetermined reference voltage Vref instead of the ground potential is applied to the other input terminal of a comparison circuit 22 that detects the voltage $V_{LX}$ at the output node 13. An embodiment in a case of so-called pseudo-DCM will be illustrated. For example, when the voltage $V_{LX}$ at the output node 13 is higher than the reference voltage Vref, the comparison circuit 22 outputs an output signal CMP_out at High level.

A switch 160 connected to both ends of an inductor 16 is included. A control signal pwsw_off is supplied to the switch 160 to control on/off thereof. This is because the current flowing through the inductor 16 is circulated when a low-side NMOS switching transistor 14 is turned off.

Twenty-Third Embodiment

Figure 26A:
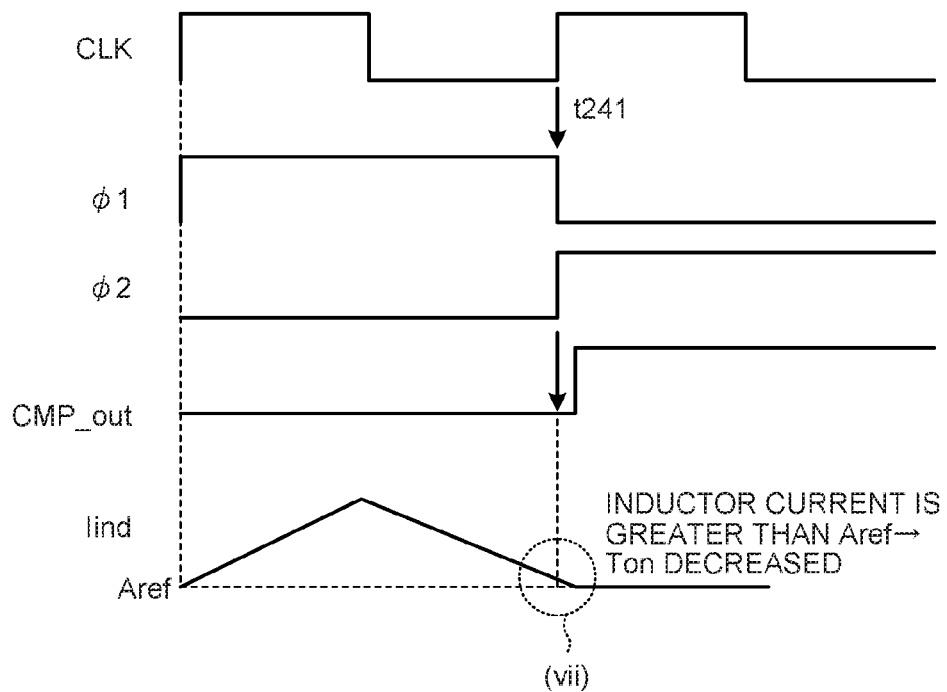
FIGS. 26A and 26B are diagrams illustrating a control method for the power supply circuit according to a twenty-third embodiment.
Figure 26B:
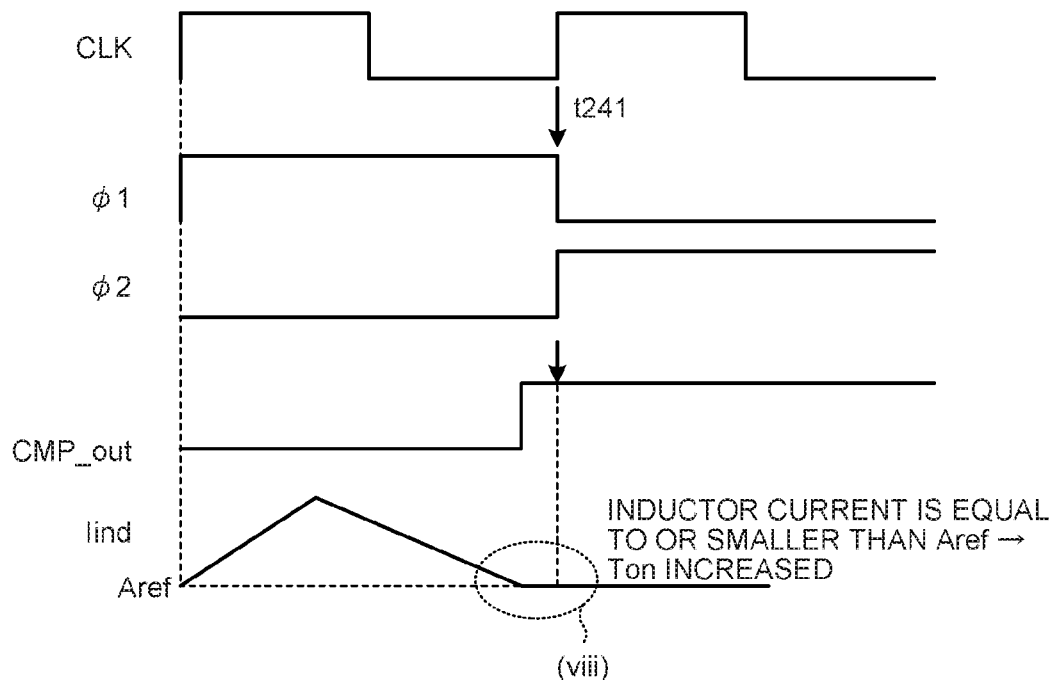

FIGS. 26A and 26B are diagrams illustrating an embodiment of a control method for the power supply circuit in the aforementioned twenty-second embodiment. In the present embodiment, slot allocation signals φ1 and φ2 are produced from a clock signal CLK. The output signal CMP_out from the comparison circuit 22 is detected at the time of channel switching, namely, at time t241 when the next clock signal CLK rises. As illustrated in FIG. 26A, when the output signal CMP_out from the comparison circuit 22 is not detected at time t241, determination is executed in such a manner that inductor current Iind greater than reference current Aref is flowing, and a control to decrease the ON-time is performed. This is because transfer to the state of DCM is caused to avoid cross regulation.

As illustrated in FIG. 26B, when the output signal CMP_out from the comparison circuit 22 is detected at the time of channel switching, namely, at time t241 of rise of the next clock signal CLK, determination is executed in such a manner that the inductor current Iind is equal to or less than the reference current Aref, and a control to increase the ON-time is performed. The ON-time is increased in such a manner that a period of time of the slot is utilized maximally and effectively, and thereby, it is possible to supply the inductor current Iind to a capacitor and accordingly raise an output voltage.

Also, in the case of pseudo-DCM in the present embodiment, the operation state at the time of channel switching is detected, and when the inductor current Iind is less than or equal to the reference current Aref, a control to increase the ON-time is performed. Thereby, one cycle of the clock signal CLK is utilized maximally, and a control to supply the inductor current Iind to capacitors 18-1 to 18-n and accordingly raise output voltages Vout1 to Voutn, namely, a control in the maximal Ton control mode, can be retained. When the inductor current Iind greater than the reference current Aref is flowing, a control to decrease the ON-time is performed so as to avoid occurrence of cross regulation.

Twenty-Fourth Embodiment

Figure 27:
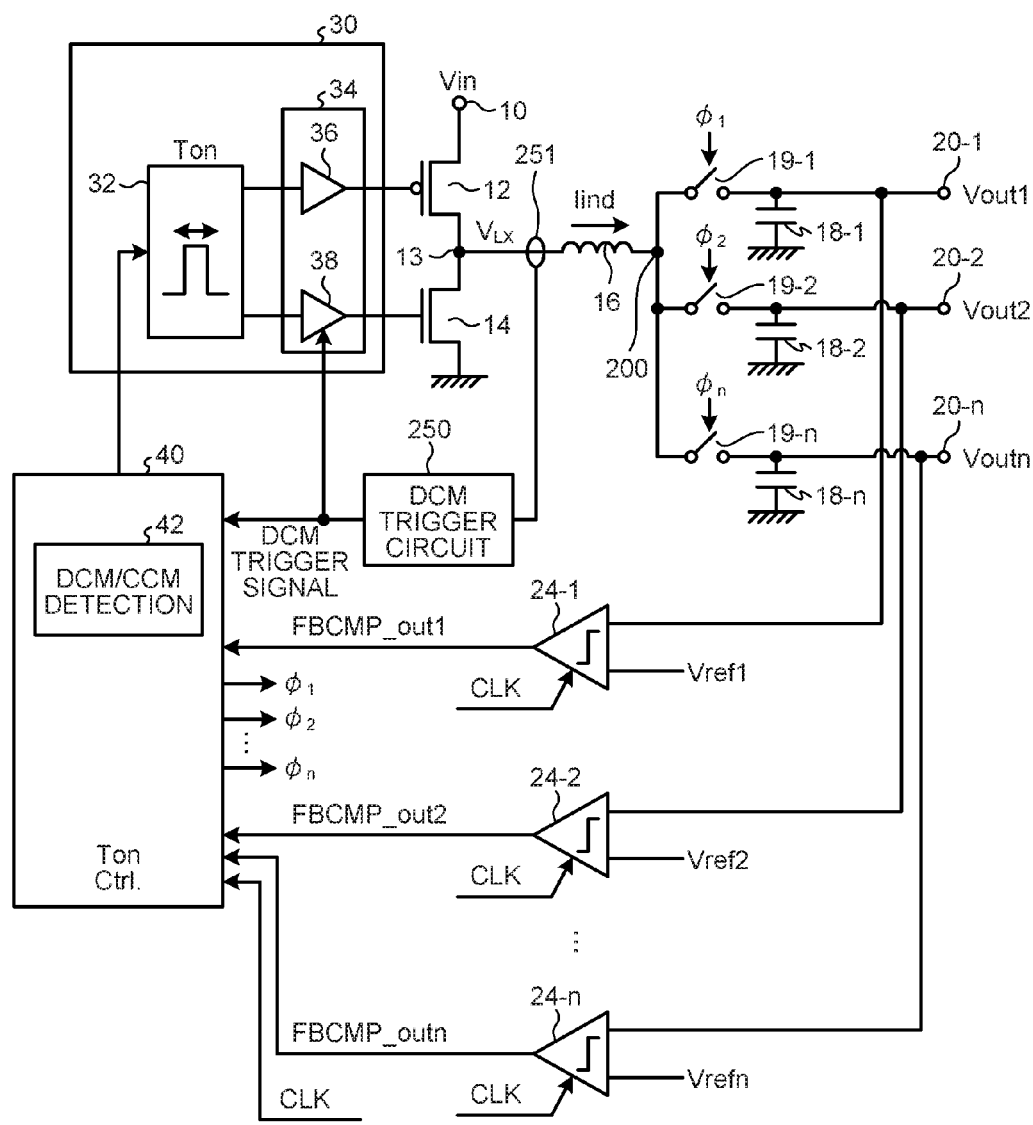
FIG. 27 is a diagram illustrating a configuration of a power supply circuit according to a twenty-fourth embodiment.

FIG. 27 is a diagram illustrating a configuration of a power supply circuit according to a twenty-fourth embodiment. Elements corresponding to those of the aforementioned embodiments are denoted by the same reference symbols. In the present embodiment, a current sensor 251 and a DCM trigger circuit 250 are included. The embodiment is to detect inductor current Iind to determine the state of DCM or the state of CCM instead of the configuration to detect the voltage $V_{LX}$ at the output node 13.

The current sensor 251 includes, for example, a comparator (not illustrated) with an input connected to both ends of a resistance (not illustrated) connected in series with an inductor 16. As a direction of flow of the inductor current Iind is changed, a magnitude relation between voltages input to the comparator is changed. As the magnitude relation between the voltages is changed, an output from the comparator is switched, and therefore, the state of DCM or the state of CCM can be detected by detecting a change in the output from the comparator.

The DCM trigger circuit 250 supplies an ON-time control circuit 40 with a DCM trigger signal in response to a change in the output from the comparator, for example. In response to the DCM trigger signal, a DCM/CCM detection circuit 42 in the ON-time control circuit 40 supplies a pulse generation circuit 32 with a signal that adjusts a period of time of a pulse signal at High level.

In the present embodiment, a change in the direction of the inductor current Iind is detected to detect the state of DCM or the state of CCM, and a duration of the pulse signal at High level is adjusted so that it possible to control the ON-time.

Twenty-Fifth Embodiment

Figure 28:
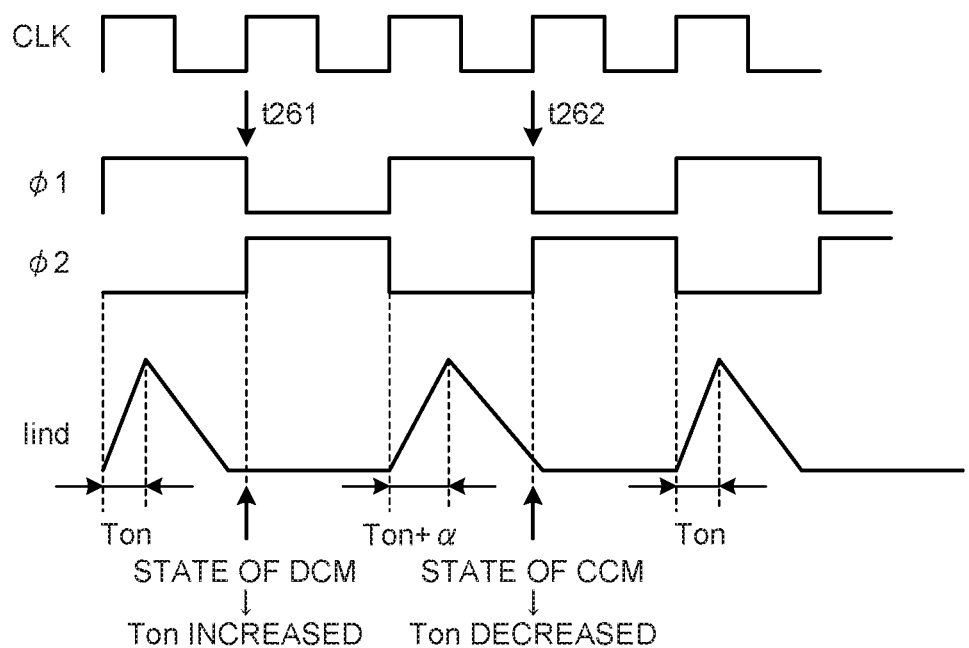
FIG. 28 is a diagram illustrating a control method for the power supply circuit according to a twenty-fifth embodiment.

FIG. 28 illustrates an embodiment of a control method for controlling time when the ON-time is adjusted. In the present embodiment, slot allocation signals φ1 and φ2 are produced from a clock signal CLK. For the sake of convenience of explanation, only a control of a channel 1 to which a slot allocation signal φ1 is supplied will be described. In the control method according to the present embodiment, when the state of DCM is determined, adjustment of the ON-time is performed at the time when the next slot allocation signal φ1 is supplied to the channel 1. That is, when the state of DCM is determined at time t261, a control to increase the ON-time is performed at the time when the next slot allocation signal φ1 is supplied, so that the ON-time is increased up to Ton+α (Ton plus alpha). This is because adjustment of the ON-time is reflected at an earlier time.

When the state of CCM is determined at time t262 of the clock signal CLK, a control is executed to decrease the ON-time at time of slot allocation where the next slot allocation signal φ1 is supplied to the channel 1 and recover the original period of time Ton.

A result of detection of DCM state/CCM state is immediately reflected on adjustment of the ON-time at time of next slot allocation, and thereby, it is possible to rapidly control the output voltage depending on the state of a load. When the state of CCM is determined, the ON-time is rapidly decreased to transfer to the state of DCM, and thereby, it is possible to avoid a situation that cross regulation occurs.

Twenty-Sixth Embodiment

Figure 29:
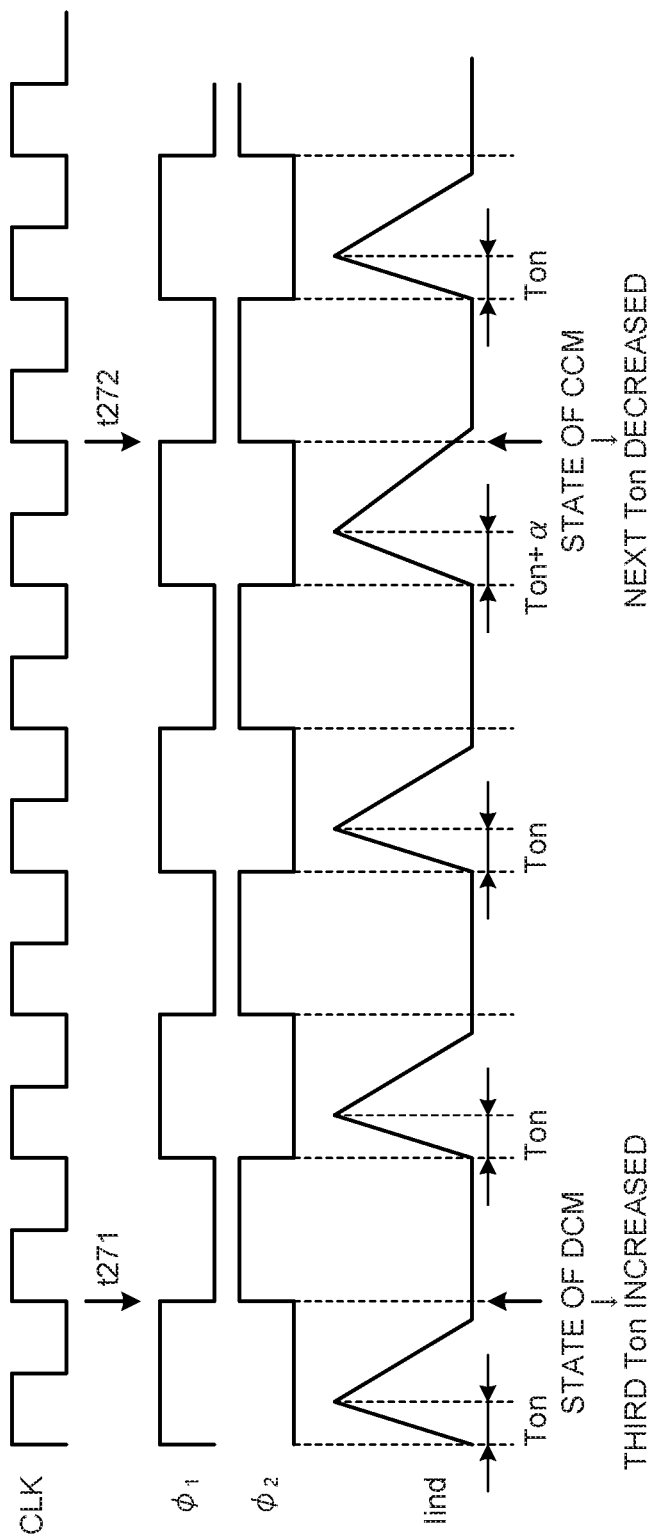
FIG. 29 is a diagram illustrating a control method for the power supply circuit according to a twenty-sixth embodiment.

FIG. 29 is a diagram illustrating another embodiment of a control method for controlling the time when the ON-time is adjusted. In the present embodiment, slot allocation signals φ1 and φ2 are produced from a clock signal CLK. For the sake of convenience of explanation, only a control of a channel 1 to which a slot allocation signal φ1 is supplied will be described. In the control method according to the present embodiment, when the state of DCM is determined at the time t271 of channel switching, adjustment of the ON-time is performed at time of the third slot allocation after the slot during which that determination has been executed. That is, a control to increase the ON-time is performed not at the time when the next slot allocation signal φ1 is supplied but at time delayed by a predetermined period of time so as to increase the ON-time up to Ton+α. At this time, a circuit operation associated with determination of control of the ON-time is stopped between a slot for determination and a slot for time adjustment is stopped, and thereby, it is possible to reduce power consumption. Additionally, only when the state of DCM is determined for the three consecutive slots, a control to increase the ON-time may be performed.

When the state of CCM is determined at the time t272 of channel switching, a control to decrease the ON-time is performed. The control to decrease the ON-time is performed at the time when the next slot allocation signal φ1 is supplied. That is, at the time when the next slot allocation signal φ1 is applied, for example, a control to restore the ON-time to the original period of time Ton. In the control method according to the present embodiment, when the state of CCM is determined at time t272 when the channels are switched, adjustment of the ON-time is performed at time of the third slot allocation after the slot during which the determination has been executed. That is, the control to decrease the ON-time is not performed at the time when the next slot allocation signal φ1 is supplied, but the ON-time is decreased at time delayed by a predetermined period of time. At this time, a circuit operation associated with determination of control of the ON-time is stopped between a slot for determination and a slot for time adjustment is stopped. Additionally, only when the state of DCM is determined for the three consecutive slots, a control to decrease the ON-time may be performed.

In the present embodiment, when the state of DCM is determined, the control to increase the ON-time is performed at the time delayed by the predetermined period of time, or when the state of CCM is determined, the control to decrease the ON-time is performed at the time of the next slot allocation. When the state of CCM is determined, the ON-time is decreased at an earlier time, and thereby, it is possible to avoid the situation that cross regulation occurs. That is, the control to decrease the ON-time according to the determination of the state of CCM and the control to increase the ON-time according to the determination of the state of DCM are executed at different time so as to be controls in different periods of time. The control to increase the ON-time is delayed to reduce a frequency of the control of the ON-time, and hence, the circuit operation is stabilized. A configuration for adjustment of time of the control to increase the ON-time and the control to decrease the ON-time may be, for example, such that a storage circuit (not illustrated) that stores a result of detection of the state of CCM and detection of the state of DCM and the ON-time is controlled after a predetermined time based on information stored in the storage circuit.

Twenty-Seventh Embodiment

Figure 30:
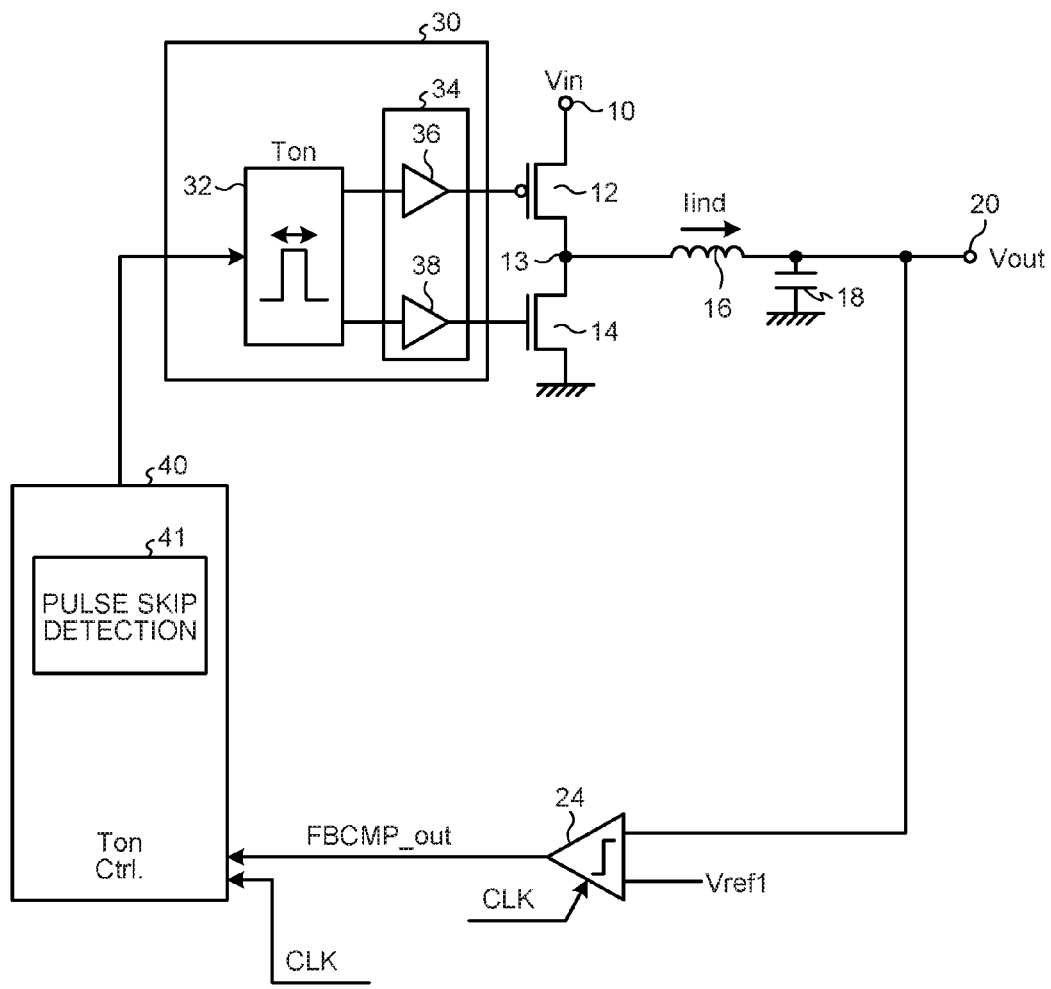
FIG. 30 is a diagram illustrating a configuration of a power supply circuit according to a twenty-seventh embodiment.

FIG. 30 is a diagram illustrating a configuration of a power supply circuit according to a twenty-seventh embodiment. Elements corresponding to those of the aforementioned embodiments are denoted by the same reference symbols. The present embodiment is set forth as an embodiment in a case of a second control mode, namely, a minimal Ton control mode. Because the second control mode is selected, a mode switching signal "mode" supplied to an ON-time control circuit 40 is omitted.

The power supply circuit according to the present embodiment includes a feedback comparator 24 that compares an output voltage Vout from an output terminal 20 with a reference voltage Vref1. An output signal FBCMP_out from the feedback comparator 24 is supplied to the ON-time control circuit 40. The ON-time control circuit 40 includes a pulse skip detection circuit 41 that detects the output signal FBCMP_out from the feedback comparator 24 and detects presence or absence of a pulse skip. The feedback comparator 24 outputs the output signal FBCMP_out at High level, for example, when the output voltage Vout is lower than the reference voltage Vref1.

Twenty-Eighth Embodiment

Figure 31:
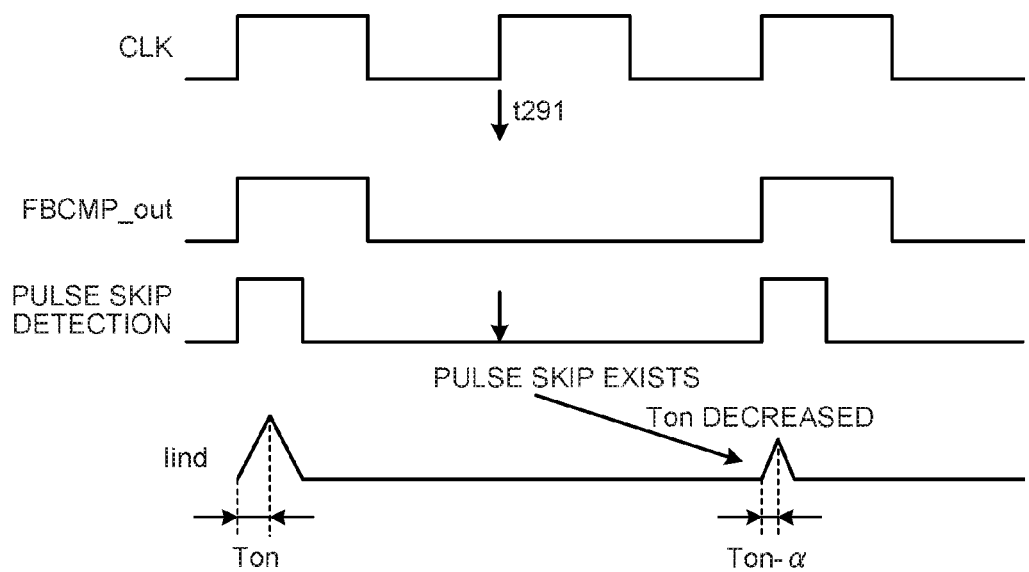
FIG. 31 is a diagram illustrating a control method for the power supply circuit according to a twenty-eighth embodiment.

FIG. 31 is a diagram illustrating an embodiment of a control method for the power supply circuit in the aforementioned seventy-seventh embodiment. In the present embodiment, the output signal FBCMP_out from the feedback comparator 24 is detected in synchronization with a clock signal CLK. In the situation that the output signal FBCMP_out from the feedback comparator 24 is not detected, namely, in a case of a pulse skip, a control to decrease the ON-time is performed. For example, a control to decrease the ON-time down up to Ton−α (Ton minus alpha) is performed. Because a pulse skip occurs on a condition that electric charge supplied by one pulse is greater than electric charge consumed in one clock interval, the ON-time is decreased to reduce inductor current Iind and thereby reduce the electric charge supplied by one pulse, so that it is possible to be coincident with the electric charge consumed in one clock interval. Also, the ON-time is decreased to avoid a pulse skip, and thereby, it is possible to execute a control for causing a switching frequency of a switching transistor to be coincident with a frequency of the clock signal CLK.

Twenty-Ninth Embodiment

Figure 32:
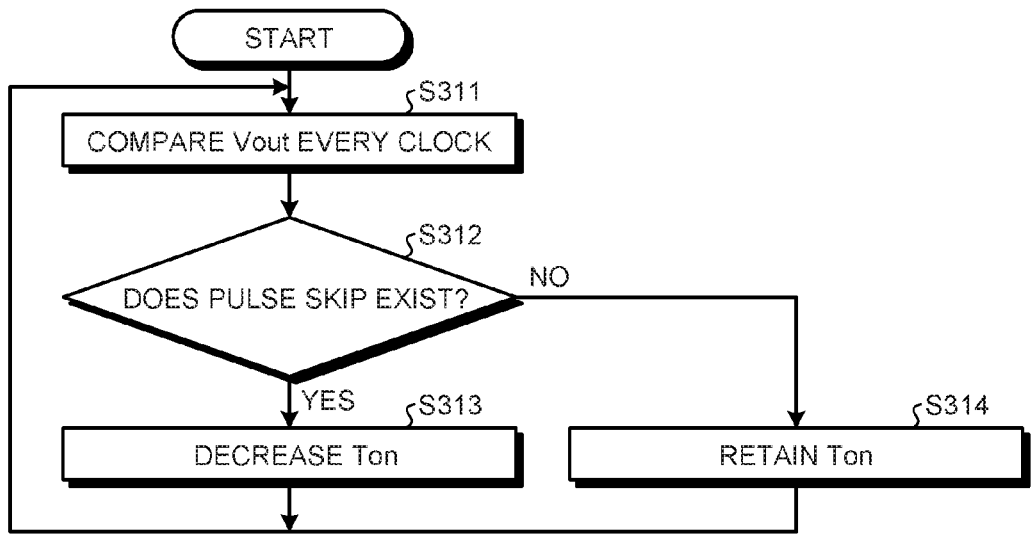
FIG. 32 is a diagram illustrating a control method for the power supply circuit according to a twenty-ninth embodiment.

FIG. 32 is a diagram illustrating a flow of a control method for the power supply circuit. An output voltage Vout is compared with a reference voltage Vout in synchronization with a clock signal CLK (S311). It is checked whether or not a pulse skip exists (S312). When the pulse skip exists, namely, when an output signal FBCMP_out from a feedback comparator 24 is not detected, the ON-time is decreased (S313). This is because the output voltage Vout retains its state at a high level and hence the output voltage Vout is reduced to provide a state free from pulse skip. When no pulse skip exists, the ON-time is not adjusted, so that the same ON-time is retained (S314).

In the present embodiment, the control to adjust the ON-time is executed by detecting whether or not a pulse skip exists. Control is executed to provide a state free from pulse skip, control of the output voltage Vout in a minimal Ton control mode can be executed where switching transistors execute switching operations at a frequency coincident with a frequency of the clock signal to charge a capacitor 18.

Thirtieth Embodiment

Figure 33:
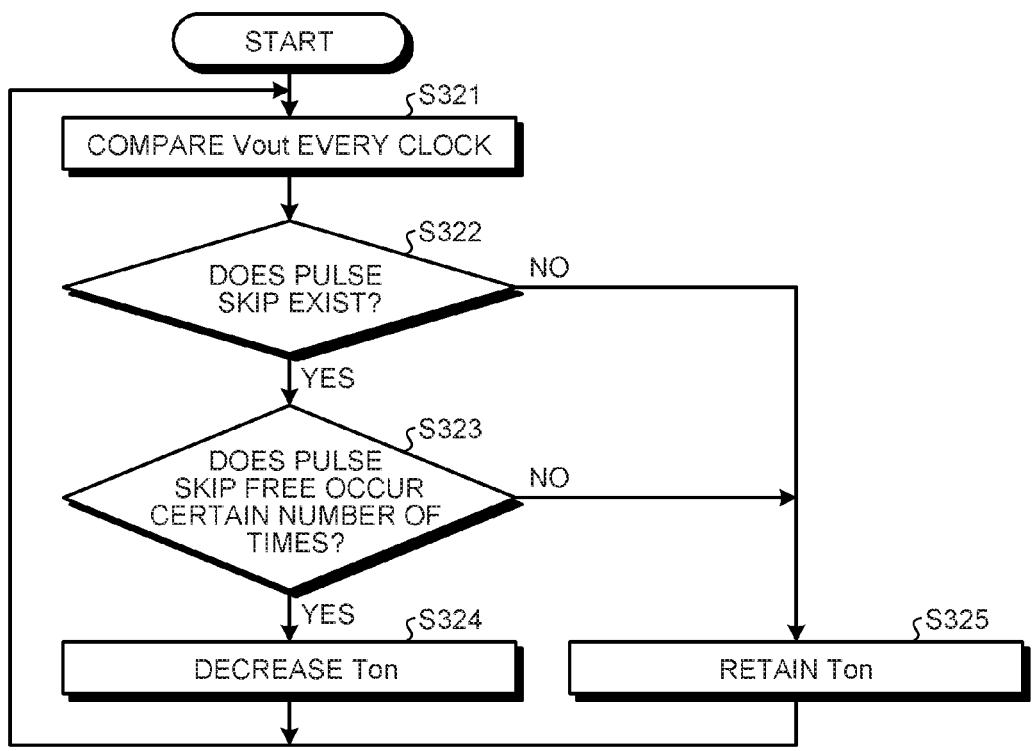
FIG. 33 is a diagram illustrating a control method for the power supply circuit according to a thirtieth embodiment.

FIG. 33 is a diagram illustrating a flow of another control method for the power supply circuit. An output voltage Vout is compared with a reference voltage Vref in synchronization with a clock signal CLK (S321). It is checked whether or not a pulse skip exists (S322). When the pulse skip exists, it is determined whether or not the pulse skip occurs consecutively (S323). When the pulse skip occurs consecutively, a control to decrease the ON-time is performed (S324). When the pulse skip does not consecutively occur, the ON-time is not adjusted, so that the current ON-time is retained (S325). When no pulse skip exists, namely, when an output signal FBCMP_out from a feedback comparator 24 is detected in synchronization with a clock signal CLK, the current ON-time is also retained (S325).

In the present embodiment, it is determined whether or not pulse skip occurs consecutively, and when the pulse skip occurs consecutively, a control to decrease the ON-time is performed. Control to adjust the ON-time at every occurrence of the pulse skip is not provided but control to adjust the ON-time only when the pulse skip occurs consecutively is provided, so that it is possible to reduce the frequency of the control and stabilize the circuit operation.

Thirty-First Embodiment

Figure 34:
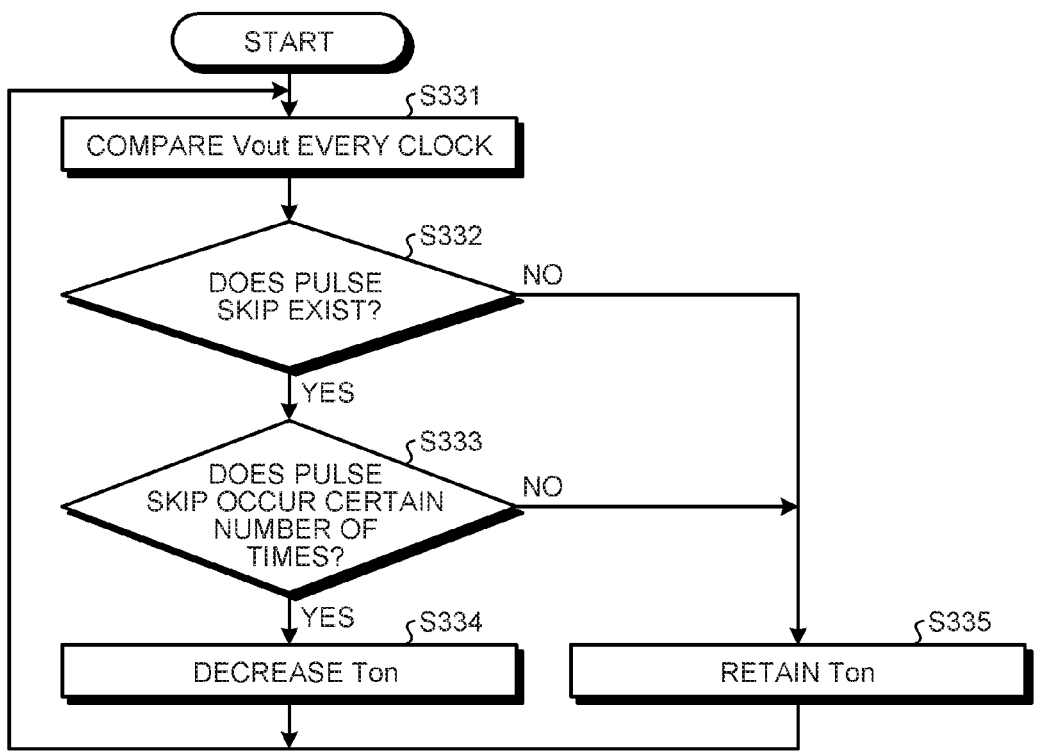
FIG. 34 is a diagram illustrating a control method for the power supply circuit according to a thirty-first embodiment.

FIG. 34 is a diagram illustrating a flow of another control method for the power supply circuit. An output voltage Vout is compared with a reference voltage Vref in synchronization with a clock signal CLK (S331). It is determined whether or not a pulse skip exists (S332). In consecutive detection operations, it is determined whether or not a pulse skip occurs a predetermined number of times (S333). When the pulse skip occurs the predetermined number of times in consecutive detection operations, the ON-time is decreased (S334). For example, the ON-time is decreased when the pulse skip is detected N times in M consecutive detection operations. M and N can be set arbitrarily. When the pulse skip does not occur the predetermined number of times, the current ON-time is retained (S335). When no pulse skip occurs, the current ON-time is also retained (S335).

In the present embodiment, in consecutive detection operations, when the pulse skip occurs a predetermined number of times, a control to decrease the ON-time is performed. Control to adjust the ON-time at every occurrence of the pulse skip is not provided but control to adjust the ON-time only when the pulse skip occurs the predetermined number of times in the consecutive detection operations carried out a predetermined number of times is provided, so that it is possible to reduce the frequency of the ON-time control and stabilize the circuit operation.

Thirty-Second Embodiment

Figure 35:
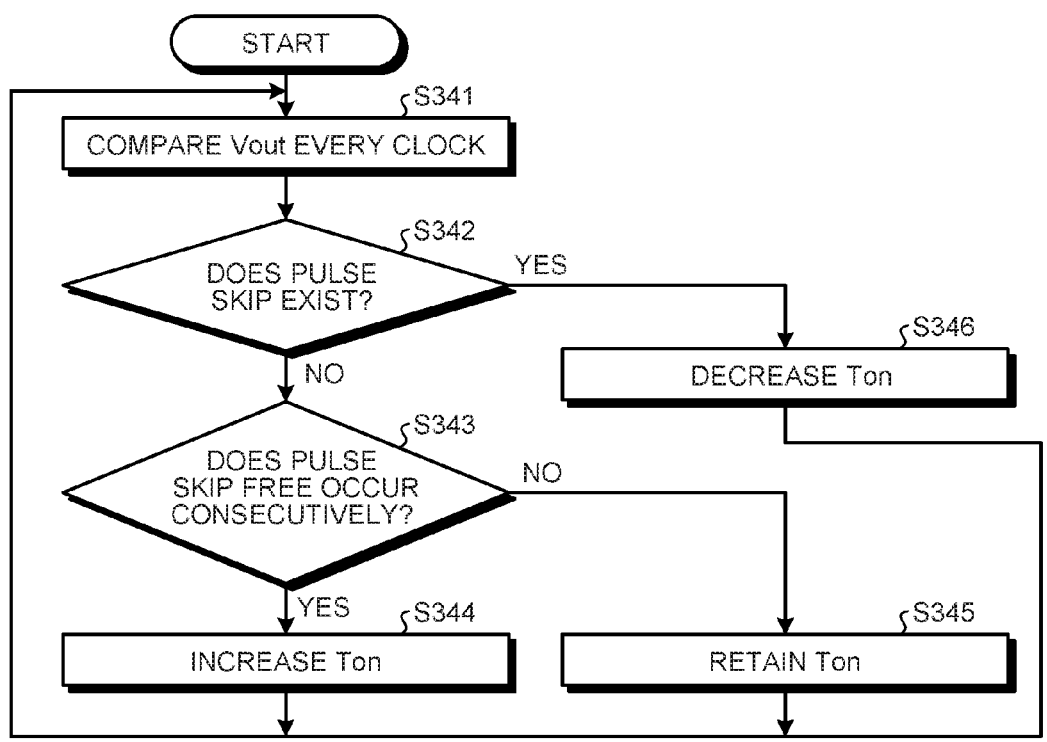
FIG. 35 is a diagram illustrating a control method for the power supply circuit according to a thirty-second embodiment.

FIG. 35 is a diagram illustrating a flow of another control method for the power supply circuit. An output voltage Vout is compared with a reference voltage Vref in synchronization with a clock signal CLK (S341). It is determined whether or not a pulse skip exists (S342). It is determined whether or not a pulse-skip-free state occurs consecutively (S343). When the pulse-skip-free state occurs consecutively, the ON-time is increased (S344). When the pulse-skip-free state does not consecutively occur, the ON-time is not adjusted, so that the current ON-time is retained (S345). When the pulse skip occurs, the ON-time is decreased (S346).

In the present embodiment, when the pulse-skip-free state occurs consecutively, a control to increase the ON-time is performed. When the pulse-skip-free state occurs consecutively, an amount of current supplied to the channel may be insufficient, and therefore, the ON-time is increased to supplement current so that reduction of the output voltage Vout can be suppressed.

Thirty-Third Embodiment

Figure 36:
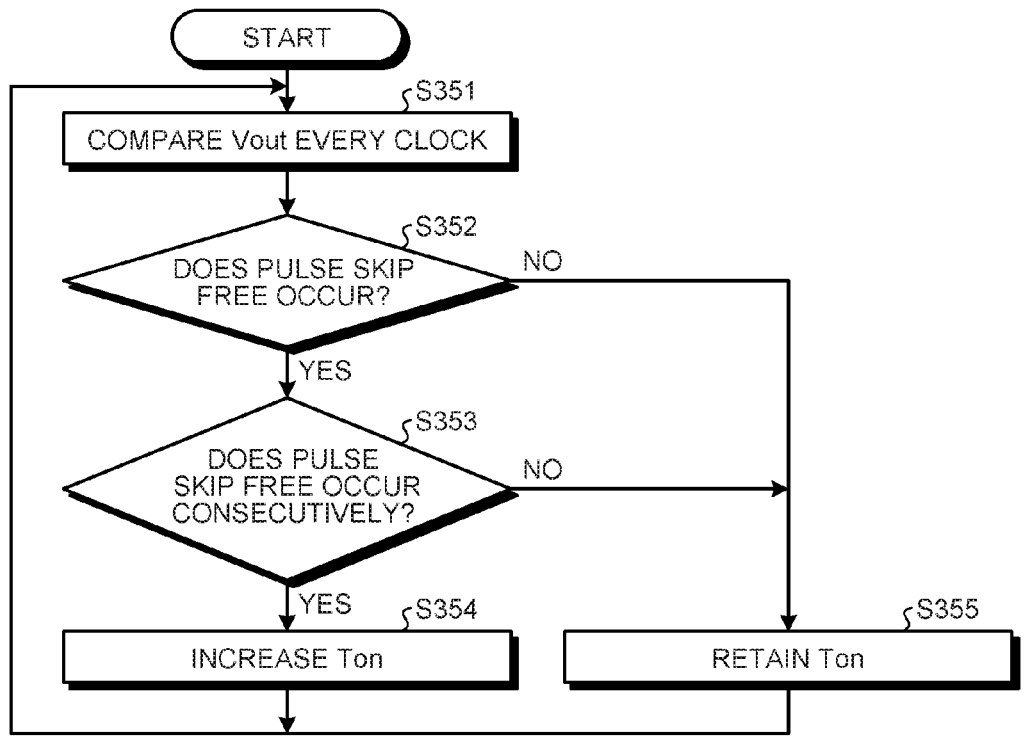
FIG. 36 is a diagram illustrating a control method for the power supply circuit according to a thirty-third embodiment.

FIG. 36 is a diagram illustrating a flow of another control method for the power supply circuit. An output voltage Vout is compared with a reference voltage Vref in synchronization with a clock signal CLK (S351). It is determined whether or not a pulse skip exists (S352). When no pulse skip exists, it is determined whether or not a pulse-skip-free state consecutively occurs (S353). When a pulse-skip-free state occurs consecutively, the ON-time is increased (S354). When a pulse-skip-free state does not consecutively occur, the ON-time is not adjusted, so that the current ON-time is retained (S355).

In the present embodiment, when the pulse-skip-free state occurs consecutively, a control to increase the ON-time is performed. When the pulse-skip-free state occurs consecutively, an amount of current supplied to the channel may be insufficient, and therefore, the ON-time is increased to supplement current so that reduction of the output voltage Vout can be suppressed.

Thirty-Fourth Embodiment

Figure 37:
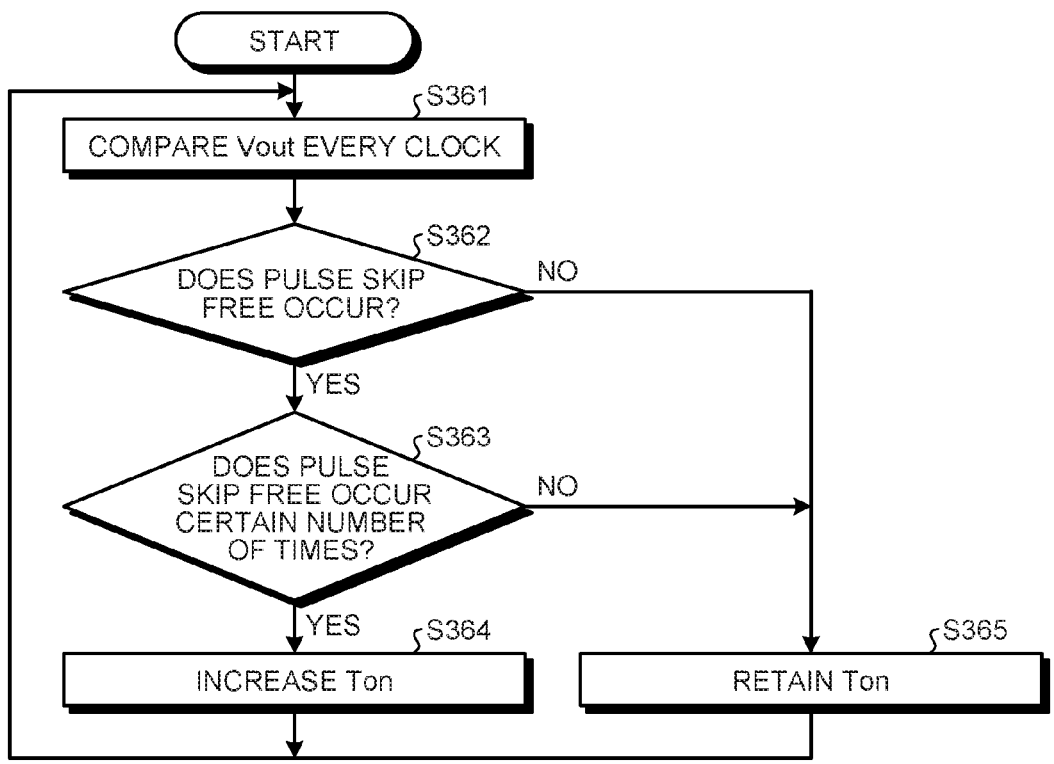
FIG. 37 is a diagram illustrating a control method for the power supply circuit according to a thirty-fourth embodiment.

FIG. 37 is a diagram illustrating a flow of another control method for the power supply circuit. An output voltage Vout is compared with a reference voltage Vref in synchronization with a clock signal CLK (S361). It is determined whether or not a pulse skip exists (S362). When a pulse-skip-free state is provided, it is determined whether or not the pulse-skip-free state occurs a certain number of times (S363). When the pulse-skip-free state occurs the certain number of times, the ON-time is increased (S364). When no pulse-skip-free state occurs, the ON-time is not adjusted, so that the current ON-time is retained (S365).

In the present embodiment, when the pulse-skip-free state occurs the certain number of times, a control to increase the ON-time is performed. When the pulse-skip-free state occurs the certain number of times, an amount of current supplied to the channel may be insufficient, and therefore, the ON-time is increased to supplement current so that reduction of the output voltage Vout can be suppressed. When the pulse skip exists, or when the pulse skip occurs consecutively or the certain number of times, a control in combination with the control to decrease the ON-time can also be performed.

Thirty-Fifth Embodiment

Figure 38:
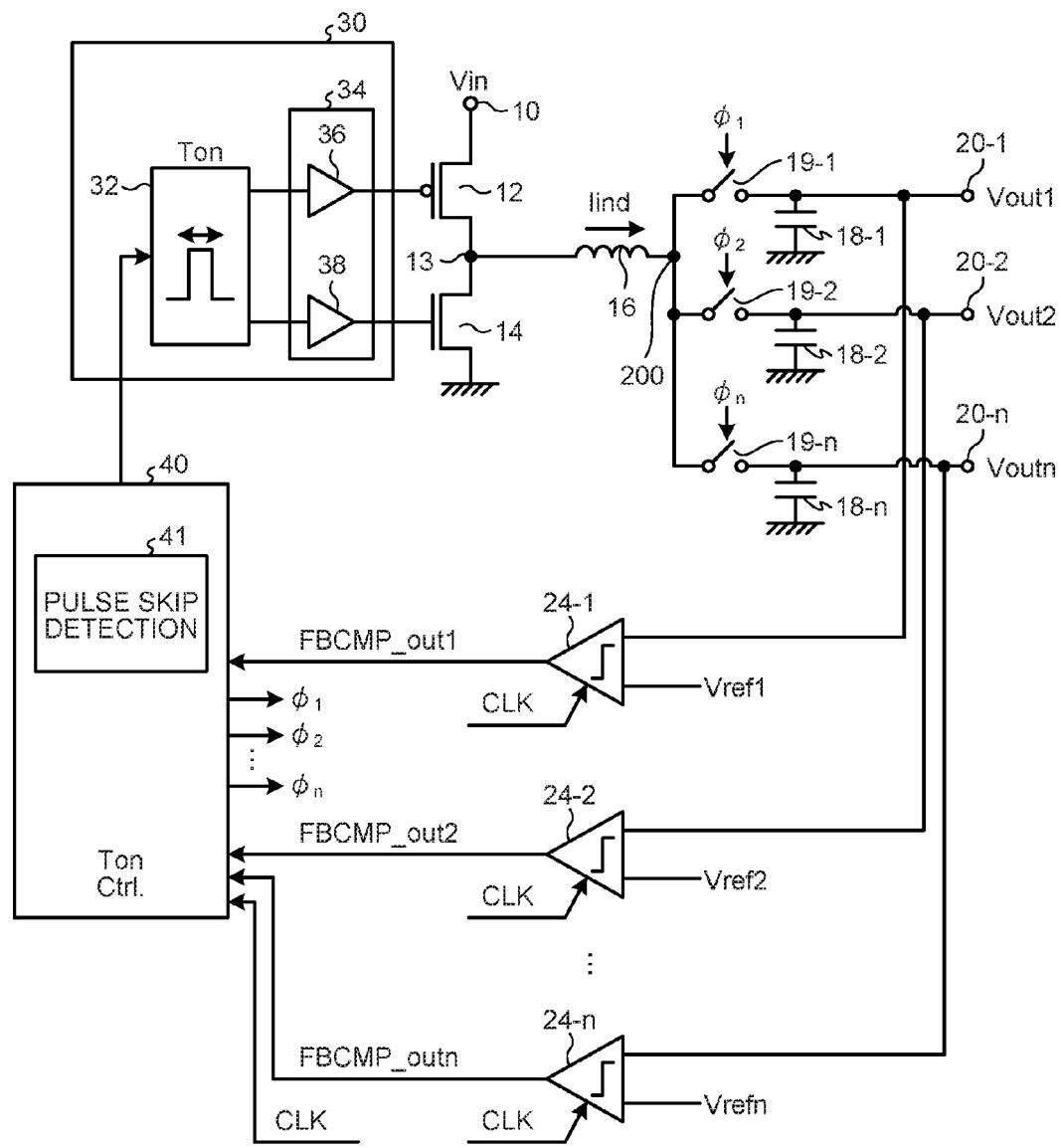
FIG. 38 is a diagram illustrating a configuration of a power supply circuit according to a thirty-fifth embodiment.

FIG. 38 is a diagram illustrating a configuration of a power supply circuit according to a thirty-fifth embodiment. Elements corresponding to those of the aforementioned embodiments are denoted by the same reference symbols. In the present embodiment, one end 200 of an inductor 16 is time-divisionally connected to a plurality of output terminals (20-1 to 20-n). That is, the output terminals 20-1 to 20-n are connected to the inductor 16 when switches 19-1 to 19-n are turned on. The switches 19-1 to 19-n are controlled to be turned on/off by slot allocation signals φ1 to φn supplied thereto. The output terminals 20-1 to 20-n supply their respective loads (not illustrated) with independent output voltages Vout1 to Voutn, respectively.

Feedback comparators 24-1 to 24-n are included that compares output voltages Vout1 to Voutn with reference voltages Vref1 to Vrefn in synchronization with a clock signal CLK. The feedback comparators output output signals FBCMP_out1 to FBCMP_outn dependent on results of the comparison of the output voltages Vout1 to Voutn with the reference voltages Vref1 to Vrefn and supply them to an ON-time control circuit 40.

The power supply circuit according to the present embodiment is configured to be a SIMO power supply that supplies independent output voltages Vout1 to Voutn from a plurality of output terminals 20-1 to 20-n that are time-divisionally connected to a common inductor 16. It is determined whether or not pulse skip exists, by output signals FBCMP_out1 to FBCMP_outn that represent the results of the comparison of the output voltages Vout1 to Voutn with the reference voltages Vref1 to Vrefn in the respective channels on the condition that slot allocation signals φ1 to φn are supplied, and the ON-time at time of slot allocation to the channels is controlled by using the aforementioned control method. Due to this control, the output voltage Vout1 to Voutn can be controlled in a minimal Ton control mode in the SIMO power supply circuit.

Thirty-Sixth Embodiment

Figure 39:
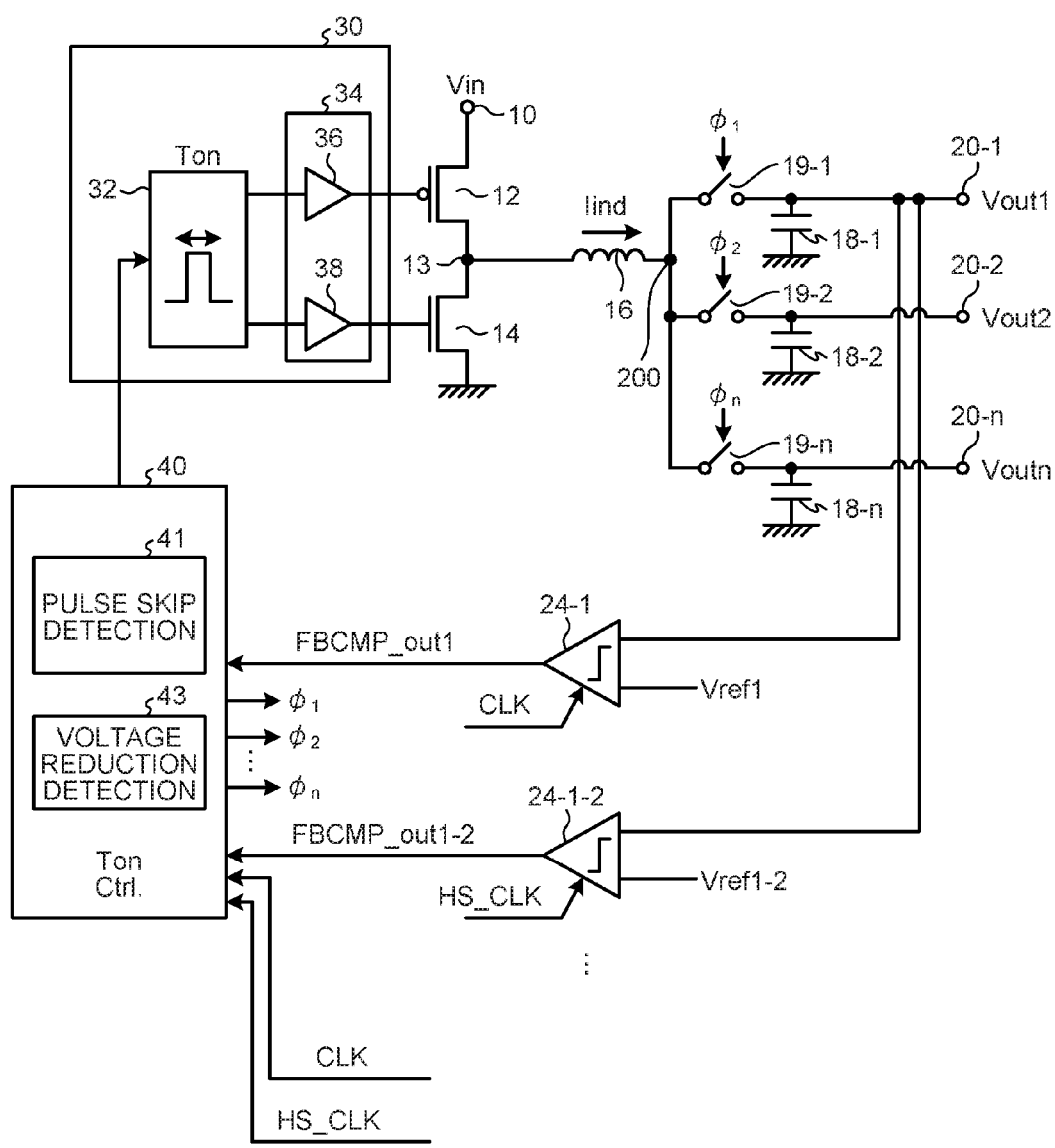
FIG. 39 is a diagram illustrating a configuration of a power supply circuit according to a thirty-sixth embodiment.

FIG. 39 is a diagram illustrating a configuration of a power supply circuit according to a thirty-sixth embodiment. Elements corresponding to those of the aforementioned embodiments are denoted by the same reference symbols. In the present embodiment, a feedback comparator 24-1 that compares an output voltage Vout1 at an output terminal 20-1 with a reference voltage Vref1 in synchronization with a clock signal CLK, and additionally, a second feedback comparator 24-1-2 that compares the output voltage Vout1 with a reference voltage Vref1-2 in synchronization with a high-speed clock signal HS_CLK are included. For example, the reference voltage Vref1-2 is set to be a value lower than the reference voltage Vref1. The high-speed clock signal HS_CLK has a frequency higher than that of the clock signal CLK. Similarly, two feedback comparators, which are omitted, are connected to the other output terminals 20-2 to 20-n.

In the power supply circuit according to the present embodiment, it is determined whether or not pulse skip exists by detecting an output signal FBCMP_out1 from the feedback comparator 24-1. It is determined whether or not the output voltage Vout1 is lower than the reference voltage Vref1-2 by detecting an output signal FBCMP_out1-2 from a second feedback comparator 24-1-2 to which the high-speed clock signal HS_CLK is applied. That is, in addition to determination of presence or absence of pulse skip, a degree of reduction of the output voltage Vout1 is detected. For example, even when no pulse skip exists, a control to increase the ON-time is executed so that an amount of supplied inductor current Iind is increased to raise the output voltage Vout1, when the output voltage Vout1 is lower than the reference voltage Vref1-2.

In the present embodiment, even when no pulse skip occurs, it is possible to perform the control to increase the ON-time on a channel when reduction of the output voltage Vout is great, and hence, it is possible to rapidly address a variation in a load on each channel.

Thirty-Seventh Embodiment

Figure 40:
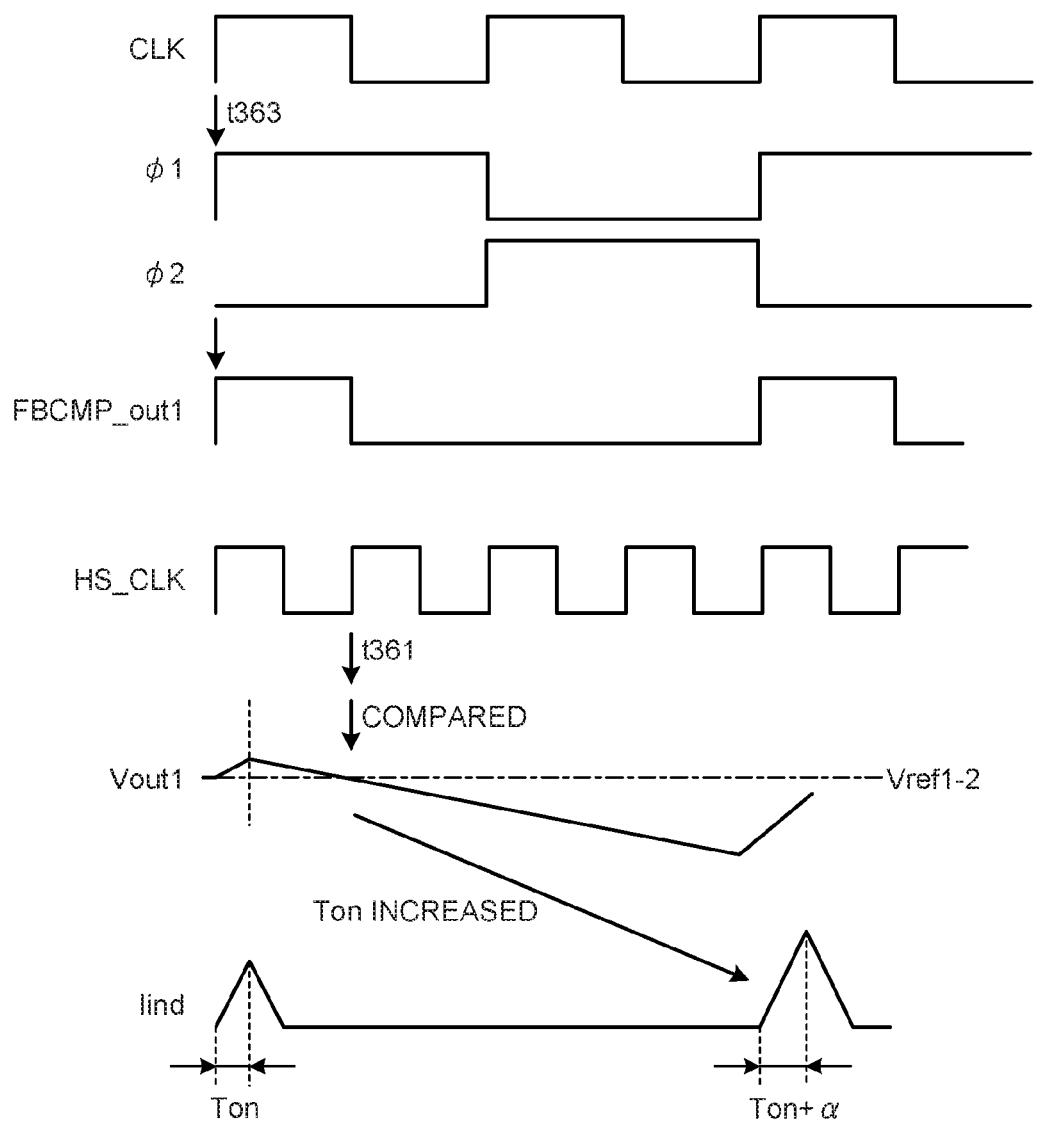
FIG. 40 is a diagram illustrating a control method for the power supply circuit according to a thirty-seventh embodiment.

FIG. 40 is a diagram illustrating an embodiment of a control method for the power supply circuit in the aforementioned thirty-sixth embodiment. Slot allocation signals φ1 and φ2 are produced from a clock signal CLK. An output signal FBCMP_out1 from a feedback comparator 24-1 is detected in synchronization with the clock signal CLK. In a case illustrated in FIG. 40, the output signal FBCMP_out1 from the feedback comparator 24-1 exists at time t363 of rise of the slot allocation signal φ1, and hence, a state free from pulse skip is illustrated.

A second feedback comparator 24-1-2 compares an output voltage Vout1 with a reference voltage Vref1-2 in synchronization with a high-speed clock signal HS_CLK. At time t361 of the high-speed clock signal HS_CLK, the output voltage Vout1 is lower the reference voltage Vref1-2. That is, reduction of the output voltage Vout is caused. Hence, a control to increase the ON-time up to Ton+α is performed.

In the control method according to the present embodiment, in addition to determination of presence or absence of pulse skip, a degree of reduction of the output voltage Vout is detected. When the reduction of the output voltage Vout is great, a control to increase the ON-time and thereby raise the output voltage Vout is executed so that it is possible to rapidly address a variation in a load, even when no pulse skip exists.

Thirty-Eighth Embodiment

Figure 41:
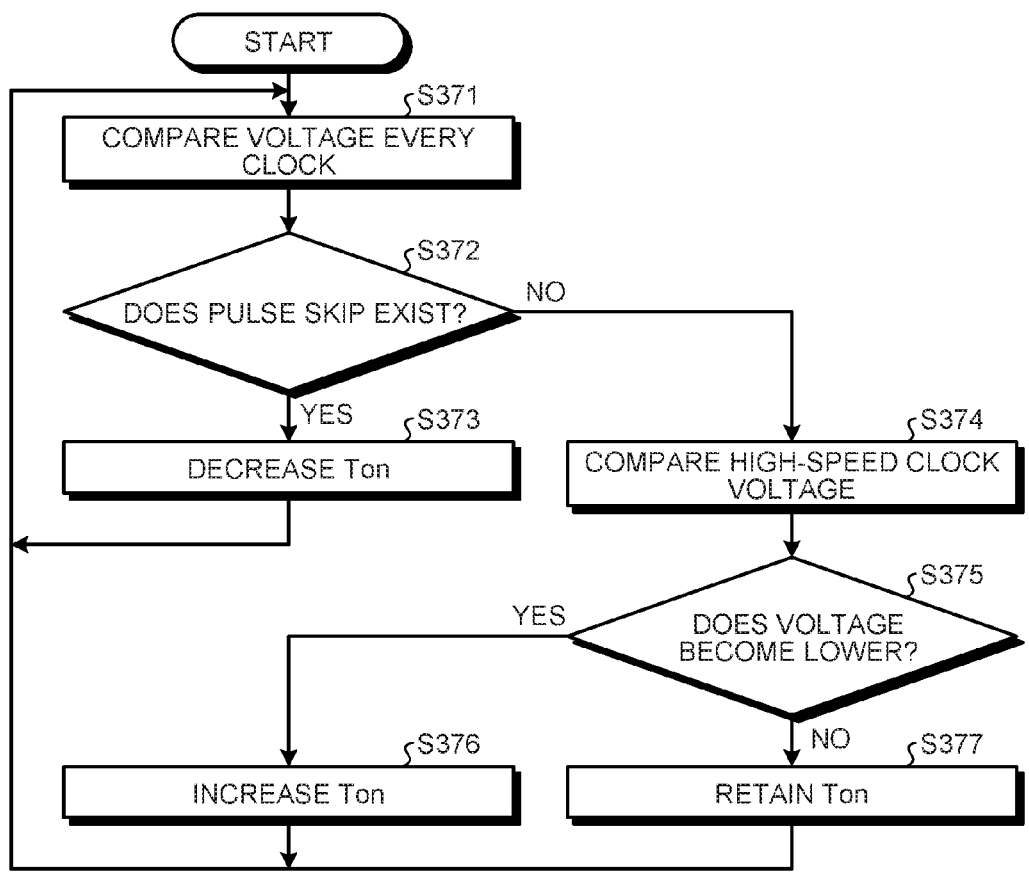
FIG. 41 is a diagram illustrating a control method for the power supply circuit according to a thirty-eighth embodiment.

FIG. 41 is a diagram illustrating a flow of a control method according to a thirty-eighth embodiment. A feedback comparator 24-1 compares an output voltage Vout1 with a reference voltage Vref1 in synchronization with a clock signal (S371). An output signal FBCMP_out1 from the feedback comparator 24-1 is detected so as to detect whether or not pulse skip exits (S372). When the pulse skip exists, the ON-time is decreased (S373).

When no pulse skip exists, the output voltage Vout1 is compared with a reference voltage Vref1-2 in synchronization with a high-speed clock signal HS_CLK (S374). It is determined whether or not the output voltage Vout1 is lower than the reference voltage Vref1-2 (S375). When the output voltage Vout1 is lower than the reference voltage Vref1-2, the ON-time is increased (S376). When there is no reduction of the output voltage Vout1 as being less than the reference voltage Vref1-2, the ON-time is not adjusted, so that Ton is retained (S377)

In the control method according to the present embodiment, in addition to determination of presence or absence of the pulse skip, a degree of reduction of the output voltage Vout is detected. When the reduction of the output voltage Vout is great, a control to increase the ON-time and thereby raise the output voltage Vout is executed so that it is possible to rapidly address a variation in a load even when no pulse skip exists.

Thirty-Ninth Embodiment

Figure 42:
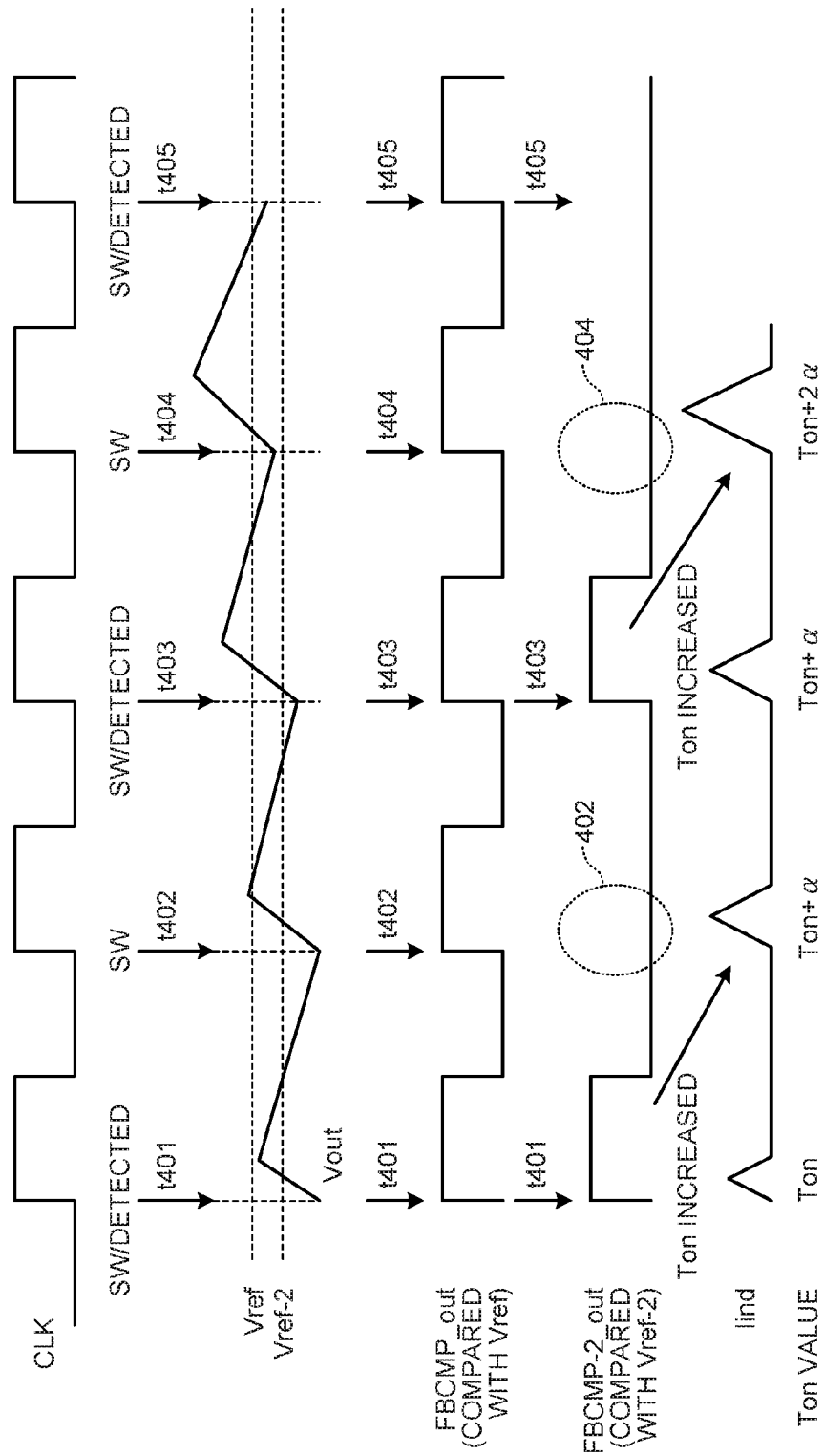
FIG. 42 is a diagram illustrating a control method for the power supply circuit according to a thirty-ninth embodiment.

FIG. 42 is a diagram illustrating a control method for the power supply circuit according to a thirty-ninth embodiment. The control method of the present embodiment is achieved, for example, by the configuration of the single-channel power supply circuit illustrated in FIG. 1, wherein the configuration includes a first feedback comparator 24-1 with one input terminal connected to a common output terminal 20-1 and the other input terminal to which a first reference voltage Vref-1 is applied, and a second feedback comparator 24-1-2 with one input terminal connected to the output terminal 20-1 and the other input terminal to which a second reference voltage Vref-2 is applied, like the configuration of the power supply circuit illustrated in FIG. 39. For example, the first reference voltage Vref is set at a voltage higher than the second reference voltage Vref-2.

At times t401 to t405 of rise of a clock signal CLK applied to the first and second feedback comparators 24-1 and 24-1-2, the first feedback comparator 24-1 compares the output voltage Vout with the first reference voltage Vref. When the output voltage Vout is lower than the first reference voltage Vref, a driving signal to drive a PMOS switching transistor 12 is produced. In an example illustrated in the drawing, the output voltage Vout is lower than the reference voltage Vref at each of times t401 to t405, and hence, the driving signal to drive the PMOS transistor 12 is produced.

At times t401, t403, and t405 of rise of the clock signal CLK, the second feedback comparator 24-1-2 compares the output voltage Vout with the second reference voltage Vref-2. For example, when the output voltage Vout is lower than the second reference voltage Vref-2, an output signal FBCMP-2_out at High level is output. In response to the output signal FBCMP-2_out at High level, the ON-time control circuit 40 performs a control to increase the ON-time from Ton to Ton+α.

At time t402 and time t404 of rise of the clock signal CLK, an operation of comparison of the output voltage Vout with the second reference voltage Vref-2 is not executed by the second feedback comparator 24-1-2. For example, at time t402 and time t404, control not to supply the clock signal CLK to the second feedback comparator is executed, and thereby, the operation of the second feedback comparator 24-1-2 can be stopped.

At time t403 of the clock signal CLK, the output voltage Vout is compared with the reference voltage Vref-2. When the output voltage Vout is lower than the second reference voltage Vref-2, an output signal FBCMP-2_out at High level is output. The ON-time control circuit 40 executes control to increase the ON-time from Ton+α to Ton+2α.

In the control method for the power supply circuit according to the present embodiment, the two feedback comparators with one input terminal connected to the common output terminal are provided, and whether or not the driving signal is supplied to the PMOS switching transistor 12 is determined by an output signal from one of the feedback comparators, wherein, for example, a control to adjust the ON-time is performed by the output signal from the second feedback comparator that compares the output voltage Vout with the second reference voltage that is lower. An operation of the second feedback comparator to adjust the ON-time is not an operation in synchronization with every rise of the clock signal CLK but is, for example, a comparison operation once every two, and thereby, it is possible to reduce power consumption of the feedback comparators. Also, the number of times of the ON-time control is reduced, and thereby, it is possible to stabilize the circuit operation stable.

Fortieth Embodiment

Figure 43:
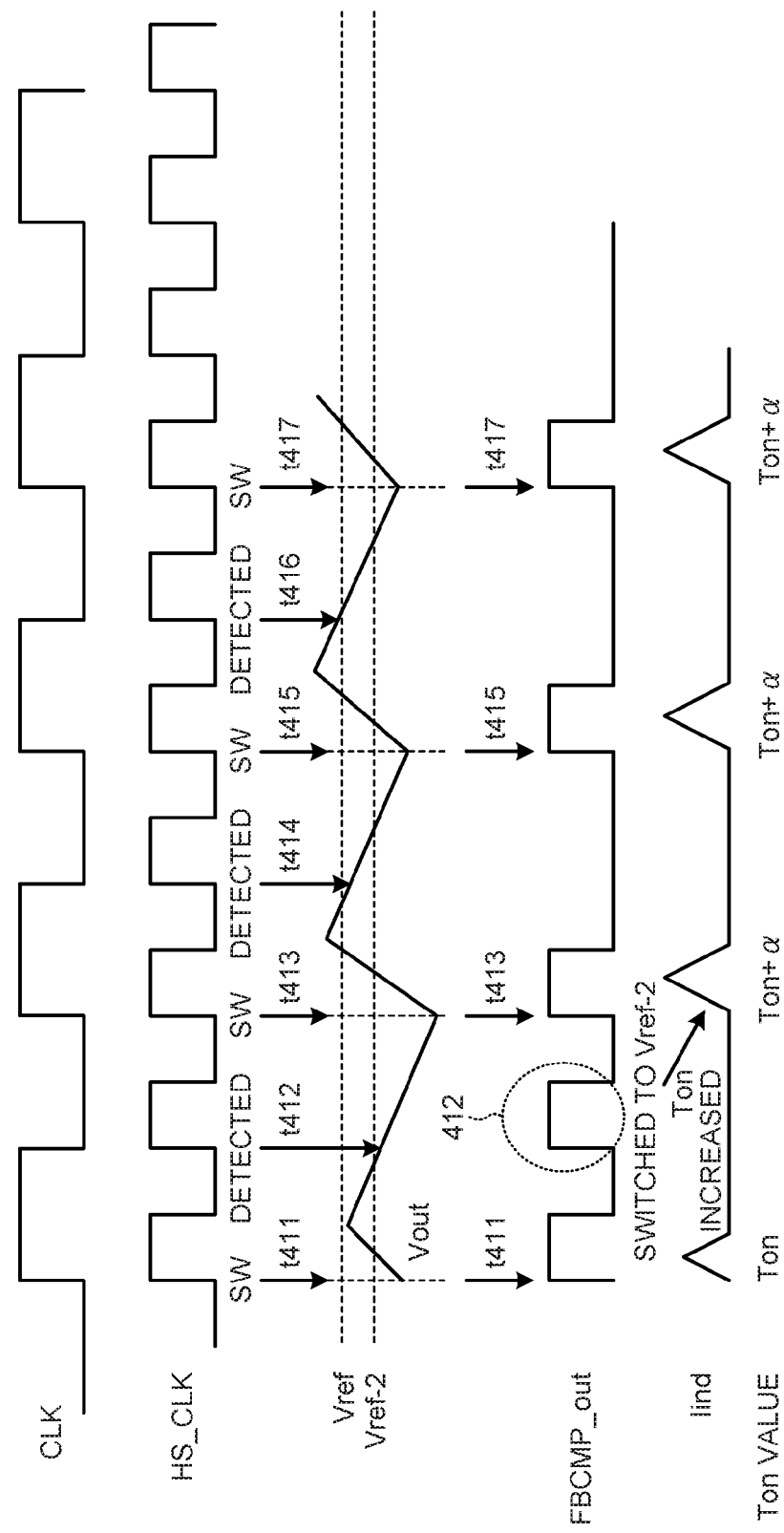
FIG. 43 is a diagram illustrating a control method for the power supply circuit according to a fortieth embodiment.

FIG. 43 is a diagram illustrating a control method for the power supply circuit according to a fortieth embodiment. The control method of the present embodiment is achieved by, for example, the configuration of the single-channel power supply circuit illustrated in FIG. 1, wherein the configuration includes a feedback comparator 24 with one input terminal connected to an output terminal 20 and the other input terminal to which a first reference voltage Vref-1 and a second reference voltage Vref-2 are switched to be supplied. For example, the second reference voltage Vref-2 is set at a voltage lower than the first reference voltage Vref.

At times t411, t413, t415, and t417 of alternate rise of a high-speed clock signal HS_CLK supplied to the feedback comparator 24, an output voltage Vout is compared with the first reference voltage Vref by the feedback comparator 24. When the output voltage Vout is lower than the first reference voltage Vref, a driving signal to drive a PMOS switching transistor 12 is produced. In an example illustrated in the drawing, the output voltage Vout is lower than the first reference voltage Vref at each of times t411, t413, t415, and t417, and hence, the driving signal to drive the PMOS switching transistor 12 is produced.

At times t412, t414, and t416 of another alternate rise of the high-speed clock signal HS_CLK, the reference voltage supplied to the feedback comparator 24 is switched from the first reference voltage Vref to the second reference voltage Vre-2, and then, the output voltage Vout is compared with the second reference voltage Vref-2. For example, like at time t412 of the high-speed clock signal HS_CLK, when the output voltage Vout is lower than the second reference voltage Vref-2, an output signal FBCMP_out at High level is output. In response to the output signal FBCMP_out at High level, an ON-time control circuit 40 executes control to increase the ON-time from Ton to Ton+α.

In the control method for the power supply circuit according to the present embodiment, the reference voltage supplied to one feedback comparator 24 to which the high-speed clock signal HS_CLK is supplied is alternately switched between the first reference voltage Vref and the second reference voltage Vref-2, and it is determined whether or not the driving signal is supplied to a PMOS switching transistor 12 based on the comparison of the output voltage Vout with the first reference voltage Vref, so that the ON-time can be controlled based on the comparison of the output voltage Vout with the second reference voltage Vref-2. The configuration that shares one feedback comparator is provided, so that the number of feedback comparators can be reduced, and hence, the power consumption can be reduced.

Forty-First Embodiment

Figure 44:
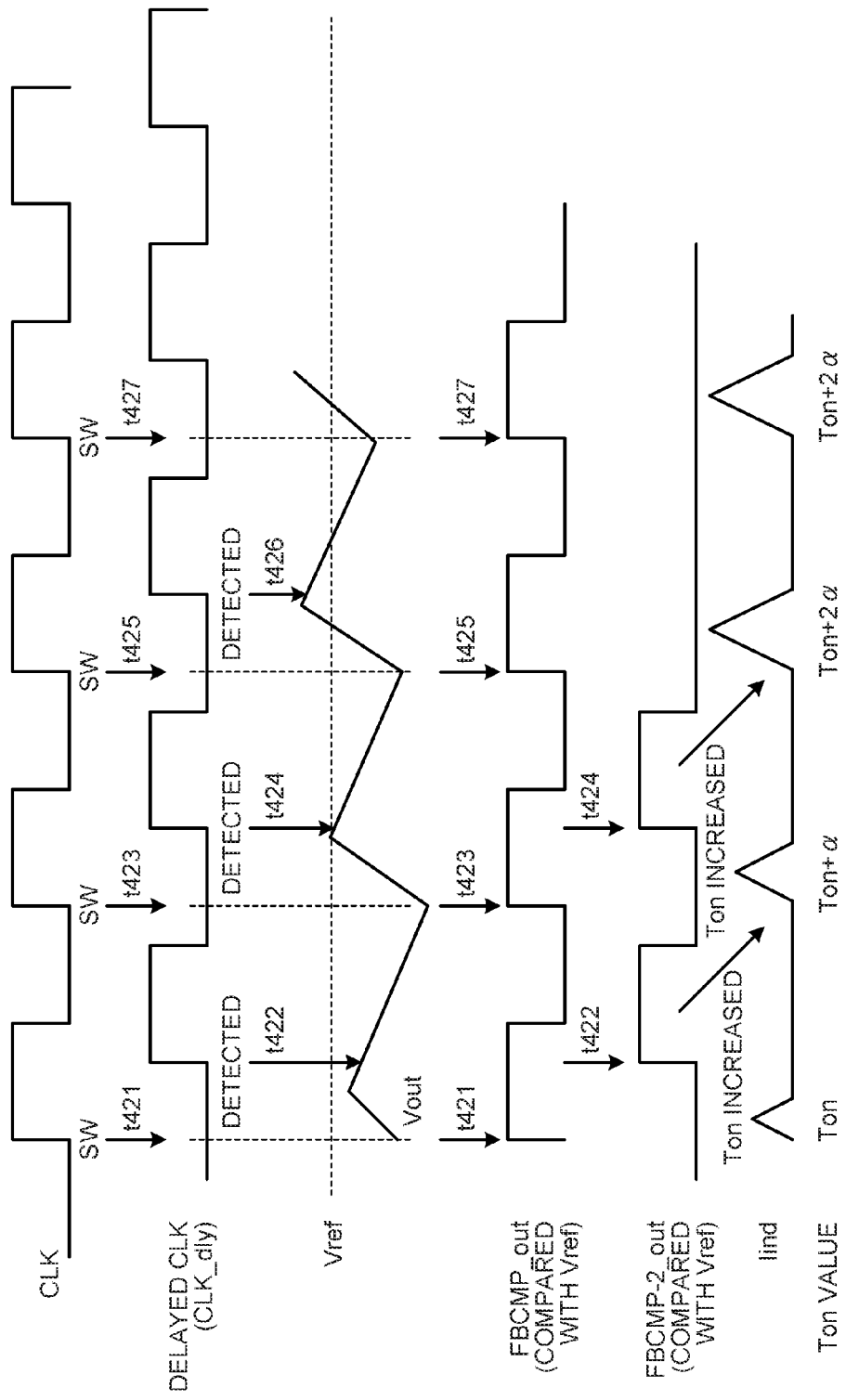
FIG. 44 is a diagram illustrating a control method for the power supply circuit according to a forty-first embodiment.

FIG. 44 is a diagram illustrating a control method for the power supply circuit according to a forty-first embodiment. The control method of the present embodiment is achieved by, for example, the configuration of the single-channel power supply circuit illustrated in FIG. 1, wherein the configuration includes a first feedback comparator 24-1 with one input terminal connected to a common output terminal 20-1 and the other input terminal to which a reference voltage Vref is applied, and a second feedback comparator 24-1-2 with one input terminal connected to the output terminal 20-1 and the other input terminal to which the reference voltage Vref is applied, like the configuration of the power supply circuit illustrated in FIG. 39. The first feedback comparator 24-1 operates in synchronization with the clock signal CLK and the second feedback comparator 24-1-2 operates in synchronization with a delayed clock signal CLK_dly that is delayed relative to the clock signal CLK.

At times t421, t423, t425, and t427 of rise of the clock siglan CLK supplied to the first feedback comparator 24-1, an output voltage Vout is compared with the reference voltage Vref by the first feedback comparator 24-1. When the output voltage Vout is lower than the reference voltage Vref, a driving signal to drive a PMOS switching transistor 12 is produced. In an example illustrated in the drawing, at times t421, t423, t425, and t427, the output voltage Vout is lower than the reference voltage Vref, and hence, the driving signal to drive the PMOS transistor 12 is produced.

At times t422, t424, and t426 of rise of the delayed clock signal CLK_dly, the output voltage Vout is compared with the reference voltage Vref by the second feedback comparator 24-1-2. When the output voltage Vout is lower than the reference voltage Vref at the time of rise of the delayed clock signal CLK_dly, an output FBCMP-2 _out at High level is output from the second feedback comparator 24-1-2, and in response to the output signal FBCMP-2_out at High level, the ON-time control circuit 40 executes a control to increase the ON-time. For example, at time t422 of the delayed clock signal CLK_dly, the output voltage Vout is lower than the reference voltage Vref, and hence, a control to increase the ON-time from Ton to Ton+α is performed. At time t424 of the delayed clock signal CLK_dly, the output voltage Vout is lower than the reference voltage Vref, and hence, the output signal FBCMP-2 _out at High level is produced from the second feedback comparator 24-1-2, and in response to the output signal FBCMP-2_out at High level, the ON-time control circuit 40 increases the ON-time to Ton+2α.

In the control method for the power supply circuit according to the present embodiment, the two feedback comparators connected to a common output terminal are provided, and control can be executed to determine whether or not the driving signal is supplied to the PMOS switching transistor 12 based the output signal from the first feedback comparator 24-1 that operates in synchronization with the clock signal CLK, compare the output voltage Vout with the reference voltage Vref at a time of the delayed clock signal CLK_dly that is delayed relative to the clock signal CLK supplied to the first feedback comparator 24-1, and detect a degree of reduction of the output voltage Vout to execute a control to adjust the ON-time. The operation of the second feedback comparator 24-1-2 to adjust the ON-time is not an operation in synchronization with every rise of the delayed clock signal CLK_dly but is, for example, a comparison operation once every two delayed clock signals CLK_dly, and thereby, it is possible to reduce the power consumption of the second feedback comparator 24-1-2. Also, the number of times of the ON-time control is reduced, and thereby, the circuit operation is stabilized.

Forty-Second Embodiment

Figure 45:
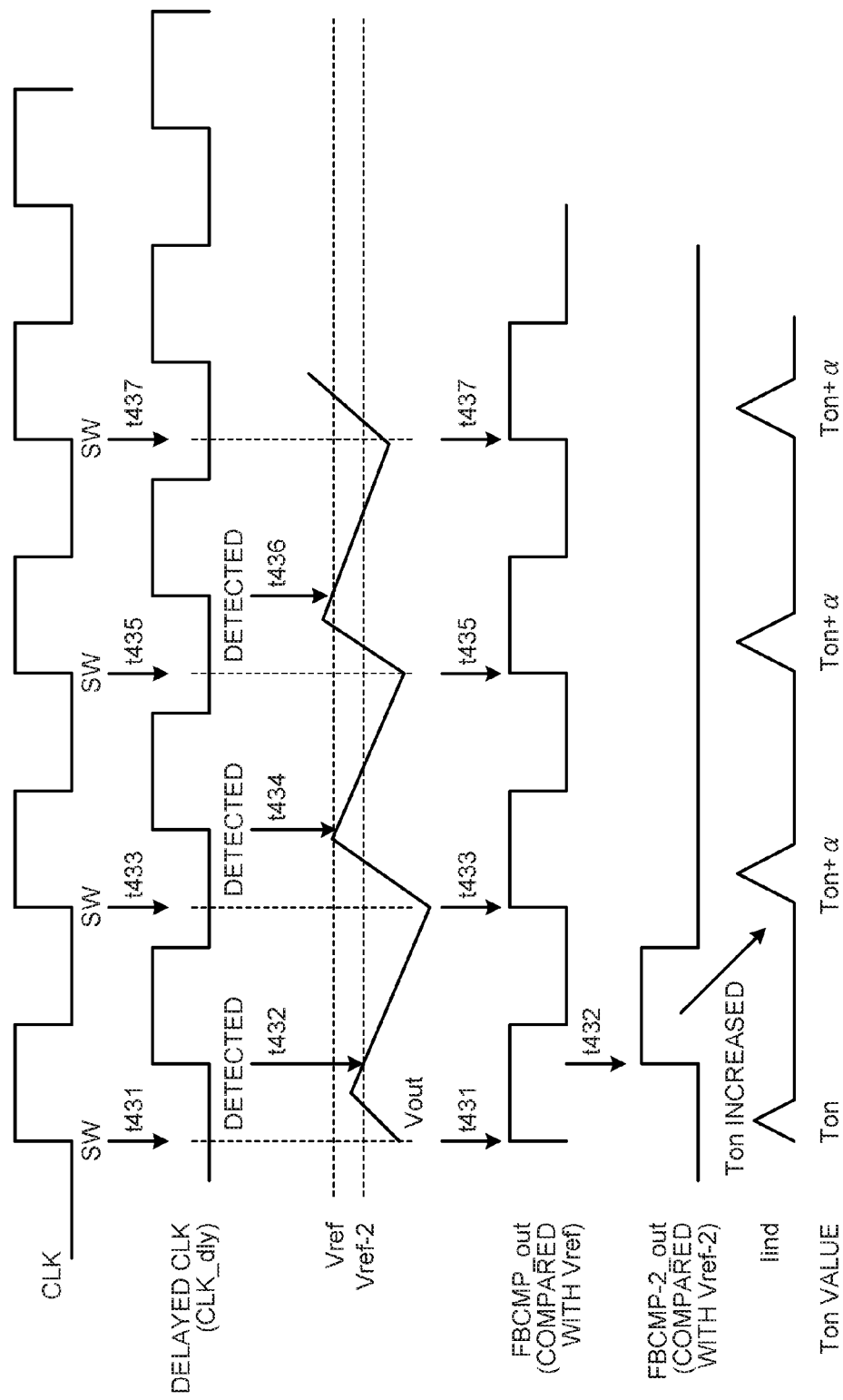
FIG. 45 is a diagram illustrating a control method for the power supply circuit according to a forty-second embodiment.

FIG. 45 is a diagram illustrating a control method for the power supply circuit according to a forty-second embodiment. The control method of the present embodiment is achieved by, for example, the configuration of the single-channel power supply circuit illustrated in FIG. 1, wherein the configuration includes a first feedback comparator 24-1 with one input terminal connected to a common output terminal 20-1 and the other input terminal to which a first reference voltage Vref is applied, and a second feedback comparator 24-1-2 with one input terminal connected to the output terminal 20-1 and the other input terminal to which a second reference voltage Vref-2 is applied, like the configuration of the power supply circuit illustrated in FIG. 39. For example, the second reference voltage Vref-2 is set at a voltage lower than the first reference voltage Vref. The first feedback comparator 24-1 operates in synchronization with a clock signal CLK and the second feedback comparator 24-1-2 operates in synchronization with a delayed clock signal CLK_dly that is delayed relative to the clock signal CLk.

At times t431, t433, t435, and t437 of rise of the clock signal CLK supplied to the first feedback comparator 24-1, an output voltage Vout is compared with the first reference voltage Vref by the first feedback comparator 24-1. When the output voltage Vout is lower than the reference voltage Vref, a driving signal to drive a PMOS switching transistor 12 is produced. In an example illustrated in the drawing, at times t431, t433, t435, and t437, the output voltage Vout is lower than the reference voltage Vref, and hence, the driving signal to drive the PMOS switching transistor 12 is produced.

At times t432, t434, and t436 of rise of the delayed clock signal CLK_dly, the output voltage Vout is compared with the reference voltage Vref-2 by the second feedback comparator 24-1-2. When the output voltage Vout is lower than the second reference voltage Vref-2 at the time of rise of the delayed clock signal CLK_dly, an output signal FBCMP-2_out at High level is output from the second feedback comparator 24-1-2, and in response to the output signal FBCMP-2_out at High level, the ON-time control circuit 40 performs a control to increase the ON-time. For example, at t432 of the delayed clock signal CLK_dly, the output voltage Vout is lower than the reference voltage Vref-2, and hence, a control to increase the ON-time from Ton to Ton+α is performed. Because at time t434 and time t436 of rise of the delayed clock signal CLK_dly, the output voltage Vout is higher than the second reference voltage Vref-2, the signal at High level is not output from the second feedback comparator 24-1-2, and hence, the ON-time Ton+α is retained.

In the control method for the power supply circuit according to the present embodiment, the two feedback comparators connected to a common output terminal are provided. A control can be executed to determine whether or not the driving signal is supplied to the PMOS switching transistor 12 based on the output signal from the first feedback comparator 24-1 that operates in synchronization with the clock signal CLK, compare the output voltage Vout with the second reference voltage Vref-2 lower than the first reference voltage Vref at the time of the delayed clock signal CLK_dly that is delayed relative to the clock signal CLK supplied to the first feedback comparator 24-1, and detect a degree of reduction of the output voltage Vout to execute a control to adjust the ON-time. An operation of the second feedback comparator 24-1-2 to adjust the ON-time is not an operation in synchronization with every rise of the delayed clock signal CLK but is, for example, a comparison operation once every two delayed clock signals CLK_dly, and thereby, it is possible to reduce power consumption of the second feedback comparator 24-1-2. Also, the number of times of the ON-time control reduced, and thereby, the circuit operation can be stabilized.

The embodiments described with reference to FIG. 42 to FIG. 45 can be applied to a SIMO power supply circuit with a plurality of output terminals.

Forty-Third Embodiment

Figure 46:
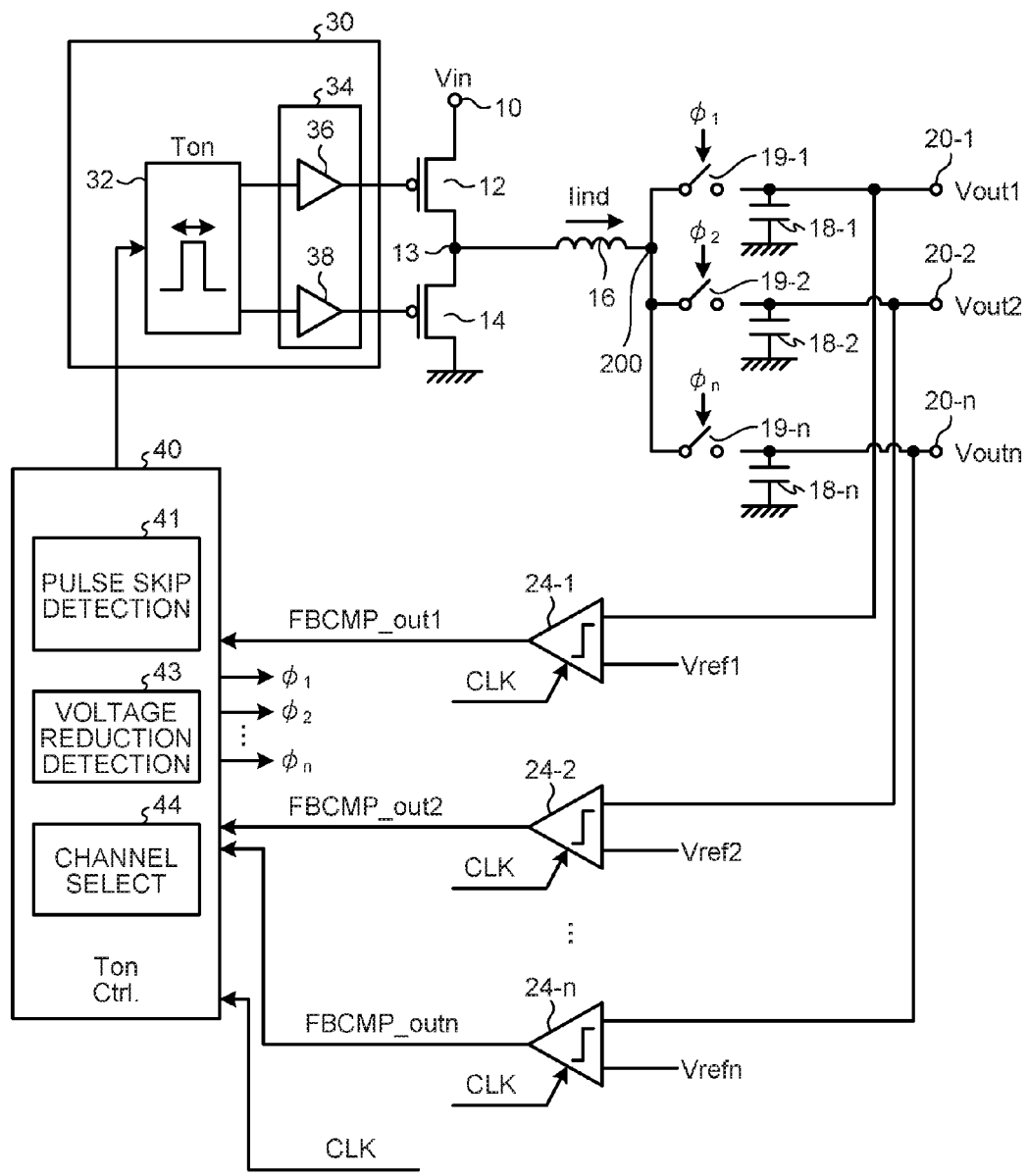
FIG. 46 is a diagram illustrating a configuration of a power supply circuit according to a forty-third embodiment.

FIG. 46 is a diagram illustrating a configuration of a power supply circuit according to a forty-third embodiment. Elements corresponding to those of the aforementioned embodiments are denoted by the same reference symbols. In the present embodiment, the ON-time control circuit 40 includes a channel selection circuit 44. The channel selection circuit 44 arbitrarily selects a channel on which an operation of comparison of output voltages Vout1 to Voutn with a reference voltage Vref is executed.

In the present embodiment, in addition to an operation for detecting whether or not a pulse skip exists based on comparison of the output voltage Vout1 to Voutn with reference voltages Vref1 to Vrefn by feedback comparators 24-1 to 24-n, the output voltages Vout1 to Voutn on the arbitrarily selected channels can be compared with the reference voltages Vref1 to Vrefn by using the feedback comparators 24-1 to 24-n at an arbitrary time. That is, a configuration is included to execute operations to detect presence or absence of a pulse skip on a selected channel and a degree of reduction of the output voltages Vout1 to Voutn in parallel. Thereby, in addition to the ON-time control based upon presence or absence of the pulse skip, an operation to adjust the ON-time on a channel in a case where reduction of the output voltages Vout1 to Voutn is detected can be executed by using the feedback comparators 24-1 to 24-n without adding a second feedback comparator 24-1-2.

Forty-Fourth Embodiment

Figure 47:
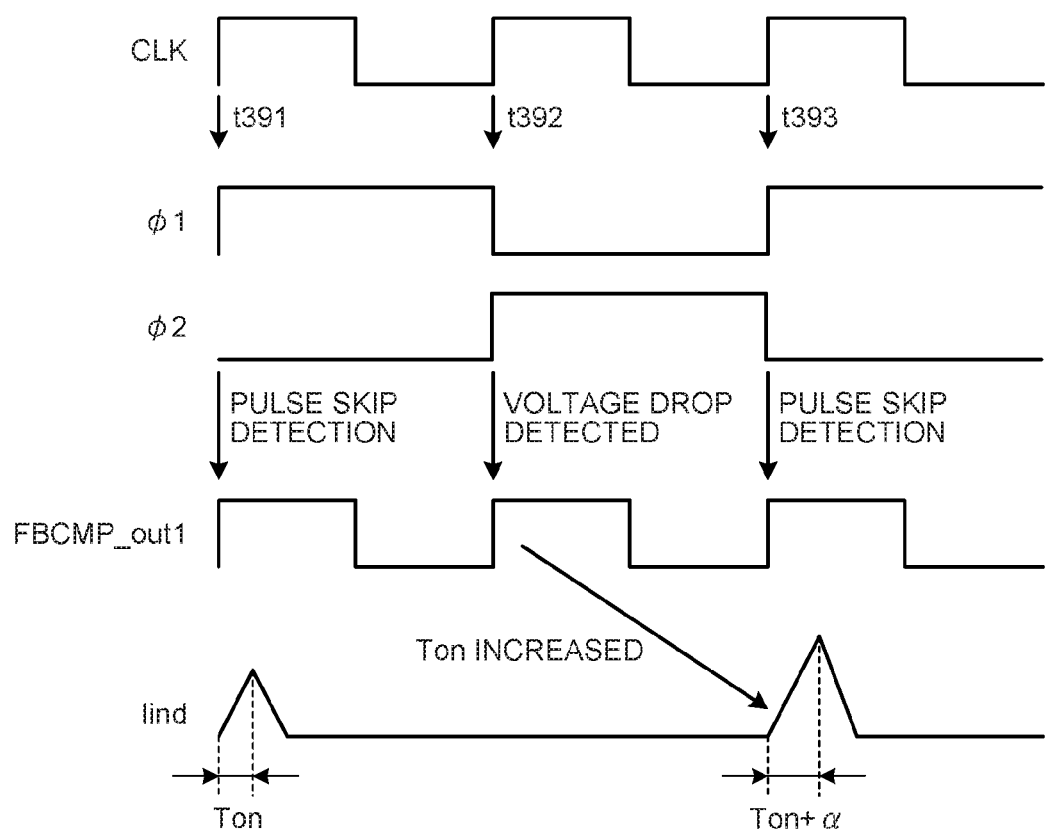
FIG. 47 is a diagram illustrating a control method for the power supply circuit according to a forty-fourth embodiment.

FIG. 47 is a diagram illustrating an embodiment of a control method for the power supply circuit in the aforementioned forty-third embodiment. In the present embodiment, slot allocation signals φ1 and φ2 are produced from a clock signal CLK. At time t391 and time 393 of slot allocation to a channel 1, the output voltage Vout1 is compared with the reference voltage Vref1 by the feedback comparator 24-1, and accordingly, it is determined whether or not a pulse skip exists. When the output voltage Vout1 is lower than the reference voltage Vref1, an output signal FBCMP_out1 at High level is output from the feedback comparator 24-1, and accordingly, the pulse skip is detected. When the pulse skip is detected, a control to increase the ON-time is performed.

In the control method of the present embodiment, at the time of slot allocation to the channel 1, namely, at time t392 when the slot allocation signal φ1 is not applied, an operation to compare the output voltage Vout1 with the reference voltage Vref1 is executed. When the output signal FBC-MP_out2 from the feedback comparator 24-1 is detected in this comparison operation, a control to increase the ON-time is performed. That is, in addition to control of the ON-time control based on presence or absence of the pulse skip, the control to detect reduction of the output voltage Vout to adjust the ON-time can be performed by using the feedback comparator 24-1. The configuration can be such that what time of slot allocation reduction of the output voltage Vout is detected at is arbitrarily selected by, for example, the channel selection circuit 44.

Forty-Fifth Embodiment

Figure 48:
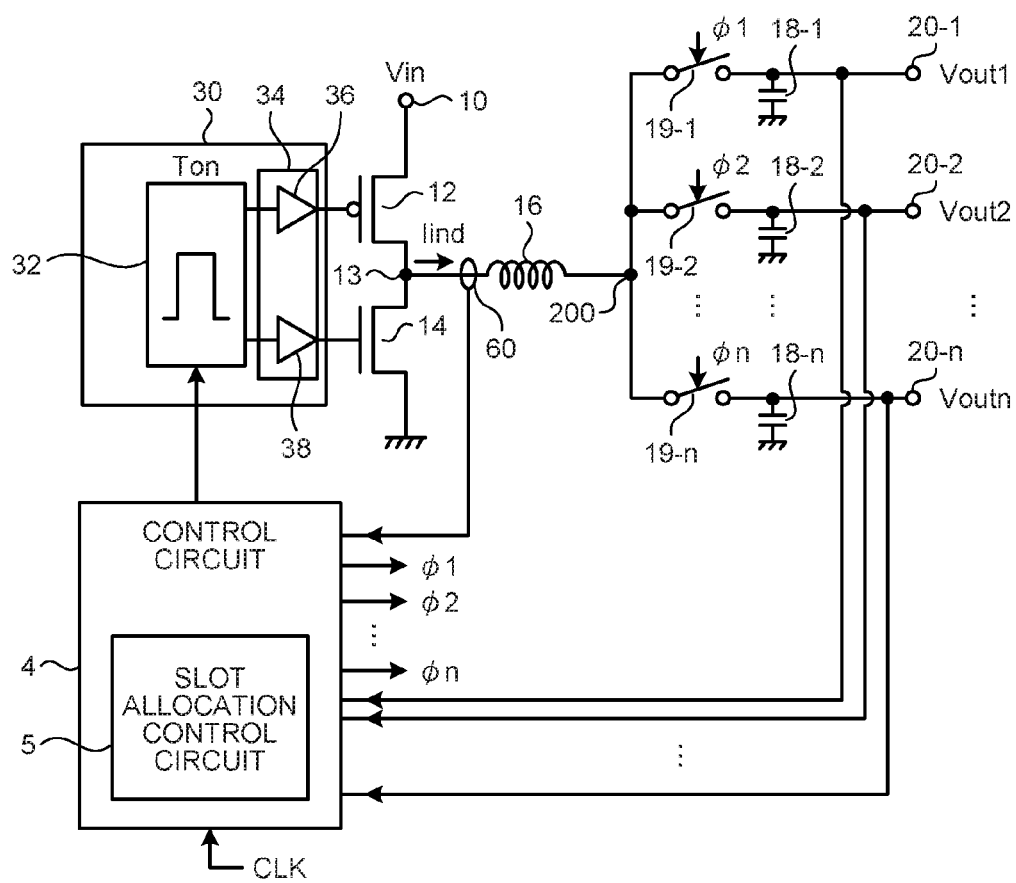
FIG. 48 is a diagram illustrating a configuration of a power supply circuit according to a forty-fifth embodiment.

FIG. 48 is a diagram illustrating a configuration of a power supply circuit according to a forty-fifth embodiment. The power supply circuit of this embodiment includes an input terminal 10 to which an input voltage Vin is applied. A high-side PMOS switching transistor 12 has its source connected to the input terminal 10 and its drain connected to an output node 13. A low-side NMOS switching transistor 14 has its drain connected to the output node 13 and its source to which the ground potential is supplied.

A first end of an inductor 16 is connected to the output node 13. A second end 200 of the inductor 16 is connected to a plurality of output terminals 20-1 to 20n via switches 19-1 to 19-n, respectively. The output terminals 20-1 to 20-n respectively apply output voltages Vout1 to Voutn to a load (not illustrated). Capacitors 18-1 to 18-n have ones of their respective ends connected to the output terminals 20-1 to 20-n and the others grounded. With intervention of any of the switches 19-1 to 19-n turned on, the corresponding one(s) of the capacitors 18-1 to 18-n is charged with inductor current Iind. A single period of time during which any of the capacitors 18-1 to 18-n is charged with the inductor current Iind is referred to as slot. The single period of time of a slot corresponds to a single cycle of a clock signal CLK otherwise applied.

A current sensor 60 is connected between the output node 13 and the inductor 16. The current sensor 60 detects the inductor current Iind flowing through the inductor 16 and then feeds the detection information back to a control circuit 4. The current sensor 60 includes, for example, a comparator (not illustrated) that has its inputs connected to the opposite ends of a resistance (not illustrated) serially connected to the inductor 16. As a direction of flow of the inductor current Iind varies, a high/low relation of voltages applied to the comparator is varied. Because a variation in the high/low relation of voltages causes the output from the comparator to switch, detecting the variation of the output from the comparator enables detection of information of the inductor current Iind.

The output terminals 20-1 to 20-n are connected to the control circuit 4. The information of the output voltages Vout1 to Voutn are fed back to the control circuit 4. A clock signal CLK is applied to the control circuit 4.

The control circuit 4 includes a slot allocation control circuit 5. The slot allocation control circuit 5 produces slot allocation signals φ1 to φn and applies them to the switches 19-1 to 19-n connected between a second end 200 of the inductor 16 and the output terminals 20-1 to 20-n. Turning on/off of the switches 19-1 to 19-n are controlled according to the slot allocation signals φ1 to φn. Specifically, when the switches are turned on because of application of the slot allocation signals φ1 to φn, the respectively corresponding output terminals 20-1 to 20-n are time-divisionally connected to the inductor.

The power supply circuit of this embodiment includes a driving control circuit 30. The driving control circuit 30 includes a pulse generation circuit 32. The pulse generation circuit 32 generates, for example, a pulse signal with a fixed pulse width in response to a signal from the control circuit 4.

The output from the pulse generation circuit 32 is applied to the driving circuit 34. The driving circuit 34 includes buffers 36 and 38. A driving signal from the buffer 36 is applied to the gate of the PMOS switching transistor 12, and a driving signal from the buffer circuit 38 is applied to the gate of the NMOS switching transistor 14. The driving signals from the buffers 36 and 38 control the turning on/off of the PMOS switching transistor 12 and the NMOS switching transistor 14. For example, in order to avoid a case that simultaneous turning on of the PMOS switching transistor 12 and the NMOS switching transistor 14 causes through-current between the input terminal 10 and the ground potential, a give dead time is produced in the pulse generation circuit 32.

According to feedback signals of the output voltages Vout1 to Voutn or the inductor current Iind, the power supply circuit of this embodiment controls allocation of slot allocation signals φ1 to φn that are applied to the switches 19-1 to 19-n. Specifically, the slot allocation signals φ1 to φn are not applied to the switches 19-1 to 19-n in the given order, and instead, allocation of the slot allocation signals φ1 to φn is varied according to the states of the output voltages Vout1 to Voutn or the state of the inductor current Iind. For example, the order of slot allocation and the number of times of slot allocation are adjusted to control allotment of time for connections of the output terminals Vout1 to Voutn with the inductor 16. Controlling allotment of time for connections with the inductor 16, an amount of electricity by which the capacitors 18-1 to 18-n respectively connected to the output terminals 20-1 to 20-n are charged with the inductor current Iind is controlled, and thereby, the output voltages Vout1 to Voutn are controlled. The inductor current Iind or the output voltages Vout1 to Voutn are varied according to the states of loads. Adjusting the allocation of the slot allocation signals φ1 to φn according to the states of the loads, it is possible to rapidly cope with the variations of the loads. A route leading to a load (not illustrated) via any of the output terminal 20-1 to 20-n is referred to as channel hereinafter.

Forty-Sixth Embodiment

Figure 49:
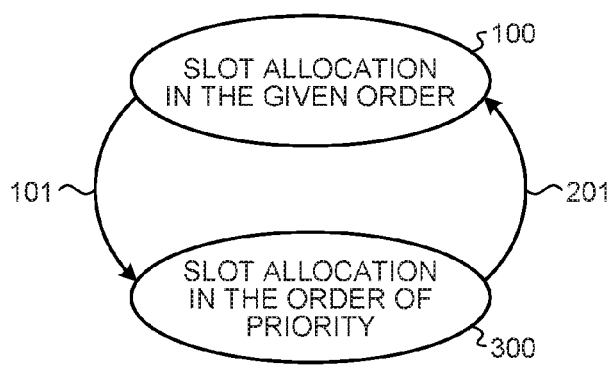
FIG. 49 is a diagram illustrating a control method for the power supply circuit according to a forty-sixth embodiment.

FIG. 49 is a diagram illustrating an embodiment of a control method for the power supply circuit according to a forty-sixth embodiment. The control method of this embodiment includes a first control state 100 that the slot allocation signals φ1 to φn are applied to the switches 19-1 to 19-n in the given order. In the first control state 100, the slot allocation signals φ1 to φn are applied in the given order equally to the switches 19-1 to 19-n.

The control method of this embodiment includes a second control state 300 that the slot allocation signals φ1 to φn are applied in the given order to the switches 19-1 to 19-n. In the second control state 300, the order of application of the slot allocation signals φ1 to φn to the switches 19-1 to 19-n or allotment of time for the application are adjusted. For example, a channel to any of the output voltages Vout1 to Voutn of which reduction is significant is given priority to the remaining channels by applying the slot allocation signals φ1 to φn thereto. In this way, increasing the number of times of the slot allocation to any of the channels imposed with heavy load, for example, makes it possible to raise any of the output voltage Vout1 to Voutn from the channel involved. It is possible to rapidly cope with the variation of the load.

When the variation of the load brings about a necessity to preferentially allot the number of times of slot allocation to the particular channel, a transfer (101) is made from the first control state 100 to the second control state 300. The normal state is recovered, and the slot allocation signals φ1 to φn are to be allocated in the given order equally, a transfer (201) from the second control state 300 to the first control state 100 is made.

In accordance with the control method for the power supply circuit of this embodiment, when the state of the load brings about a necessity to preferentially allot slots, preferentially allocating the slots for the channel involved makes it possible to rapidly cope with the variation of the load.

Figure 50:
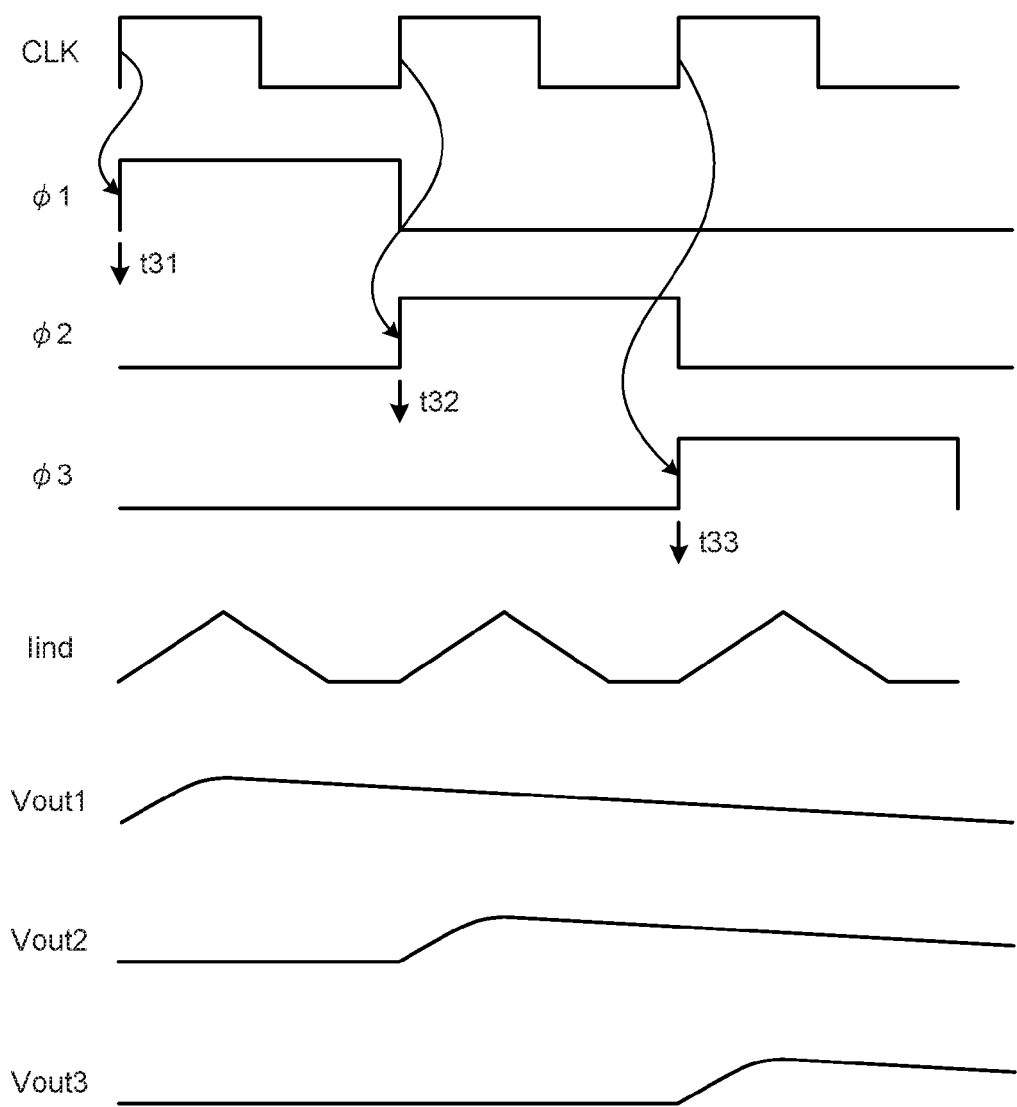
FIG. 50 is a diagram illustrating an operation of the power supply circuit.

FIG. 50 is a diagram illustrating an operation of the power supply circuit of the aforementioned forty-fifth embodiment. For the sake of convenience of explanation, a configuration including three channels will be described. Corresponding to the time of rise of the clock signal CLK at time t31 to t33, the slot allocation signals φ1 to φ3 are produced. The slot allocation signals φ1 to φ3 are produced in the slot allocation control circuit 5 and applied to the corresponding switches 19-1 to 19-3.

The switches 19-1 to 19-3 to which the slot allocation signals φ1 to φ3 are applied, respectively, turn on. For example, when the slot allocation signal φ1 enables the switch 19-1 to turn on, the capacitor 18-1 is charged with the inductor current Iind for a period of time corresponding to the slot allocation signal φ1, and the output voltage Vout1 is raised. Similarly, the capacitors 18-2 and 18-3 are charged for periods of time corresponding to the slot allocation signals φ2 and φ3, and accordingly, the output voltages Vout2 and Vout 3 rise.

For example, the output voltages Vout1 to Vout3 rise in a given order the slot allocation signals φ1 to φ3 are applied, and fall as time elapses. In this case, the operation is in the normal state.

Forty-Seventh Embodiment

Figure 51:
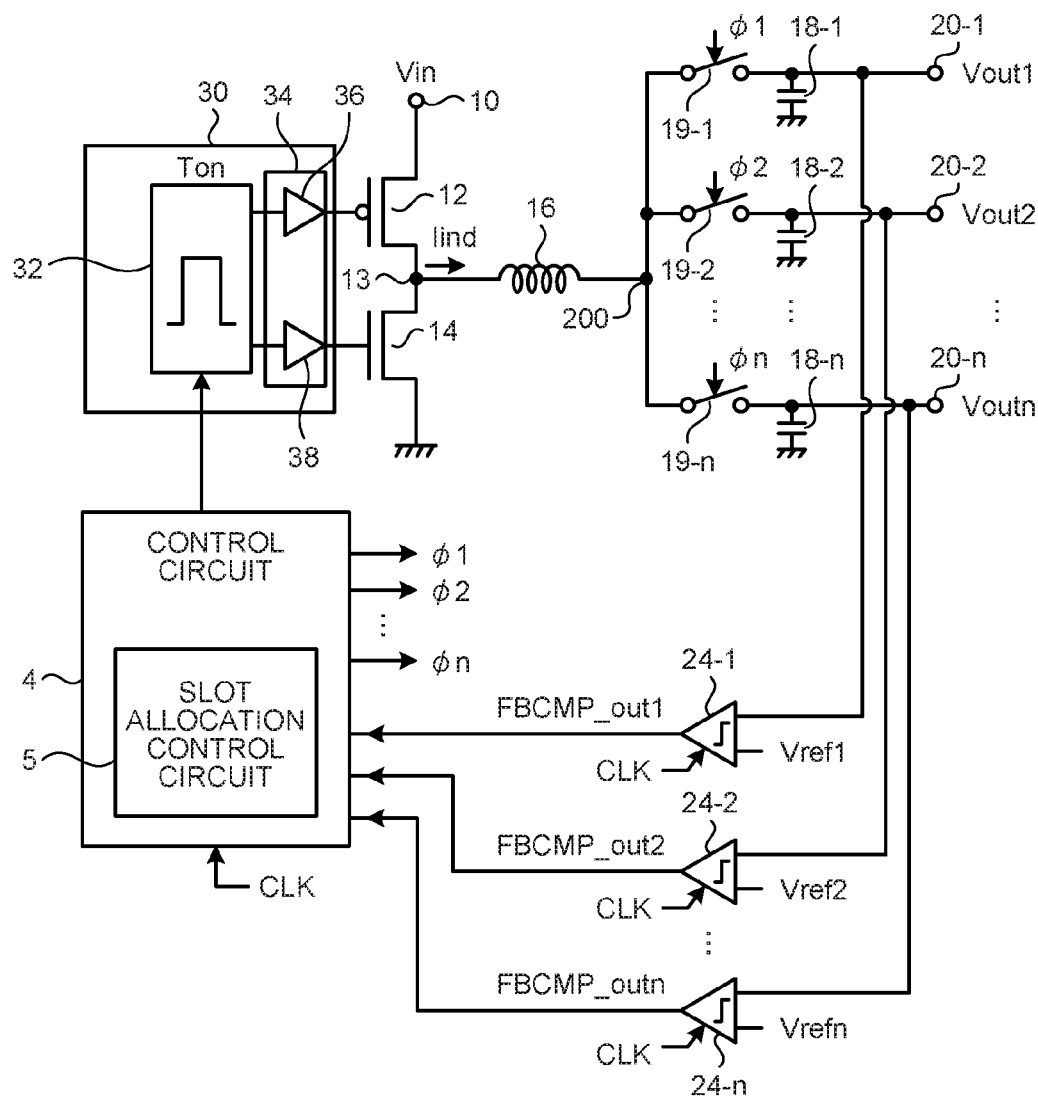
FIG. 51 is a diagram illustrating a configuration of a power supply circuit according to a forty-seventh embodiment.

FIG. 51 is a diagram illustrating a configuration of a power supply circuit according to a forty seventh embodiment. Elements corresponding to those of the aforementioned embodiments are denoted by the same reference symbols. The power supply circuit of this embodiment includes feedback comparators (24-1 to 24-n) that have their respective one ends connected to output terminals 20-1 to 20-n to compare output voltages Vout1 to Voutn therefrom respectively with reference voltages Vref1 to Vrefn. The reference voltages Vref1 to Vrefn are, for example, set to the same voltage. A clock signal CLK is applied to the feedback comparators 24-1 to 24-n, and the comparators perform a discrete-time operation. Specifically, the feedback comparators 24-1 to 24-n operate only when the clock signal CLK is at High level. This suppresses power consumption. When the output voltages Vout1 to Voutn are lower than the reference voltages Vref1 to Vrefn, the feedback comparators 24-1 to 24-n produces output signals FBCMP_out1 to FBCMP_outn at High level. The output signals FBCMP_out1 to FBCMP_outn from the feedback comparators 24-1 to 24-n are applied to a control circuit 4.

A slot allocation control circuit 5 of the control circuit 4 detects the output signals FBCMP_out1 to FBCMP_outn from the feedback comparators 24-1 to 24-n and determine an order of allocation of the slot allocation signals φ1 to φ3 applied to the switches 19-1 to 19-n. For example, the slot allocation signals φ1 to φ3 are produced in the order as the output signals FBCMP_out1 to FBCMP_outn from the feedback comparators 24-1 to 24-n are detected, and applied to the switches 19-1 to 19-n. As stated above, the feedback comparators 24-1 to 24-n produce the output signals FBCMP_out1 to FBCMP_outn at High level when the output voltages Vout1 to Voutn are lower than the reference voltages Vout1 to Voutn. Any of the feedback comparators that first of all produces the output signal (FBCMP_out1 to FBCMP_outn) at High level proves that the output voltage from the output terminal connected to that feedback comparator becomes lower than the reference voltage first of all. Thus, preferentially allocating the slot allocation signal for the channel to which that feedback comparator is connected and supplying the channel with inductor current Iind makes it possible to raise the output voltage at the channel. Thus, the output voltage is rapidly controlled according to a state of a load.

Forty-Eighth Embodiment

Figure 52:
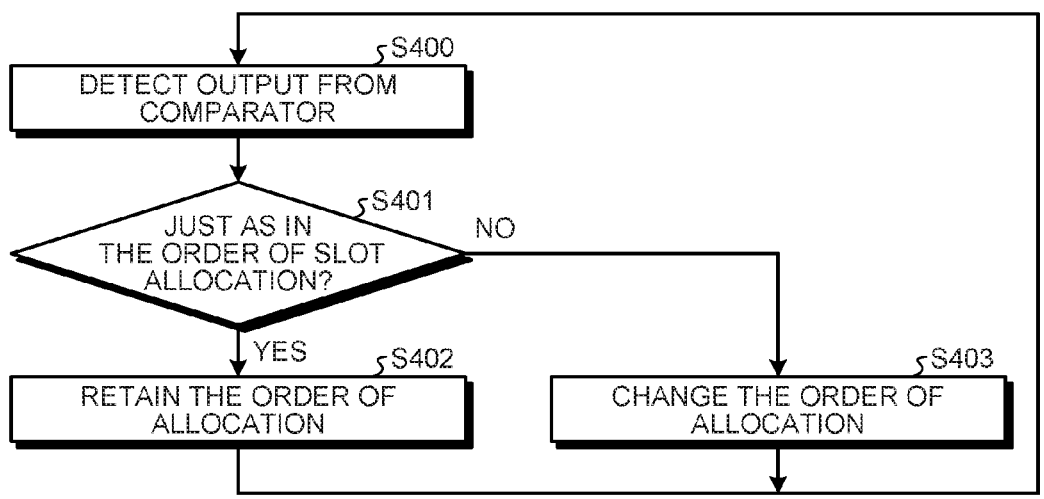
FIG. 52 is a diagram illustrating a control method for the power supply circuit according to a forty-eighth embodiment.

FIG. 52 is a diagram illustrating a control method for the power supply circuit according to a forty-eighth embodiment. This is the control method applied to the power supply circuit of the aforementioned forty-seventh embodiment. In the control method for the power supply circuit according to this embodiment, the output signals FBCMP_out1 to FBCMP_outn from the feedback comparators 24-1 to 24-n that compare the output voltages Vout1 to Voutn with the reference voltages Vref1 to Vrefn are detected (S400). It is determined whether or not the output signals FBCMP_out1 to FBCMP_outn from the feedback comparators are detected in the order of application of the slot allocation signals φ1 to φn (S401). The output terminals have their output voltages raised in the order as the slot allocation signals φ1 to φn are applied, and when the normal state as usual is recovered, any of the output voltages are reduced as time elapses. Thus, when the order in which the output signals FBCMP_out1 to FBCMP_outn from the feedback comparators are detected accords with the application order of the slot allocation signals φ1 to φn, the current order of allocation is retained (S402). When the order in which the output signals FBCMP_out1 to FBCMP_outn from the feedback comparators are detected does not accord with the application order of the slot allocation signals φ1 to φn, the current order of allocation is changed (S403). Specifically, the slot allocation signals φ1 to φn are applied to the switches connected to the channels on a preferential basis ordered according to which feedback comparator first produces the output signal (any of FBCMP_out1 to FBCMP_outn) at High level.

With the control method for the power supply circuit according to this embodiment, allocation of the slot allocation signals φ1 to φn is changed according to reduction of the output voltages, so as to rapidly cope with variation of load voltage.

Forty-Ninth Embodiment

Figure 53:
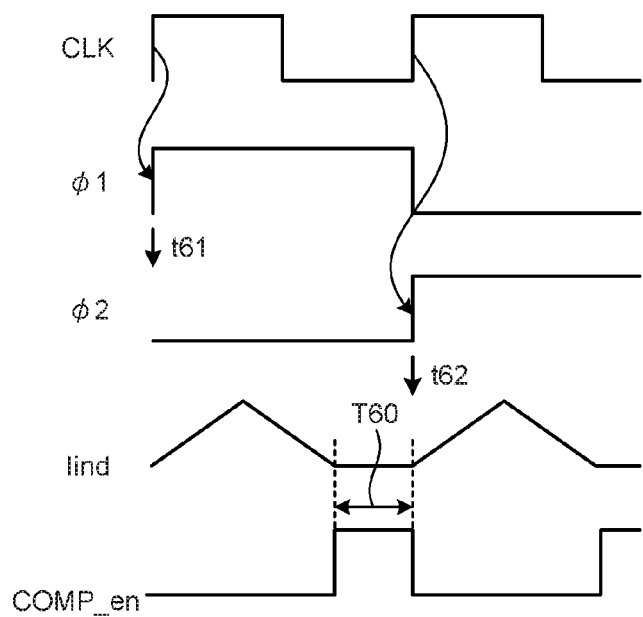
FIG. 53 is a diagram illustrating a control method for the power supply circuit according to a forty-ninth embodiment.

FIG. 53 is a diagram illustrating a control method for the power supply circuit according to a forty-ninth embodiment. In the control method for the power supply circuit according to this embodiment, slot allocation signals φ1 and φ2 are produced in synchronization with a single cycle of a clock signal CLK. At the time of rise of the slot allocation signals φ1 and φ2 (t61 and t62), a high-side PMOS switching transistor 12 turns on and enables supply with inductor current Iind. In this embodiment, comparison of output voltages Vout1 to Voutn with reference voltages Vref1 to Vrefn is performed in response to an enable signal COMP_en. Specifically, the enable signal COMP_en alternative to the aforementioned clock signal CLK is applied to feedback comparators 24-1 to 24-n. During a period of time T60 for which the enable signal COMP_en keeps at High, the output voltages Vout1 to Voutn are compared with reference voltages Vref1 to Vrefn.

The period of time T60 for which the enable signal COMP_en keeps at High is equivalent to a period of time for which charging with inductor current Iind is interrupted. While capacitors are supplied with the inductor current Iind, the capacitors keep charged, and hence, the output voltages Vout1 to Voutn are possibly raised. To deal with this, detecting the states of the output voltages Vout1 to Voutn at a point of time when a duration of the charging is interrupted makes it possible to detect states of reduction of the output voltages Vout1 to Voutn applied to loads (not illustrated). The reduction of the output voltages Vout1 to Voutn according to the states of the loads is appropriately detected, and hence, it is possible to control the output voltages Vout1 to Voutn according to the states of the loads. A period of time after the duration of the charging with the inductor current Iind is terminated is, for example, detected by the aforementioned current sensor 60. The enable signal COMP_en is produced according to a signal from the current sensor 60, and then applied from the control circuit 4 to the feedback comparators 24-1 to 24-n.

With the control method for the power supply circuit according to this embodiment, comparing the output voltages Vout1 to Voutn with the reference voltages Vref1 to Vrefn for the period of time T60 during which the charging with the inductor current Iind is interrupted, it is possible to avoid the comparison operation for a period of time during which the output voltages Vout1 to Voutn are possibly further raised. In this way, the reduction of the output voltages Vout1 to Voutn due to the variations of the loads is more appropriately detected. In addition, restricting the duration of the detection operation by the feedback comparator 24-1 to 24-n to the period of time T60, power consumption is suppressed.

Fiftieth Embodiment

Figure 54:
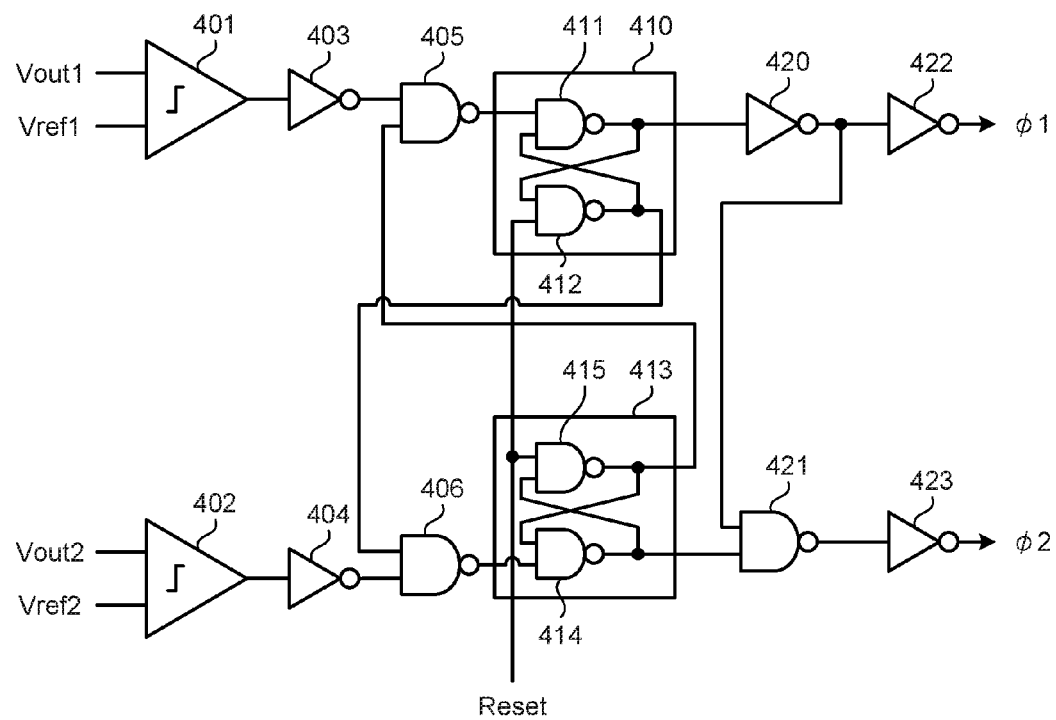
FIG. 54 is a diagram illustrating an embodiment of a slot allocation control circuit.

FIG. 54 is a diagram illustrating an embodiment of the slot allocation control circuit 5. In this embodiment, an exemplary implementation is provided where, in response to output signals from a feedback comparator 401 that compares an output voltage Vout1 with a reference voltage Vref1 and a feedback comparator 402 that compares an output voltage Vout2 with a reference voltage Vref2, allocation of slot allocation signals $\varphi 1$ and $\varphi 2$ for two channels is controlled.

The output signal from the feedback comparator 401 is applied to one of input terminals of a NAND circuit 405 via an inverter 403. An output from the NAND circuit 405 is applied to a latch circuit 410. The latch circuit 410 includes two NAND circuits 411 and 412 in a cross-connection with each other. An output from the latch circuit 410 is applied to an inverter 422 via an inverter 420 and applied to a NAND circuit 406 for the channel 2. The slot allocation signal $\varphi 1$ is output from the inverter 422. The slot allocation signal $\varphi 1$ is, for example, applied to the switch 19-1.

The output signal from the feedback comparator 402 is applied to one of input terminals of the NAND circuit 406 via an inverter 404. An output from the NAND circuit 406 is applied to a latch circuit 413. The latch circuit 413 includes two NAND circuits 414 and 415 in a cross connection with each other. An output from the latch circuit 413 is applied to one of input terminals of a NAND circuit 421 and also applied to the other input terminal of the NAND circuit 405 for the channel 1. An output from the inverter 420 for the channel 1 is applied to the other input terminal of the NAND circuit 421. An output from the NAND circuit 421 is applied to an inverter 423. The slot allocation signal $\varphi 2$ is output from the inverter 423. The slot allocation signal $\varphi 2$ is, for example, applied to the aforementioned switch 19-2.

Although the detailed description of the operation is omitted, in the slot allocation control circuit 5 of this embodiment, when the output signal at High level is first output from the feedback comparator 401, the output from the inverter 422, namely, the slot allocation signal $\varphi 1$ becomes High level. Meanwhile, when the output signal at High level is first output from the feedback comparator 402, the output from the inverter 423, namely, the slot allocation signal $\varphi 2$ becomes High level. Thus, the slot allocation signals $\varphi 1$ and $\varphi 2$ are allocated according to an order of application of the output signals from the feedback comparators.

The output signals from the feedback comparators 401 and 402 are produced when the output voltage Vout1 and Vout2 respectively become lower than predetermined reference voltages Vref1 and Vref2, and hence, supplying inductor current Iind to the channel at which the output voltage (Vout1 or Vout2) first falls enables a control to raise the output voltage (Vout1 or Vout2). When the feedback comparators 401 and 402 simultaneously produce the signals at High level, the NAND circuit 421 in a stage succeeding to the latch circuit 413 operates to make the slot allocation signal $\varphi 1$ from the inverter 422 preferentially turn to High. A reset signal Reset permits the latch circuit latching data thereon to be reset to a state of being ready for determining the order of subsequent allocation of the slot allocation signals $\varphi 1$ and $\varphi 2$.

Although, for the sake of convenience, a configuration with two channels has been described, if required to have more channels, the configuration is modifiable to have stages similarly structured and increased in number. For example, the configuration may include a duplication(s) of a configuration where signals from other channels are applied to the NAND circuits 405 and 406 positioned in the preceding stages to the latch circuits 410 and 413, and a signal for the channel that is given priority in the normal operation is applied to the NAND circuit 421 positioned in the succeeding state to the latch circuit 413.

Fifty-First Embodiment

Figure 55:
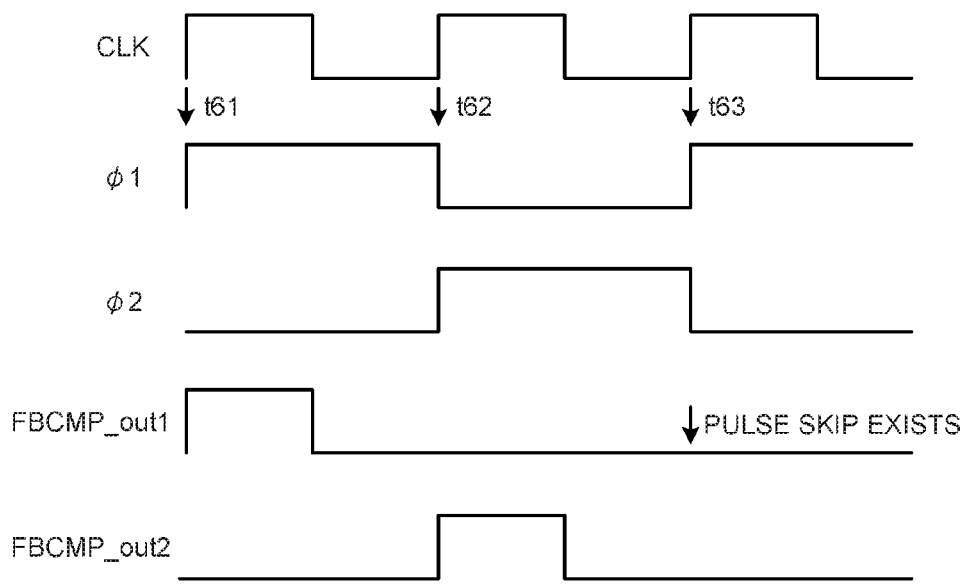
FIG. 55 is a diagram illustrating a control method for the power supply circuit according to a fifty-first embodiment.

FIG. 55 is a diagram illustrating a control method for the power supply circuit according to a fifty-first embodiment. For example, this is available as a control method for the power supply circuit illustrated in FIG. 51. For the sake of convenience of explanation, the description is made in the context of two channels. In this embodiment, slot allocation signals $\varphi 1$ and $\varphi 2$ are produced from a clock signal CLK. At the time of channel switching, namely, the time of every rise of the clock signal CLK (t61 to t63), it is determined whether or not output signals FBCMP_out1 and FBCMP_out2 are produced from the feedback comparators 24-1 and 24-2. For example, at the time of application of the slot allocation signal $\varphi 1$ for the channel 1 (t61 and t63), the output signal FBCMP_out1 from the feedback comparator 24-1 is to be detected. At the time t63 of detection, when an output voltage Vout1 is higher than a reference voltage Vref1, the output signal FBCMP_out1 turns to Low level; that is, pulse skip arises. In this case, since the output voltage Vout1 from the channel 1 is high, a control to decrease the number of times of slot allocation is performed.

In the control method for the power supply circuit according to the embodiment, the state of the output voltages Vout1 to Voutn at the time of channel switching are detected according to whether or not the pulse skip exists. When the pulse skip exists, the output voltage (Vout1 to Voutn) from the channel involved is high, and hence, a control to decrease the number of times of slot allocation is performed. In this way, lessening the occasions of excessively charging the channel at which the output voltages do not fall results in increasing the occasions of charging any other channel so as to have supply capacity enough and to spare, and so as to increase the supply capacity for the channel at which the voltage falls due to a variation of a load.

Forty-Second Embodiment

Figure 56:
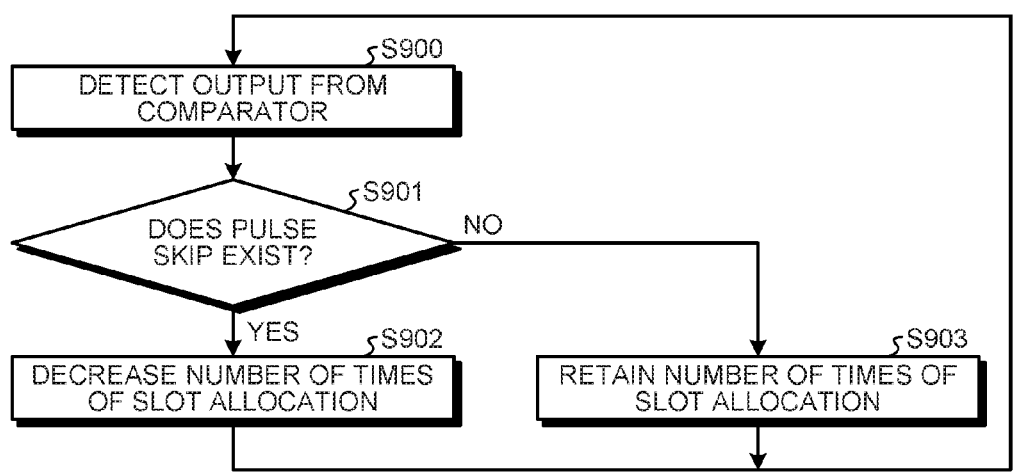
FIG. 56 is a diagram illustrating a control method for the power supply circuit according to a fifty-second embodiment.

FIG. 56 is a diagram illustrating a flow of a control method for the power supply circuit according to a fifty-second embodiment. At the time of channel switching, output signals FBCMP_out1 to FBCMP_outn from feedback comparators 24-1 to 24-n are detected (S900). Existence of pulse skip indicating an output voltage (Vout1 to Voutn) higher than a reference voltage (Vref1 to Vrefn) is detected (S901). When the pulse skip exists, the number of times of slot allocation for the channel involved (S902). When no pulse skip exists, the current number of times of slot allocation to that channel is retained (S903). This is because, since channel is in a state of voltage fall below the reference voltage (Vref1 to Vrefn), charging with the inductor current Iind is to be retained so as to raise the output voltages (Vout1 to Voutn).

In the control method for the power supply circuit according to the embodiment, the states of the output voltages Vout1 to Voutn at the time of channel switching are detected according to whether or not the pulse skip exists. When the pulse skip exists, the output voltages Vout1 to Voutn are in a high state, and hence a control to decrease the number of times of slot allocation. In this way, lessening the occasions of excessively charging the channel at which the output voltage does not fall results in increasing the occasions of charging any other channel so as to have supply capacity enough and to spare, and so as to increase the supply capacity for the channel at which the voltage falls due to a variation of a load. The output voltages Vout1 to Voutn are rapidly controlled according to the state of the load. When the pulse skip arises the given number of times for a certain period of time, an alternative control to reduce the number of times of slot allocation to the channel involved may be performed. A case that the output voltage at the channel involved falls immediately after the number of times of slot allocation is so reduced as to need increase in the number of times of slot allocation is avoided, and reducing the number of times of slot allocation makes the circuit operation stable.

Fifty-Third Embodiment

Figure 57:
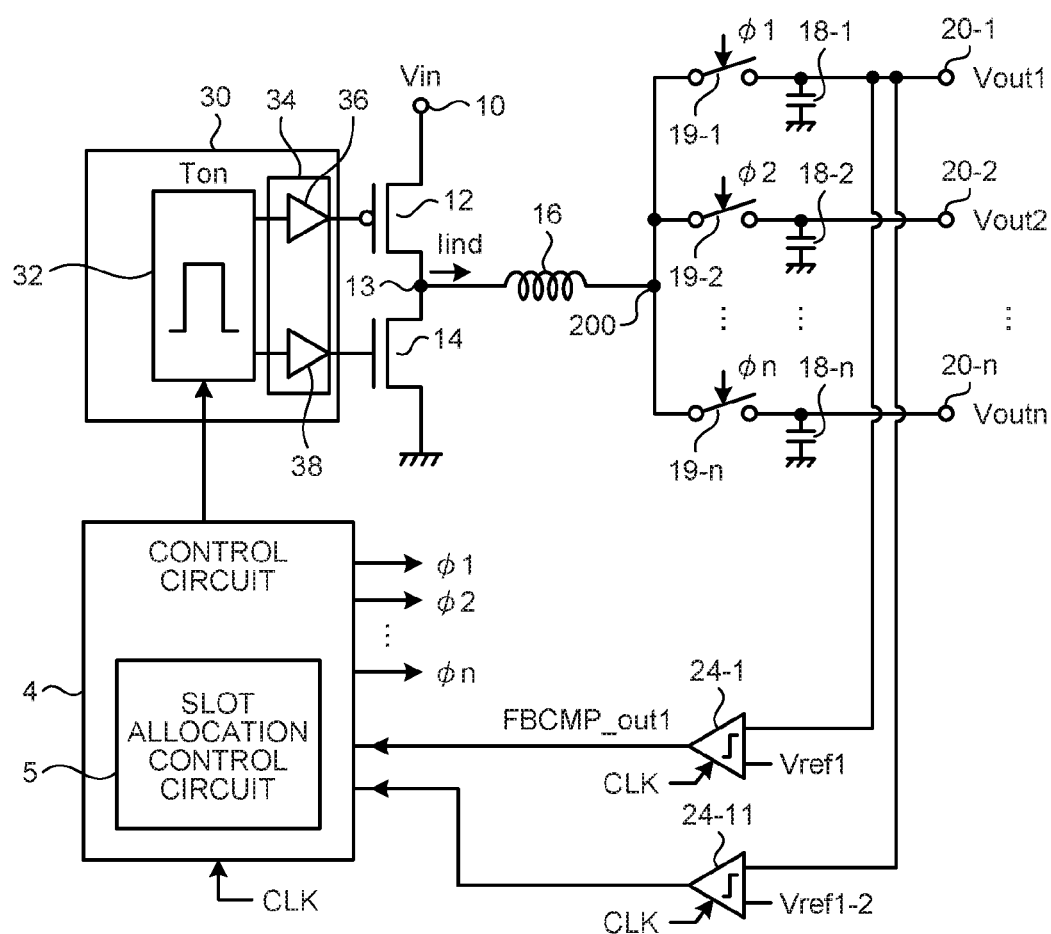
FIG. 57 is a diagram illustrating a configuration of a power supply circuit according to a fifty-third embodiment.

FIG. 57 is a diagram illustrating a configuration of a power supply circuit according to a fifty-third embodiment. Elements corresponding to those of the aforementioned embodiments are denoted by the same reference symbols. The power supply circuit of this embodiment includes a feedback comparator 24-1 connected to an output terminal 20-1 and besides a second comparator 24-11 that compares an output voltage Vout1 with a second reference voltage Vref1-2. For example, the second reference voltage Vref1-2 is a voltage lower than the reference voltage Vref1. Although, for other channels, the power supply circuit also includes additional comparison circuits that compare their respective output voltages Vout with the second reference voltage, the description of them is omitted.

A situation that the pulse comes out every time suggests two possible states that an appropriate control is performed and that because of lack of the number of times of slot allocation, the output voltage falls. In the power supply circuit of this embodiment, this case corresponds to the state that because of lack of the number of times of slot allocation, the output voltage falls, and hence, when the output voltage Vout1 becomes lower than the second reference voltage Vref1-2, for example, a control to increase an allocation of slots for the channel 1 may be performed to raise the output voltage Vout1. Reflecting the state of the reduction of the output voltages Vout1 to Voutn, a control to cope with the state of the load is attained. Comparison with the second reference voltage Vref1-2 by the second comparator 24-11 may be carried out not at the time of application of the slot allocation signal φ1 to the channel 1 but at the time of slot allocation to any other channel, or may be always monitored.

Fifty-Fourth Embodiment

Figure 58:
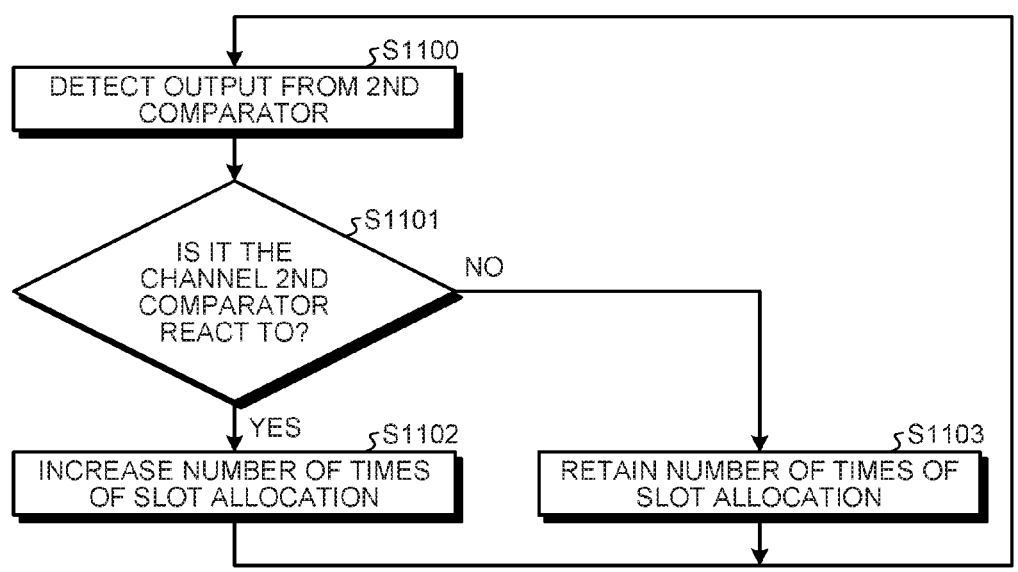
FIG. 58 is a diagram illustrating a control method for the power supply circuit according to a fifty-fourth embodiment.

FIG. 58 is a diagram illustrating a flow of a control method for the power supply circuit according to a fifty-fourth embodiment. In addition to comparing output voltages Vout1 to Voutn respectively with reference voltages Vref1 to Vrefn, an output from a second comparator 24-11 that compares the output voltages Vout1 to Voutn with a second reference voltage Vref1-2 is detected (S1100). It is determined whether or not the channel involved is the one connected to the second comparator that produces the output signal at High level in response to the output voltages Vout1 to Voutn falling below the second reference voltage Vref1-2 (S1101). For any channel to which the second comparator 24-11 reacts, the number of times of slot allocation is increased (S1102). Increasing a supply with inductor current Iind by increasing the number of times of slot allocation to the channel at which the output voltage falls permits the output voltages Vout1 to Voutn to be raised. For the channels to which the second comparator does not react, the current number of times of slot allocation is retained (S1103).

In the control method for the power supply circuit according to the embodiment, a control to increase the number of times of slot allocation to any channel to which the second comparator 24-11 reacts, namely, the channel at which reduction of the output voltage (Vout1 to Voutn) is conspicuous is performed, and thereby, the output voltage is rapidly raised according to a state of a load.

Fifty-Fifth Embodiment

Figure 59:
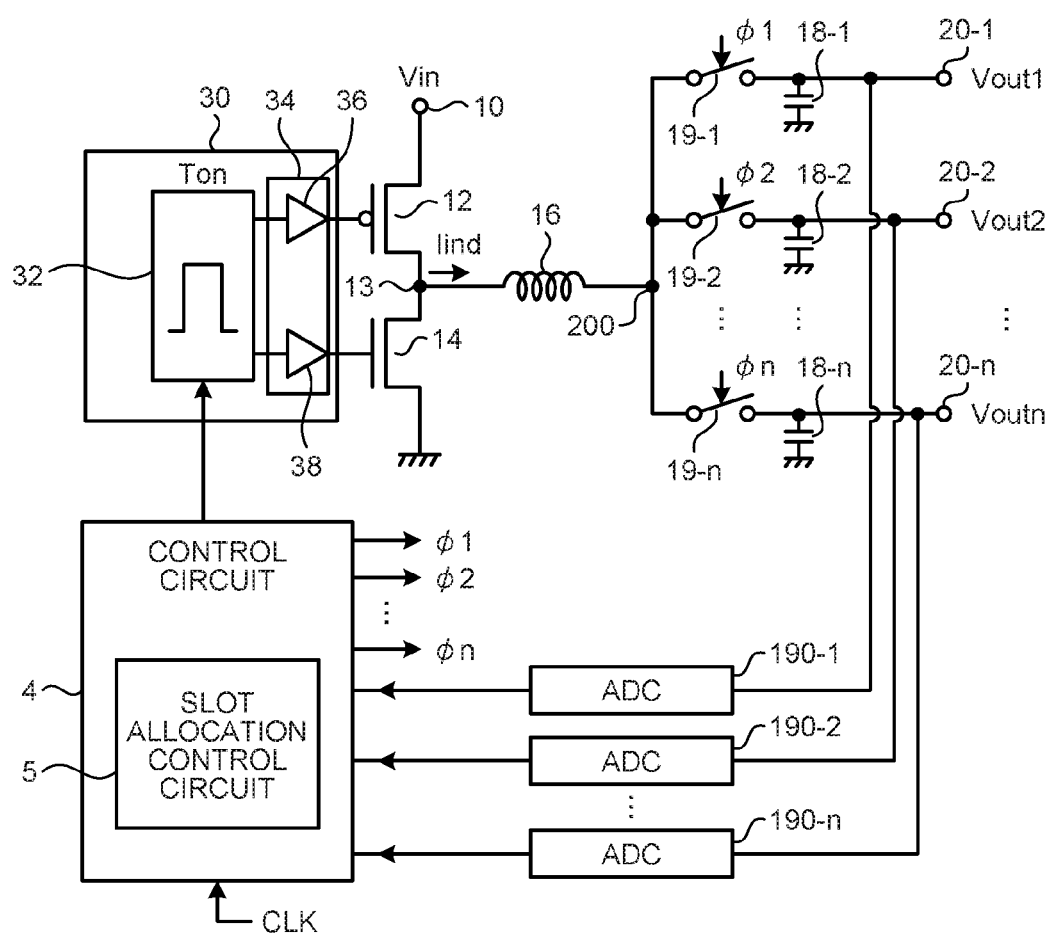
FIG. 59 is a diagram illustrating a configuration of a power supply circuit according to a fifty-fifth embodiment.

FIG. 59 is a diagram illustrating a configuration of a power supply circuit according to a fifty-fifth embodiment. Elements corresponding to those of the aforementioned embodiments are denoted by the same reference symbols. The power supply circuit of this embodiment includes AD converters 190-1 to 190-n connected respectively to output terminals 20-1 to 20-n. The AD converters 190-1 to 190-n convert output voltages Vout1 to Voutn from the output terminals 20-1 to 20-n to digital values and apply them to a control circuit 4. A slot allocation control circuit 5 of the control circuit 4 controls allocation of slot allocation signals φ1 to φn according to the digital values from the AD converters 190-1 to 190-n. For example, a control to increase an allocation of slots for the channel connected to the AD converter producing the smallest value is performed. This is because increasing the allocation of slots for any channel at which voltage fall is great makes it possible to raise the output voltage at that channel.

In the power supply circuit of this embodiment, the output voltages Vout1 to Voutn are converted to digital values by the AD converters 190-1 to 190-n, and a control to increase an allocation of slots for any channel at which the output voltage (Vout 1 to Voutn) falls greatly is performed according to the digital values. In this way, the output voltages Vout1 to Voutn are rapidly controlled according to states of loads. The AD converters 190-1 to 190-n may be adapted to discretely operate in response to predetermined sampling signals (not illustrated). With the AD converters 190-1 to 190-n enabled to discretely operate, power consumption is suppressed. In an alternative configuration, after the output voltages Vout1 to Voutn are compared respectively with the reference voltages Vref1 to Vrefn as target values for channels to the output voltages, voltages of the differences are converted to digital values by the AD converters 190-1 to 190-n, and an allocation of slots for the channel at which reduction of the voltage is the greatest relative to the reference voltage (Vref1 to Vrefn).

Fifty-Sixth Embodiment

Figure 60:
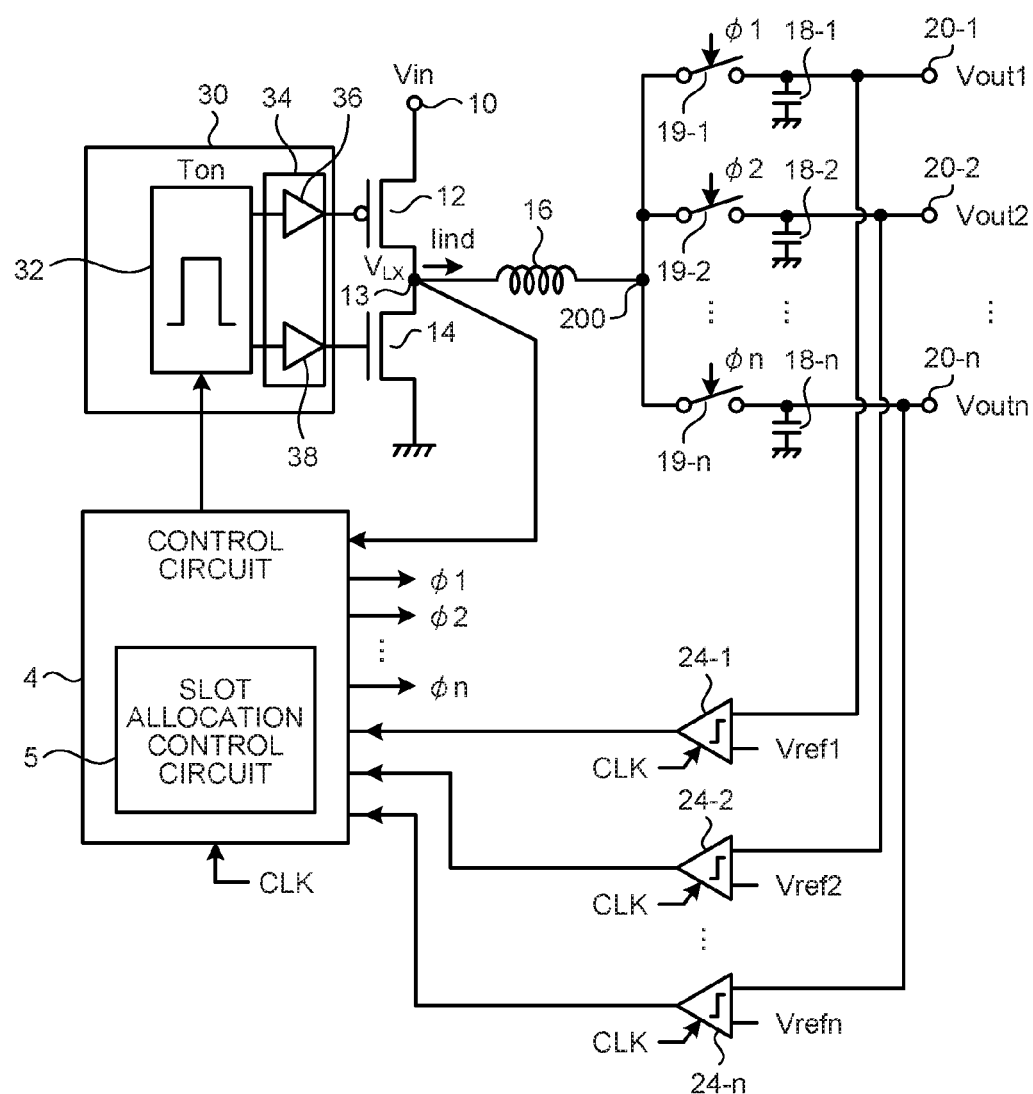
FIG. 60 is a diagram illustrating a configuration of a power supply circuit according to a fifty-sixth embodiment.

FIG. 60 is a diagram illustrating a configuration of a power supply circuit according to a fifty-sixth embodiment. Elements corresponding to those of the aforementioned embodiments are denoted by the same reference symbols. The power supply circuit of this embodiment is configured to apply information of a voltage $V_{LX}$ at an output node 13 to a control circuit 4.

The voltage $V_{LX}$ at the output node 13 is varied according to a state of discontinuous conduction mode (referred to as "state of DCM" hereinafter) and a state of continuous conduction mode (referred to as "state of CCM" hereinafter). Detecting the voltage $V_{LX}$ at the output node 13 at the time of interruption of the slot allocation, namely, at the time of channel switching makes it possible to determine whether the operation is in the state of DCM or CCM. In the state of DCM, the voltage $V_{LX}$ at the output node 13 is higher than the ground potential. In the state of CCM, the voltage $V_{LX}$ at the output node 13 is lower than the ground potential. When the operation is in the state of CCM at the time of channel switching, the channel involved is imposed with heavy load, and hence, a control to increase the number of times of slot allocation to that channel is performed.

Figure 61A:
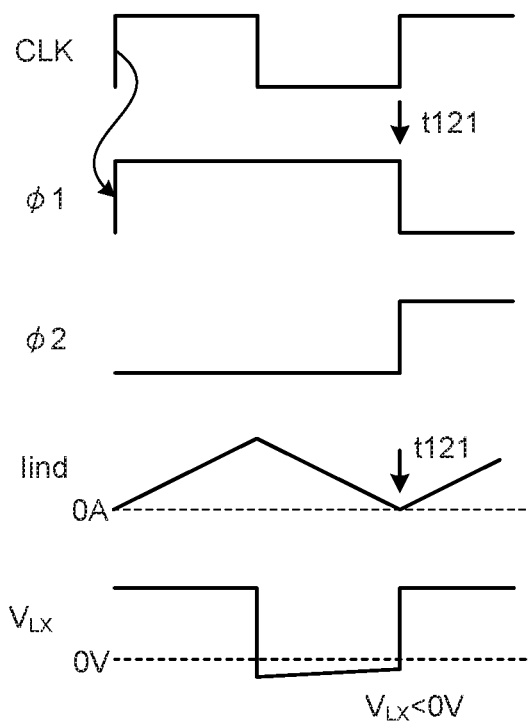
FIGS. 61A and 61B are diagrams illustrating a control method for the power supply circuit according to a fifty-seventh embodiment.
Figure 61B:
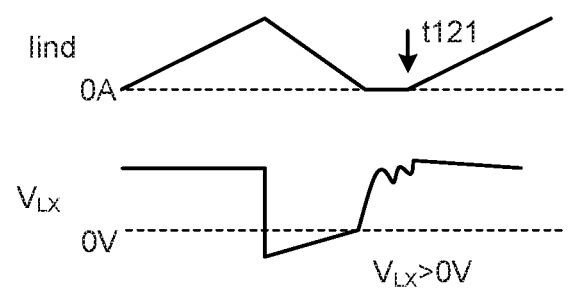

The power supply circuit of this embodiment is configured to apply the information of the voltage $V_{LX}$ at the output node 13 to the control circuit 40. When, as a result of the detection of the voltage $V_{LX}$ at the output node 13 at the time of channel switching, the operation state is determined the state of CCM, a control to increase the number of times of slot allocation to the channel prior to the switching is performed. Increasing the number of times of slot allocation to the channel in the state of CCM permits an amount of charged electricity to be increased, retaining the state of DCM that is advantageous for stable operation. Fifty-Seventh Embodiment FIG. 61A and FIG. 61B are diagrams illustrating a control method for the power supply circuit according to a fifty-seventh embodiment. Slot allocation signals φ1 and φ2 are produced from a clock signal CLK. FIG. 61A illustrates a case of the channels in the state of CCM at the time of channel switching. When the operation is in the state of CCM at the time t121 of channel switching, namely, when inductor current Iind remains in an inductor 16, a voltage $V_{LX}$ at an output node 13 is of negative voltage lower than the ground potential. Meanwhile, in the state of DCM, as illustrated in FIG. 61B, the voltage $V_{LX}$ at the output node 13 is of positive voltage. Thus, information of the voltage $V_{LX}$ at the output node 13 at the time of channel switching is applied to a control circuit 4, and performing a control to increase the number of times of slot allocation for any channel in the state of CCM permits an increase in an amount of charged electricity, retaining the state of DCM that is advantageous for stable operation.

Fifty-Eight Embodiment

Figure 62:
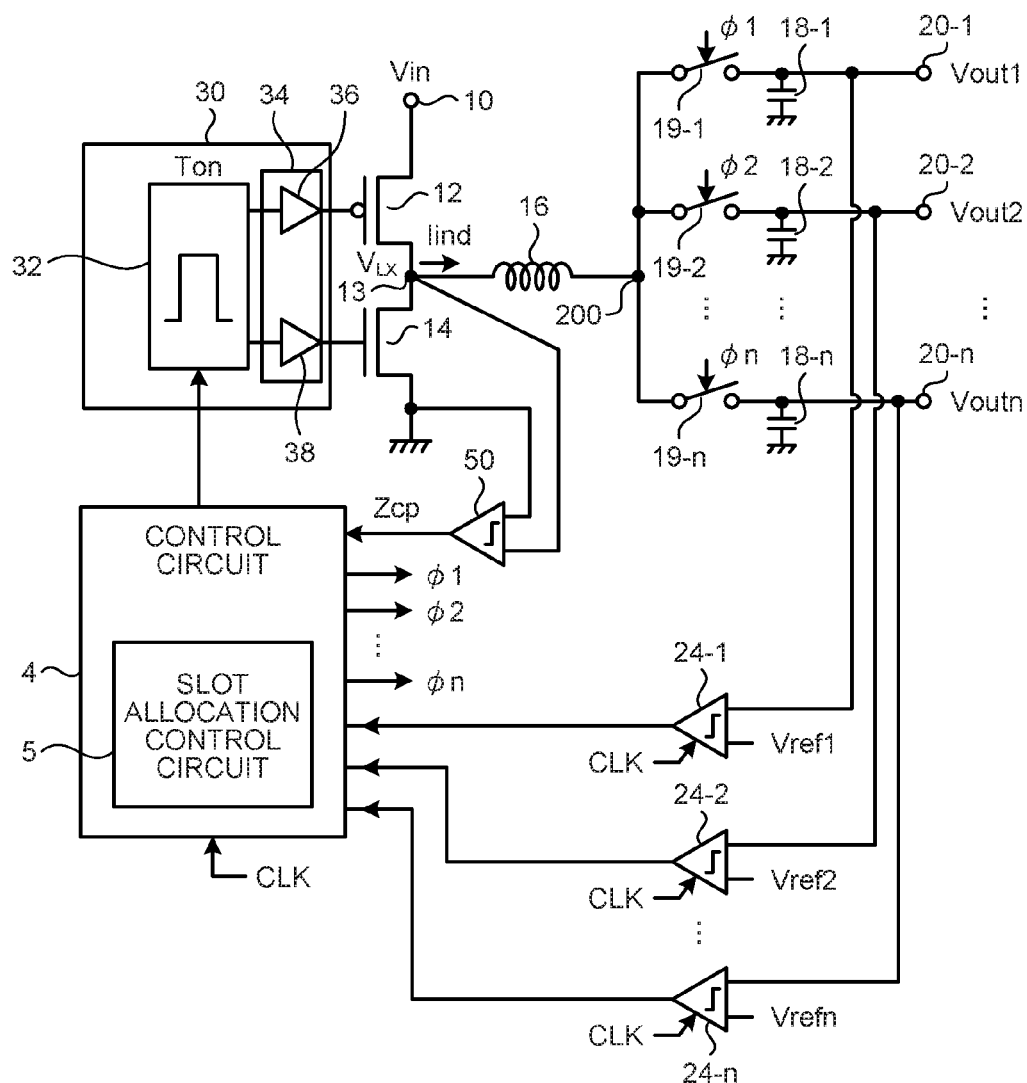
FIG. 62 is a diagram illustrating a configuration of a power supply circuit according to a fifty-eighth embodiment.

FIG. 62 is a diagram illustrating a configuration of a power supply circuit according to a fifty-eighth embodiment. Elements corresponding to those of the aforementioned embodiments are denoted by the same reference symbols. The power supply circuit of this embodiment includes a comparator 50 that compares the voltage $V_{LX}$ at the output node 13 with the ground potential. An output signal Zcp from the comparator 50 is applied to the control circuit 4.

In the power supply circuit of this embodiment, slot allocation to channels is controlled according to results of comparison of the voltage $V_{LX}$ at the output node 13 with ground potential at the time of channel switching. Specifically, as stated above, when the operation at the time of channel switching is in the state of CCM, the voltage $V_{LX}$ at the output node 13 is lower than the ground potential. In this case, for example, the output signal from the comparator 50 is at Low lever. Meanwhile, when it is in the state of DCM at the time of channel switching, the voltage $V_{LX}$ at the output node 13 becomes higher than the ground potential, and, for example, the comparator 50 produces an output signal Zcp at High level. Thus, detecting the output signal Zcp from the comparator 50 permits detection of the state of CCM or DCM at the time of channel switching. When in the state of CCM, increasing the number of times of slot allocation to the channel involved permits an increase in an amount of charged electricity, retaining the state of DCM that is advantageous for stable operation.

The power supply circuit of this embodiment includes the comparator 50 that compares the voltage $V_{LX}$ at the output node 13 with the ground potential and applies its output signal to the control circuit 4. The state of DCM or CCM is determined according to the output signal Zcp from the comparator 50, and when the state of CCM is determined, increasing the number of times of slot allocation to the channel involved permits an increase in an amount of charged electricity, retaining the state of DCM that is advantageous for stable operation.

Fifty-Ninth Embodiment

Figure 63A:
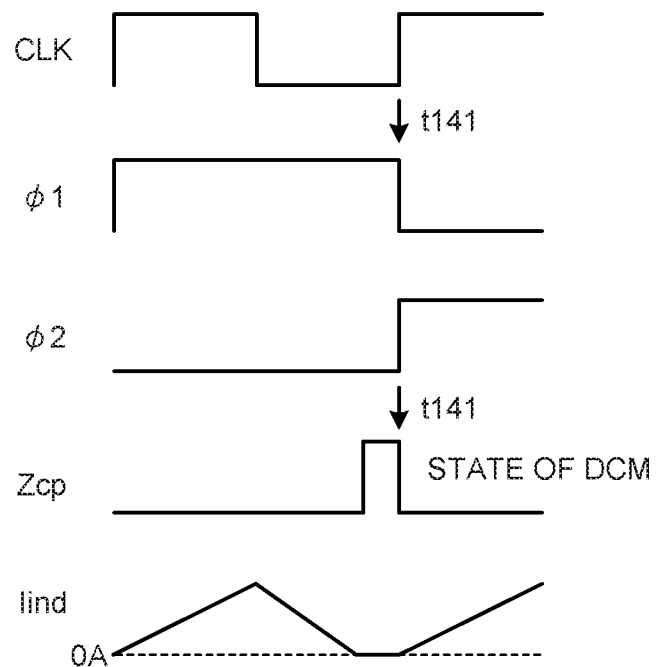
FIGS. 63A and 63B are diagrams illustrating a control method for the power supply circuit according to a fifty-ninth embodiment.
Figure 63B:
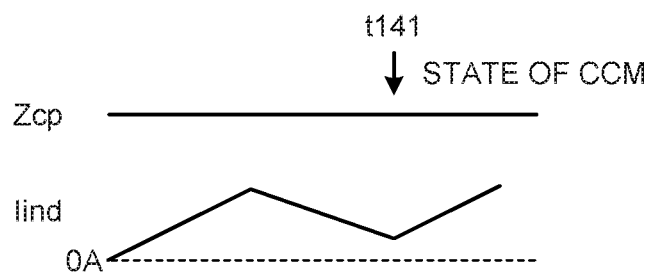

FIG. 63A and FIG. 63B are diagrams illustrating a control method for the power supply circuit according to a fifty-ninth embodiment. Slot allocation signals φ1 and φ2 are produced from a clock signal CLK. An output signal Zcp from a comparator 50 at the time t141 of channel switching is detected. When the operation is in the state of DCM, as illustrated in FIG. 63A, the output signal Zcp from the comparator 50 is at High level. Meanwhile, when the operation is in the state of CCM, a voltage $V_{LX}$ at an output node 13 is lower than the ground potential, and as illustrated in FIG. 63B, the output signal Zcp from the comparator 50 is at Low level. When the state of CCM is determined, a control to increase the number of times of slot allocation to the channel involved is performed. This is for the purpose of increasing an amount of electricity charged in capacitors 18-1 to 18-n to retain the state of DCM.

Sixtieth Embodiment

Figure 64:
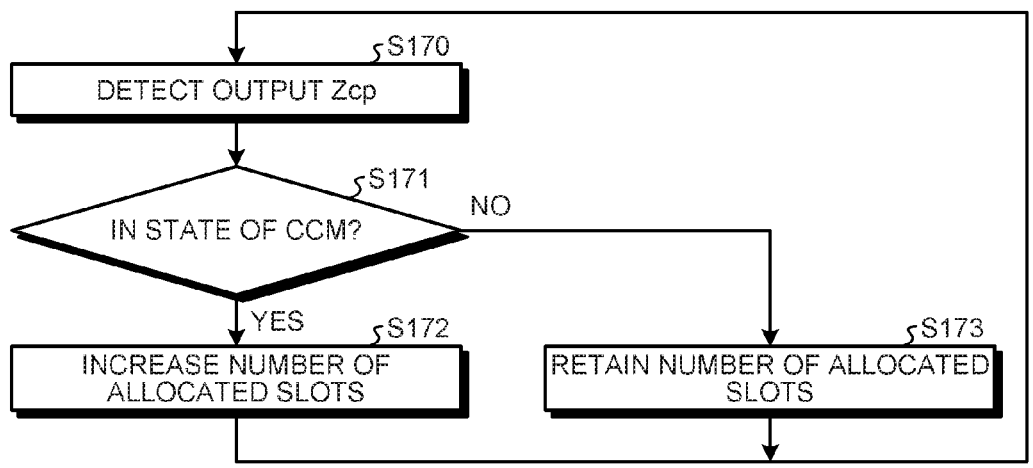
FIG. 64 is a diagram illustrating a control method for the power supply circuit according to a sixtieth embodiment.

FIG. 64 is a diagram illustrating a flow of a control method for the power supply circuit according to a sixtieth embodiment. The output signal Zcp from the comparator 50 at the time of channel switching is detected (S170). It is determined whether the output signal Zcp from the comparator 50 indicates the state of CCM or not (S171). When the output signal Zcp from the comparator 50 indicates the state of CCM, the number of times of slot allocation for the channel involved is increased. When the CCM is not detected, namely, when it is in the state of DCM, the number of times of slot allocation for the channel involved is retained (S173).

In the control method for the power supply circuit according to the embodiment, the state of the operation at the time of channel switching is detected, and in the state of CCM, a control to increase the number of times of slot allocation for the channel involved is performed. In the state of CCM, increasing the number of times of slot allocation for the channel involved and thereby increasing an amount of electric charge accumulated in the capacitors 18-1 to 18-n makes it possible to retain the state of DCM.

Sixty-First Embodiment

Figure 65:
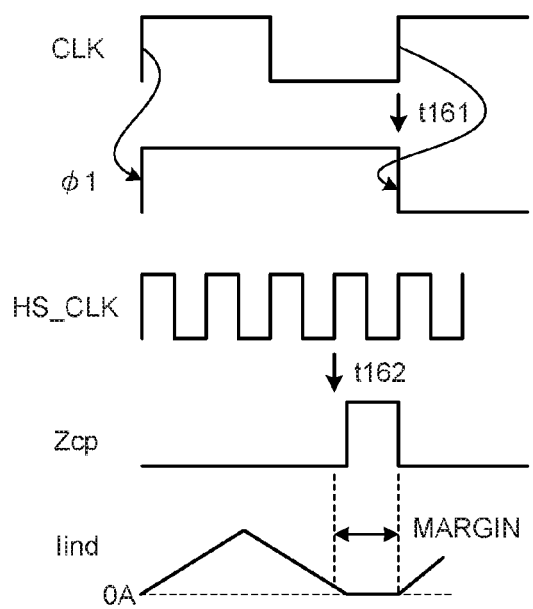
FIG. 65 is a diagram illustrating a control method for the power supply circuit according to a sixty-first embodiment.

FIG. 65 is a diagram illustrating a control method for the power supply circuit according to a sixty-first embodiment. In the control method for the power supply circuit according to the embodiment, an output signal Zcp from a comparator 50 is detected by a high-speed clock signal HS_CLK higher in frequency than the clock signal CLK. The output signal Zcp from the comparator 50 is detected at the time t162 of rise of the high-speed clock signal HS_CLK, and, for example, this is latched on a latch circuit (not illustrated). The signal latched on the latch circuit is detected at the time t161 of channel switching. When it is determined that the latch circuit has not detected the output signal Zcp at High level at the time t161 of channel switching, the state of CCM is determined, and the number of times of slot allocation for the channel involved is increased.

In the control method for the power supply circuit according to this embodiment, the high-speed clock signal CLK is used to detect the state of CCM or DCM at time t162 earlier than the time t161 of channel switching. Specifically, the state of CCM or DCM is determined with a predetermined margin to spare for it. Provided it is actually in the state of DCM at the time t161 of channel switching, failing to detect the output signal Zcp at High level from the comparator 50 in synchronization with the high-speed clock signal HS_CLK is determined the state of CCM, and a control to increase the number of times of slot allocation is performed. Specifically, the state of CCM is detected with a predetermined margin to spare. This is for the purpose of avoiding the state of CCM.

Sixty-Second Embodiment

Figure 66:
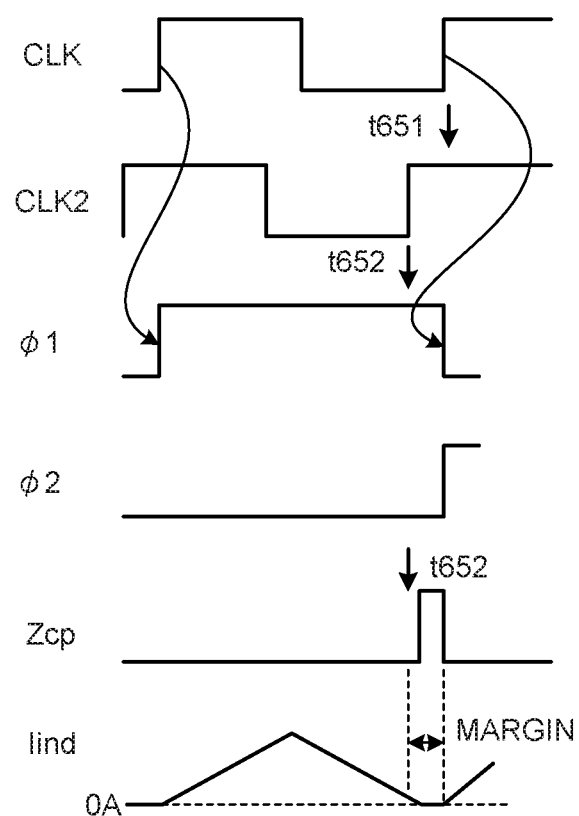
FIG. 66 is a diagram illustrating a control method for the power supply circuit according to a sixty-second embodiment.

FIG. 66 is a diagram illustrating a control method for the power supply circuit according to a sixty-second embodiment. In the control method for the power supply circuit according to the embodiment, slot allocation signals φ1 and φ2 are produced from a clock signal CLK. A second clock signal CLK2, identical in frequency with the clock signal CLK and different in phase from the same, is used. The output signal Zcp from the comparator 50 is detected at the time t652 of rise of the second clock signal CLK2 and latched on a latch circuit (not illustrated). The signal latched on the latch circuit is detected at the time t651 of channel switching. When it is determined that the latch circuit has not detected the output signal Zcp at High level at the time t651 of channel switching, the state of CCM is determined, and the number of times of slot allocation for the channel involved is increased.

In the control method for the power supply circuit according to the embodiment, the state of CCM or DCM is detected at time t652 earlier than the time t651 of channel switching, according to the second clock signal CLK 2 different in phase. Specifically, the state of CCM or DCM is determined with a predetermined margin available for it. Provided it is actually in the state of DCM at the time t651 of channel switching, the state of CCM is determined when the output signal Zcp at High level from the comparator 50 is not detected according to the second clock signal CLK2, and a control to increase the number of times of slot allocation; that is, the state of CCM is determined with the predetermined margin to spare for it. This is for the purpose of avoiding the state of CCM.

Sixty-Third Embodiment

Figure 67:
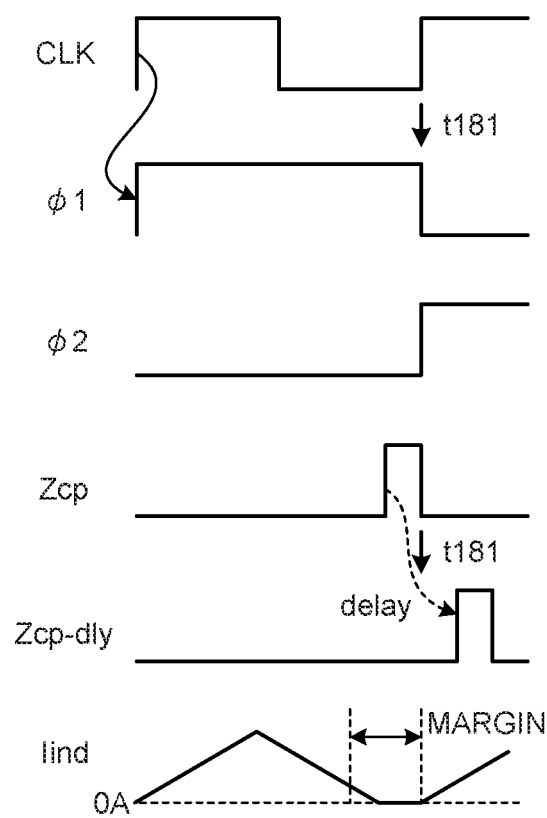
FIG. 67 is a diagram illustrating a control method for the power supply circuit according to a sixty-third embodiment.

FIG. 67 is a diagram illustrating a control method for the power supply circuit according to a sixty-third embodiment. In the control method for the power supply circuit according to this embodiment, at the time t181 of channel switching, a delayed output signal Zcp_dly that is derived by time delay from an output signal Zcp from the comparator 50 is detected. For example, the output signal Zcp from the comparator 50 is delayed by a delay circuit (not illustrated) and produced as the delayed output signal Axp_dly to a control circuit 4. When the delayed output signal Zcp_dly at High level is not detected at the time t181 of channel switching, the state of CCM is determined, and a control to increase the number of times of slot allocation for the channel involved is performed; that is, the state of CCM is determined with a predetermined margin to spare for it. This is for the purpose of avoiding a risk that falling into the state of CCM causes reduction of output voltages Vout to Voutn. The margin may be set as desirable by adjusting delay in the delay circuit by which the output signal Zcp from the comparator 50 is delayed.

In this embodiment, the delayed output signal Zcp_dly derived by time delay from the output signal Zcp from the comparator is detected at the time t181 of channel switching, so as to identify the state of CCM, provided with a predetermined margin to spare for it. When the state of CCM is determined, increasing the number of times of slot allocation for the channel involved permits reduction of the risk of falling into the state of CCM.

Sixty-Fourth Embodiment

Figure 68:
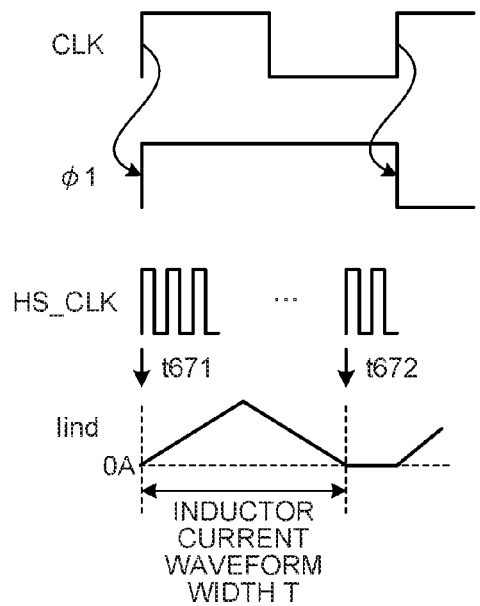
FIG. 68 is a diagram illustrating a control method for the power supply circuit according to a sixty-fourth embodiment.

FIG. 68 is a diagram illustrating a control method for the power supply circuit according to a sixty-fourth embodiment. In the control method for the power supply circuit according to this embodiment, a waveform width of inductor current Iind is detected. When the waveform width of the inductor current Iind is smaller than a predetermined value, the state of DCM is determined. For example, using a high-speed clock signal HS_CK with increased frequency relative to a clock signal CLK, the high-speed cock signal HS_CLK is counted from the time t671 the inductor current Iind rises to the time t672 the inductor current Iind becomes zero, and thereby, a waveform width T of the inductor current Iind is detected. The time t672 the inductor current Iind becomes zero is detectable by detecting an output signal Zcp from a comparator 50 that detects an output voltage $V_{LX}$ at an output node 13.

In the control method for the power supply circuit according to the embodiment, detecting the waveform width of the inductor current Iind and identifying the state, CCM or DCM, permits a control to increase the number of times of slot allocation. For example, at the time of channel switching, when the waveform width of the inductor current Iind exceeds a given threshold, the state of CCM is determined, and a control to increase the number of times of slot allocation for the channel involved is performed. Specifically, a margin available for the identification of the state of CCM is provided, and increasing the number of times of slot allocation for the channel involved when falling into the state of CCM is very likely makes it possible to reduce a risk of falling into the state of CCM.

Sixty-Fifth Embodiment

Figure 69:
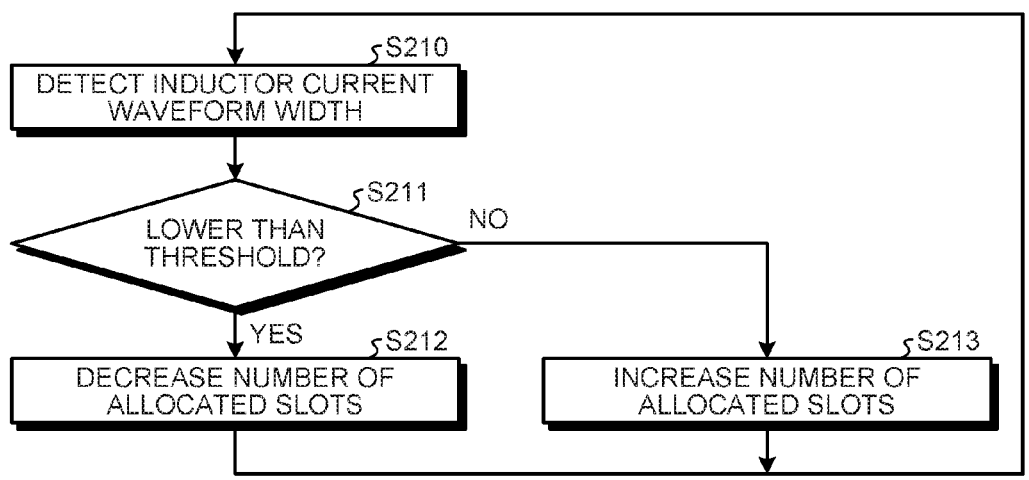
FIG. 69 is a diagram illustrating a control method for the power supply circuit according to a sixty-fifth embodiment.

FIG. 69 is a diagram illustrating a flow of a control method for the power supply circuit according to a sixty-fifth embodiment. A waveform width of inductor current Iind is detected (S210). It is detected whether or not the waveform width of the inductor current Iind is equal to or lower than a predetermined threshold (S211). When the waveform width of the inductor current Iind is equal to the predetermined threshold or lower, the state of DCM is determined, and the number of slots allocated for the channel involved is decreased (S212). When the waveform width of the inductor current Iind is higher than the predetermined threshold, the state of CCM is determined, and the number of allocated slots for that channel is increased (S213). Specifically, setting the predetermined threshold in the identification of the state, CCM or not, permits a margin to spare for the identification. This permits a reduction of a risk that falling into a state of heavy load causes output voltages Vout1 to Voutn to fall.

The threshold may be varied from time to increase the number of allocated slots to time to decrease the same. For example, the threshold at the time to decrease the number of allocated slots may be smaller than it is at the time to increase the same. In the state of DCM where the inductor current Iind is of narrow waveform width, even when decreasing the number of times of slot allocation results in the ON-time Ton being increased to make an amount of electric charge per unit time uniform, determining the threshold so that its level at the time to increase the number of times of slot allocation is not exceeded by the waveform width of the inductor current Iind makes it possible controlling the number of times of slot allocation more appropriately.

Sixty-Sixth Embodiment

Figure 70A:
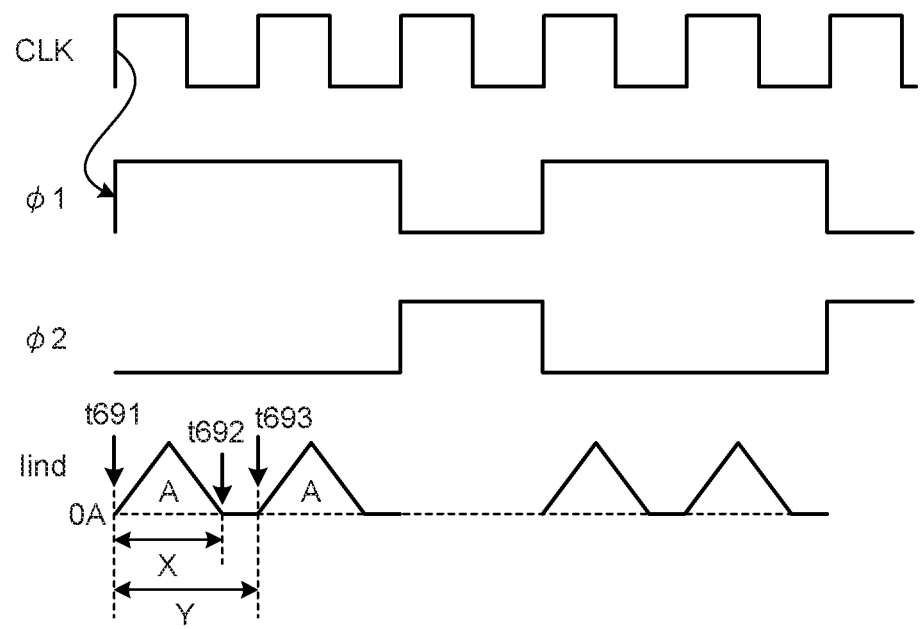
FIGS. 70A and 70B are diagrams illustrating a control method for the power supply circuit according to a sixty-sixth embodiment.
Figure 70B:
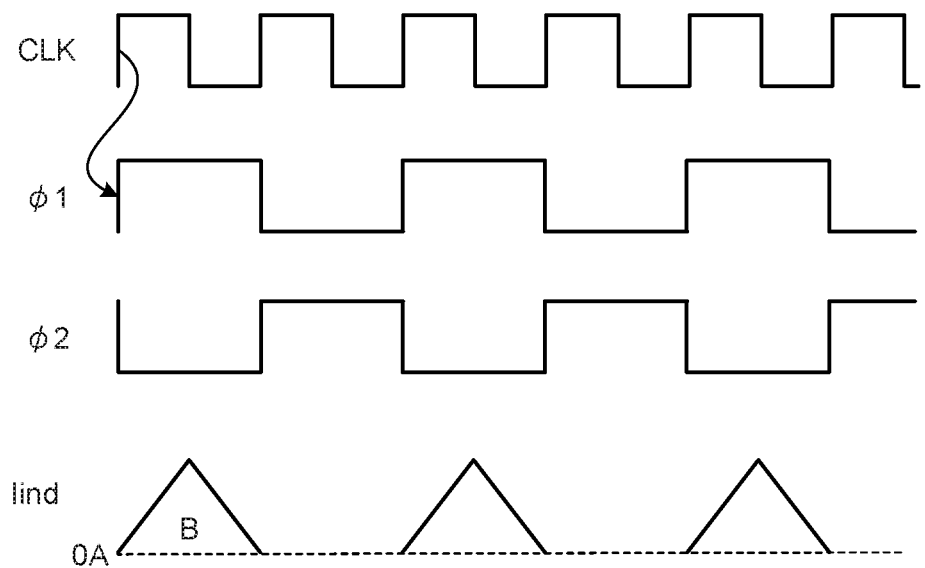

FIGS. 70A and 70B are diagrams illustrating a control method for the power supply circuit according to a sixty-sixth embodiment. Described below is an exemplary implementation of the control method for avoiding a case that, immediately after controlling the number of times of slot allocation, adjusting the number of times of slot allocation again is needed. For convenience of the explanation, the discussion is made in the context of two channels.

FIG. 70A illustrates a case that slot allocation for channels 1 and 2 is on a 2-to-1 frequency basis. A slot allocation signal φ1 illustrated in FIG. 70A corresponds twice of slot allocation, which continues for a doubled allocated time relative to a slot allocation signal φ1 for the channel 2. As to the channel 1, for a period of time during which the slot allocation signal φ1 is applied thereto, a capacitor is charged with inductor current Iind. As to the channel 1, for the period of time during which the slot allocation signal φ1 is applied thereto, the capacitor is charged twice with the inductor current Iind determined with an area A.

FIG. 70B illustrates a case that the slot allocation is varied on a 1-to-1 frequency basis. For the channels 1 and 2, the ratio of the number of allocated slots is varied from 2-to-1 to 1-to-1.

A ratio of the number of allocated slots for the channel 1, after the number of allocated slots is adjusted, to the number of allocated slots before the number of allocated slots is adjusted is reduced to (1/2)/(2/3) times, namely, 3/4 times.

An amount of electric charge per unit time to a capacitor 18-1 of the channel 1 before the number of times of slot allocation is varied, as designated by the area A in FIG. 70A, comes to accord with an amount of electric charge per unit time after the number of times of slot allocation is varied, as designated by an area B in FIG. 70B, and hence, the area B is increased relative to the area A by a multiplicative inverse of the reduced ratio of the numbers of times of slot allocation; that is, the area B is 4/3 times as large as the area A. When the input voltage and the output voltage are constant, the waveform of the inductor current Iind is approximately similar in shape.

The ratio of the area A to the area B equals to a ratio of squared periods of the bases of these mutually similar triangles (regarding to the triangle B, the period of the base refers not to a period Y but to the period of its base in any and all aspect). The area B is to be 4/3 times as large as the area A, and the period of the base of the triangle B is square root of 4/3 times as long as the period of the base of the triangle A. When the period of the base of the triangle B is shorter than the period Y, it is possible to avoid a case that a control to increase the number of times of slot allocation is to be performed due to the identification of the state of CCM immediately after a control to decrease the number of times of slot allocation. Thus, in order to have the triangle B with its base shorter than Y, the ratio of the numbers of times may be reduced from the 2-to-1 frequency ratio to the 1-to-1 frequency ratio when the base X of the triangle A is shorter than the period Y multiplied by a multiplicative inverse of square root of 4/3, namely, by (square root of 3)/2.

In controlling to decrease the number of times of slot allocation, for α that is a value of a square root of the reduced ratio of the number of times of slot allocation to the channel involved, the decrease in the number of times of slot allocation may be timed more than a single-slot period multiplied by α earlier, and then, it is possible to avoid the case that the control to increase the number of times of slot allocation for the channel involved is to be performed again immediately after the control to decrease the number of times of slot allocation. A ratio of the period X to the single slot period Y, namely, a margin may be determined appropriately to a value if smaller than α equal to the square root of the reduced ratio of the number of times of slot allocation. In the aforementioned embodiments where the identification of the state in which the number of times of slot allocation is to be increased with the predetermined margin to spare for it, the state in which the number of times of slot allocation is to be increased may be determined for a period equal to or shorter than the single-slot period Y multiplied by α after subtracting any of the respective margins therefrom, alternative to the bare single-slot period Y).

Sixty-Seventh Embodiment

Figure 71:
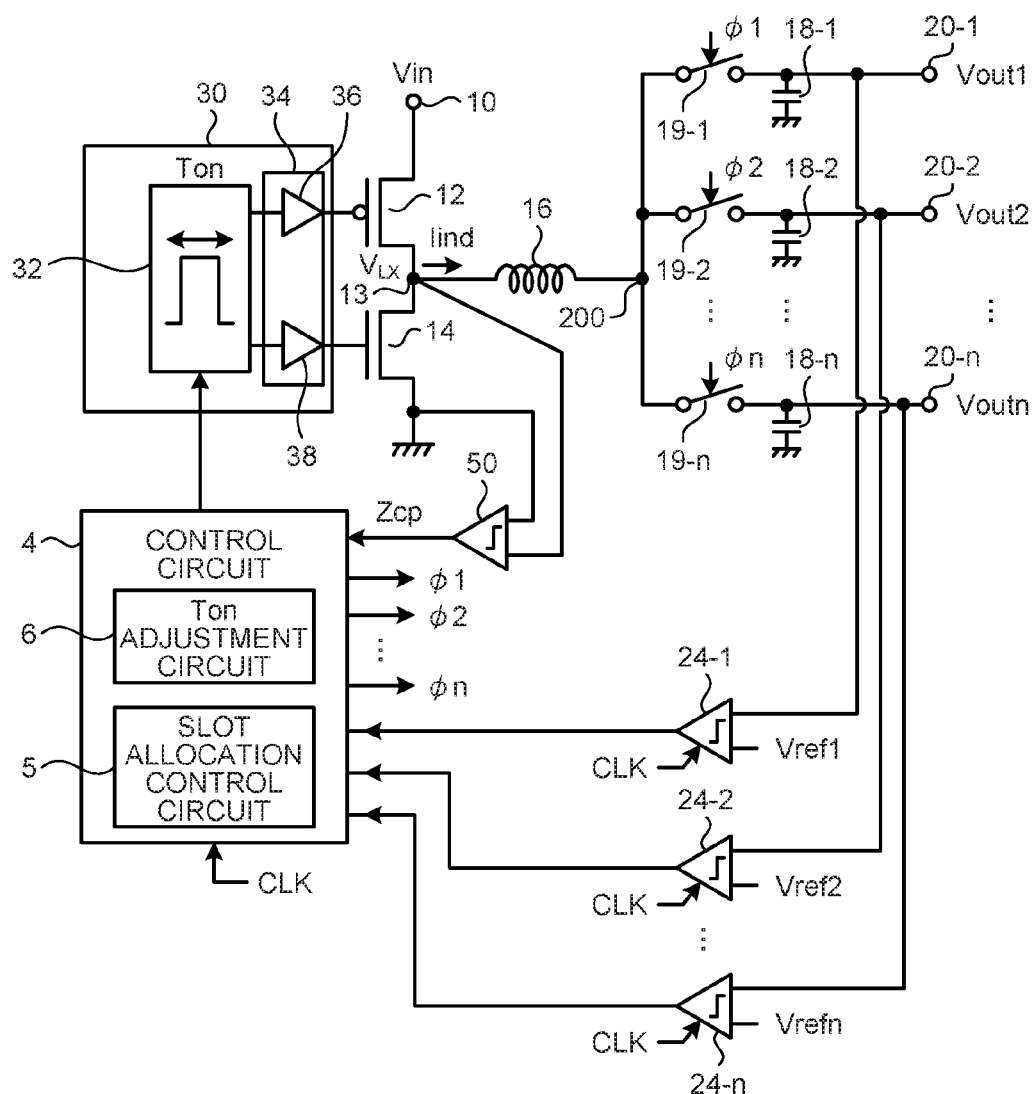
FIG. 71 is a diagram illustrating a configuration of a power supply circuit according to a sixty-seventh embodiment.

FIG. 71 is a diagram illustrating a configuration of a power supply circuit according to a sixty-seventh embodiment. Elements corresponding to those of the aforementioned embodiments are denoted by the same reference symbols. The power supply circuit of this embodiment includes in its control circuit 4 a Ton adjustment circuit 6 that adjust a pulse width of a pulse signal produced from a pulse generation circuit 32. Adjusting the pulse width of the pulse signal generated from the pulse generation circuit 32 permits an ON-time of a PMOs switching transistor 12 to be adjusted. Adjusting the ON-time of the PMOS switching transistor 12 permits a waveform width of inductor current Iind to be adjusted and thereby an amount of electricity capacitors 18-1 to 18-n is charged with to be adjusted, and therefore, output voltages Vout1 to Voutn are adjusted.

In response to a signal from the Ton adjustment circuit 6, the pulse generation circuit 32 generates the pulse signal of a given duration. The pulse width of the pulse signal generated by the pulse generation circuit 32 is controlled according to the signal from the Ton adjustment circuit 6. For example, adjusting the time at which the pulse signal rises and falls permits the duration of the pulse signal at High level to be adjusted. Synchronizing rise of the pulse signal with a clock signal CLK and adjusting the time of fall of the same according to the signal from the Ton adjustment circuit 6 permits the duration of the pulse signal at High level to be adjusted.

For example, the pulse generation circuit 32 is configured to generate the pulse signal that falls a given delay time after it rises. A delay circuit (not shown) that produces the delay time is composed of a predetermined number of stages of inverters, and is adapted to adjust the number of stages of inverters so as to enable adjustment of the time-width during which the pulse signal keeps at High level. Increasing the number of stages in the delay circuit (not illustrated) and prolonging the delay time enables prolongation of the time-width of the pulse signal at High level and thereby enables increase in the ON-time of the high-side PMOS switching transistor 12. Contrarily, decreasing the number of stages of inverters and shortening the delay time enables decrease in the ON-time of the PMOS switching transistor 12. Adjustment of duration of the pulse signal at High level permits the ON-time of the PMOS transistor 12 to be adjusted.

The power supply circuit of this embodiment includes a slot allocation control circuit 5 and besides a Ton adjustment circuit 6 that adjusts the pulse width of the pulse signal to adjust the ON-time of the PMOS switching transistor 12. In addition to controlling the number of times of slot allocation, adjusting the pulse width of the pulse signal permits adjustment of the inductor current Iind, and therefore, an amount of electricity capacitors 18-1 to 18-n is charged with is controlled. In this way, it is possible to provide the power supply circuit capable of controlling output voltages Vout1 to Voutn rapidly according to states of loads.

Sixty-Eighth Embodiment

Figure 72:
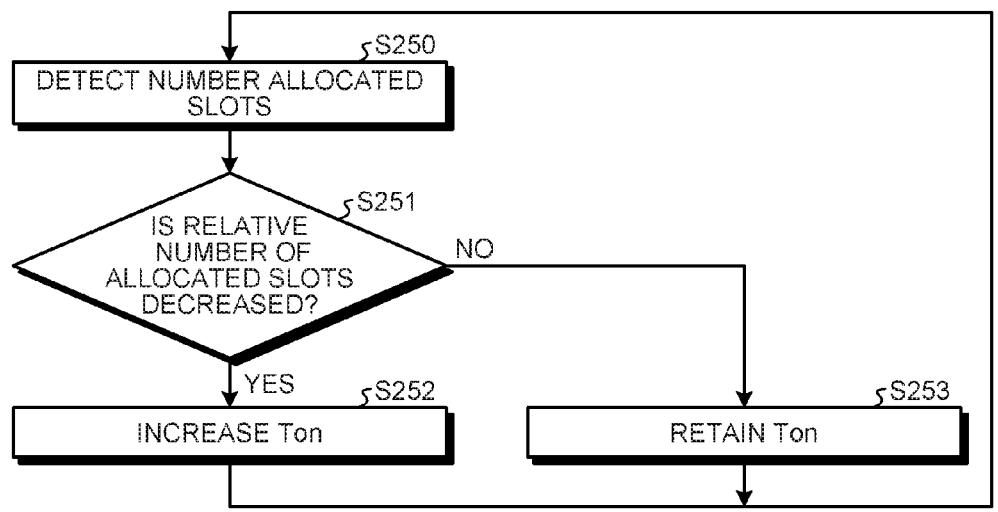
FIG. 72 is a diagram illustrating a control method for the power supply circuit according to a sixty-eighth embodiment.

FIG. 72 is a diagram illustrating a control method for the power supply circuit according to a sixty-eighth embodiment. The current number of allocated slots is detected (S250). With the control method for the power supply circuits according to any of the aforementioned embodiment, it is detected whether or not the number of allocated slots is relatively decreased (S251). As the number of allocated slots for a specific channel is increased, the number of allocated slots for another channel for which the number of allocated slots is not increased is relatively decreased. A control to increase the ON-time is performed on the channel for which the number of allocated slots is relatively decreased (S252). This is for the purpose of avoiding reduction of the output voltages Vout1 to Voutn due to the relative decrease in the number of allocated slots. As to the channel for which the number of allocated slots is not relatively decreased, the current ON-time is retained (S253).

In this embodiment, in addition to the control of slot allocation, the control of the ON-time is conducted. Increasing the ON-time in relation with the channel for which the number of allocated slots is relatively decreased, reduction of the output voltage Vout1 to Voutn is avoided.

Sixty-Ninth Embodiment

Figure 73:
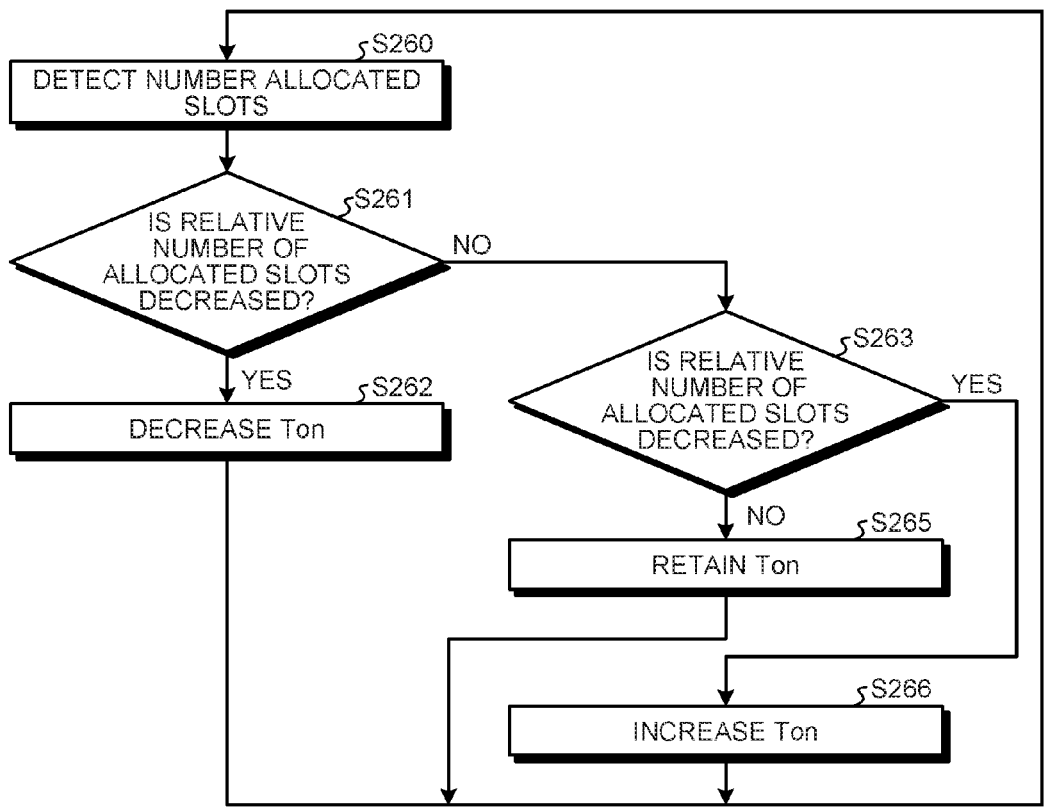
FIG. 73 is a diagram illustrating a control method for the power supply circuit according to a sixty-nine embodiment.

FIG. 73 is a diagram illustrating a control method for the power supply circuit according to a sixty-ninth embodiment. The current number of allocated slots is detected (S260). With the control method for the power supply circuit in any of the aforementioned embodiments, it is detected whether or not the number of allocated slots is relatively increased (S261). As the number of times of slot allocation for a specific channel is decreased, the number of allocated slots for another channel for which the number of allocated slots is not decreased is relatively increased. A control to increase the ON-time is performed on the channel for which the number of allocated slots is relatively decreased (S252). This is for the purpose of avoiding reduction of the output voltages Vout1 to Voutn due to the relative decrease in the number of allocated slots. As to the channel for which the number of allocated slots is not relatively increased, a control to decrease the ON-time is performed (S262). This is for the purpose of retaining a uniform amount of electricity charged per unit time for the channel for which the number of allocated slots is relatively increased. As the number of times of slot allocation for the specific channel is increased, the number of allocated slots is relatively decreased as to the channel for which the number of allocated slots is not increased. It is detected whether or not the number of allocated slots is relatively decreased (S263). As to the channel for which allocated slots are relatively decreased, a control to increase the ON-time is performed (S266). This is for the purpose of avoiding the reduction of the output voltages Vout1 to Voutn due to the relative reduction of the number of allocated slots. As to the channel for which the number of allocated slots is relatively not increased nor decreased, the ON-time adjustment is not performed, and instead, the current ON-time is retained (S265).

In the control method for the power supply circuit according to the embodiment, besides the control of the number of allocated slots, the control of the ON-time is performed. In this way, adjusting the ON-time in relation with the channel for which the number of times of slot allocation is relatively increased or decreased permits variation in the output voltages Vout1 to Voutn to be suppressed.

For example, when the operation is in the state of DCM, the control of the ON-time is achieved by using a square root of a multiplicative inverse of a relatively varied ratio of the number of allocated slots to adjust the ON-time. For example, discussed below is the control in a case that slot allocation for channels 1 and 2 that is on a 1-to-1 frequency basis is varied to be on a 2-to-1 frequency basis as the number of times of slot allocation for the channel 1 is increased. In this case, the ratio of the numbers of allocated slots for the channel 1 is increased from initial 1/2 to 2/3; that is, the ratio of allocated slots for the channel 1 becomes 3/4 times relatively. As increasing the ratio of the numbers of times of slot allocation permits an increase in an amount of electricity a capacitor of the channel involved is charged with, an output voltage from that channel is raised. The amount of electricity charged with the inductor current Iind is in proportion with a square of a period of time during which the inductor current Iind is supplied. Thus, the ON-time in relation with the channel 1, which is relatively increased to 4/3 times as long as the initially allocated slots if expressed with the ratio of the numbers of times of slot allocation, is controlled so as to be multiplied by a multiplicative inverse of a square root of the increased ratio, namely, (square root of 3)/2, and thereby, in the presence of a relative increase in the number of times of slot allocation, the amount of electricity per unit time the channel 1 is retained uniform. In order to avoid a risk that some error causes the ON-time to be shorter than it is required to retain the required output voltage, a control to multiply the relative increase by a factor equal to (square root of 3)/2 or greater and at the same time less than 1 is performed.

As to the channel for which the number of allocated slots is relatively decreased, a control discussed below is performed. For example, in a case that slot allocation for the channels 1 and 2 is changed from a 1-to-1 frequency basis to a 2-to-1 frequency basis by increasing the number of allocated slots for the channel 1, the ratio of the number of allocated slots for the channel 2 is decreased from initial 1/2 to 1/3; that is, the ratio of allocated slots for the channel 2 becomes 2/3 times relatively. As decreasing the ratio of the numbers of times of slot allocation permits a decrease in an amount of electricity a capacitor of the channel involved is charged with, an output voltage from that channel is reduced. Thus, the ON-time in relation with the channel 2, which is relatively decreased to 2/3 times as long as the initially allocated slots if expressed with the ratio of the numbers of times of slot allocation, is controlled so as to be multiplied by a multiplicative inverse of a square root of the decreased ratio, namely, (square root of 3)/(square root of 2), and thereby, it is possible to avoid reduction of the output voltage from that channel due to a relative decrease in the number of times of slot allocation.

Also, for example, in a case that slot allocation for the channels 1 and 2 is changed from a 1-to-2 frequency basis to a 1-to-1 frequency basis by decreasing the number of allocated slots for the channel 2, the ratio of the number of allocated slots for the channel 2 is decreased from initial 2/3 to 1/2; that is, the ratio of allocated slots for the channel 2 becomes 3/4 times relatively. As decreasing the ratio of the number of allocated slots permits a decrease in an amount of electricity the capacitor of the channel involved is charged with, an output voltage from that channel is reduced. Thus, the ON-time in relation with the channel 2, which is relatively decreased to 3/4 times as long as the initially allocated slots if expressed with the ratio of the numbers of times of slot allocation, is controlled so as to be multiplied by a multiplicative inverse of a square root of the decreased ratio, namely, 2/(square root of 3), and thereby, it is possible to avoid reduction of the output voltage from that channel due to a relative decrease in the number of times of slot allocation.

Although the configuration of the power supply circuit with the switching transistors between the input terminal and the inductor, namely, the power supply circuit with a so-called buck DC/DC converter has been described, the power supply circuit may apply to a power supply circuit with a boost DC/DC converter that obtains a plurality of output voltages from a common inductor.

Seventieth Embodiment

Figure 74:
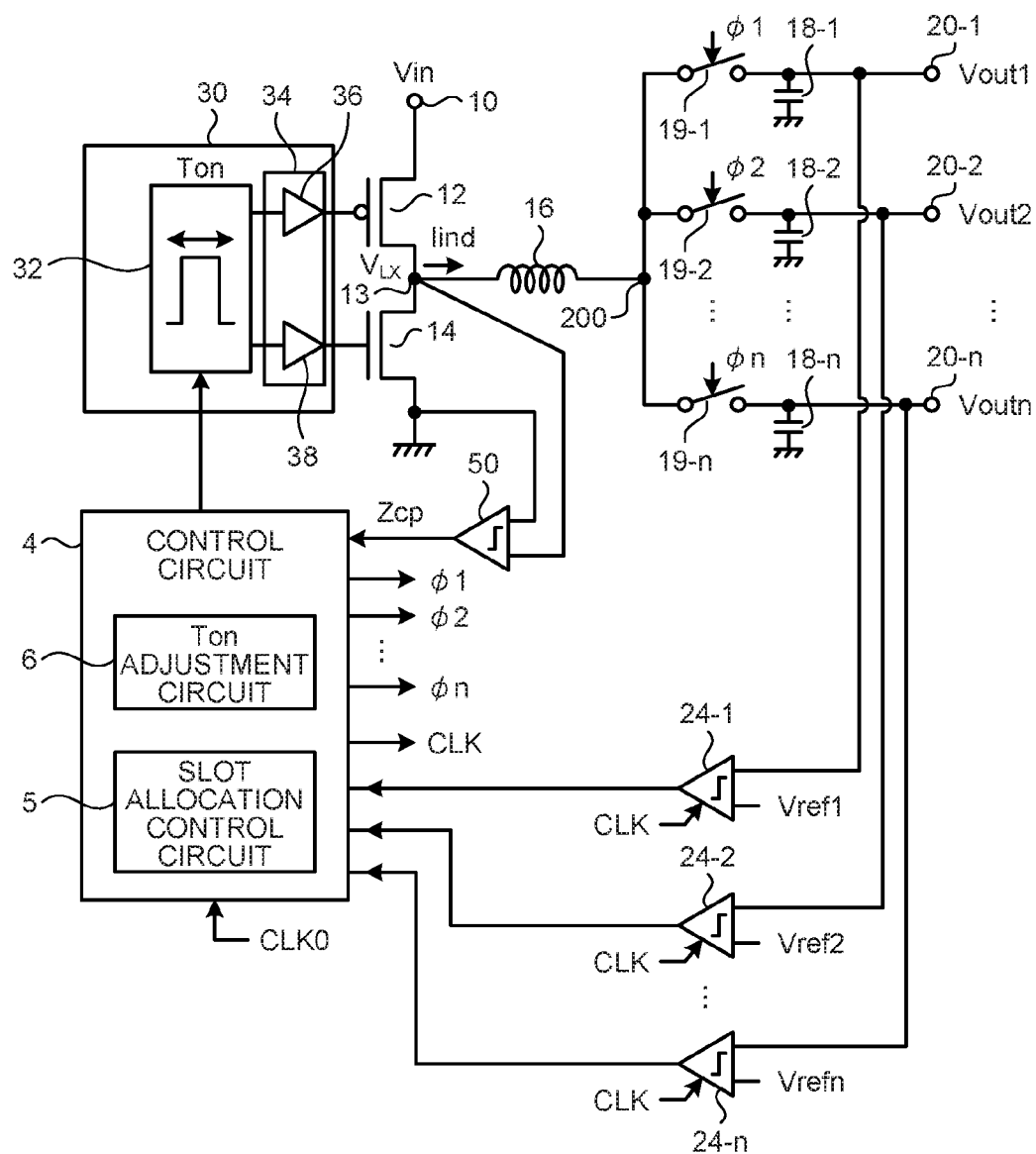
FIG. 74 is a diagram illustrating a configuration of a power supply circuit according to a seventieth embodiment.

FIG. 74 is a diagram illustrating a configuration of the power supply circuit according to a seventieth embodiment. Elements corresponding to those of the aforementioned embodiments are denoted by the same reference symbols. In the power supply circuit of this embodiment, a clock signal CLK0 is applied to a control circuit 4. For example, the clock signal CLK0 is a clock pulse signal of higher speed relative to the aforementioned clock signal CLK. The clock signal CLK0 is counted by a counter (not illustrated) provided in the control circuit 4. A slot allocation control circuit 5 produces slot allocation signals φ1 to φn and an additional clock signal CLK from the clock signal CLK0.

A duration of the slot allocation signals φ1 to φn and an ON-time of a PMOS switching transistor 12 are adjusted according to states of loads. For example, a voltage $V_{LX}$ at an output node 13 is detected by a comparator 50 to identify a state at the time of channel switching, CCM or DCM, and the slot allocation control circuit 5 controls the duration of the slot allocation signals φ1 to φn according to the determined state, so that a Ton adjustment circuit 6 adjusts the ON-time of the PMOS switching transistor 12. When the state of CCM is determined, for example, the duration of the slot allocation signal (φ1 to φn) that is applied in the next cycle to the channel involved is increased to increase a ratio of connection time of an inductor 16 to output terminal 20-1 to 20-n of that channel, and the ON-time of the PMOS switching transistor 12 is increased to increase an amount of electric charge. Increasing the ON-time of the PMOS switching transistor 12 with the slot allocation signal (φ1 to φn) increased in duration makes it possible to increase the amount of electric charge to the channel falling into a state of heavy load with a reduced risk of falling into the state of CCM, and therefore, cross regulation is avoided.

In this embodiment, for example, the duration of any of the slot allocation signals φ1 to φn for any channel of heavy load is increased in simultaneous with prolonging the ON-time of the PMOS switching transistor 12, and thereby, the control to increase electric charge to any channel of heavy load is performed. In this way, compared with a control where after the number of times of slot allocation is increased, the PMOS switching transistor 12 is turned on each time slot allocation is performed, the number of times of switching the PMOS switching transistor 12 is decreased, and accordingly, power consumption in association with the switching of the PMOS switching transistor 12 is suppressed. Also, by increasing the duration of the slot allocation signals φ1 to φn to increase the ON-time of the PMOS switching transistor 12, the risk of falling into the state of CCM can be reduced and the amount of electric charge to the channel of heavy load can be increased.

Seventy-First Embodiment

Figure 75:
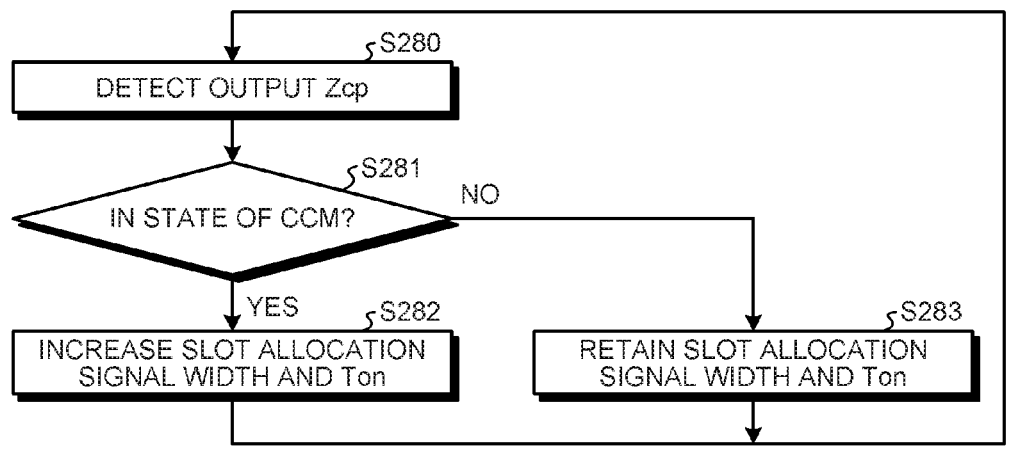
FIG. 75 is a diagram illustrating a control method for the power supply circuit according to a seventy-first embodiment.

FIG. 75 is a diagram illustrating a flow of a control method for the power supply circuit according to a seventy-first embodiment. The control method of this embodiment is implemented in the power supply circuit of the aforementioned seventy-forth embodiment. In the control method of this embodiment, the control of the duration of the slot allocation signals φ1 to φn and the control of the ON-time of the PMOS switching transistor 12 are performed. An output signal Zcp from the comparator 50 is detected at the time of channel switching (S280). It is detected whether or not the output signal Zcp from the comparator 50 identifies the state of CCM (S281). When the output signal Zcp from the comparator 50 identifies the state of CCM, the duration of the slot allocation signal (φ1 to φn) next applied to the channel involved is increased, and the ON-time of the PMOS switching transistor 12 is increased (S282). When the state of CCM is not determined, namely, the state of DCM is determined, the duration of the slot allocation signal (φ1 to φn) next applied to the channel involved and the ON-time of the PMOS switching transistor 12 are retained (S283).

In the control method for the power supply circuit according to this embodiment, a state of the operation at the time of channel switching is detected, and when the state of CCM is determined, the control to increase the duration of the slot allocation signal (φ1 to φn) next applied to the channel involved and increase the ON-time of the PMOS switching transistor 12 is performed. In this way, the amount of electricity charged with the capacitor (18-1 to 18-n) of that channel is increased. For any of the loads in the state of CCM, the control to increase the duration of the slot allocation signal (φ1 to φn) and increase the ON-time of the PMOS switching transistor 12 is performed, and thereby, the amount of electric charge to the channel of heavy load is increased with a reduced risk of falling into the state of CCM.

In the control method of this embodiment, although the states of the loads are detected by detecting the voltage $V_{LX}$ at the output node 13, the states of the loads may be detected by any of the control methods of the aforementioned variety of embodiments. For example, the control method may be adapted to detect the states of the loads by using feedback comparators 24-1 to 24-n to compare the output voltages Vout1 to Voutn at the output terminals 20-1 to 20-n respectively with the reference voltages Vref1 to Vrefn. As mentioned above, the states of the loads may be detected according to an extent of reduction of the output voltages Vout1 to Voutn or according to whether pulse skip exits or not. Alternative to increasing the number of times of slot allocation as in the control method according to any of the aforementioned embodiments, the control to increase the duration of the slot allocation signal φ1 to φn and increase the ON-time of the PMOS switching transistor 12 as in this embodiment may be performed.

Seventy-Second Embodiment

Figure 76:
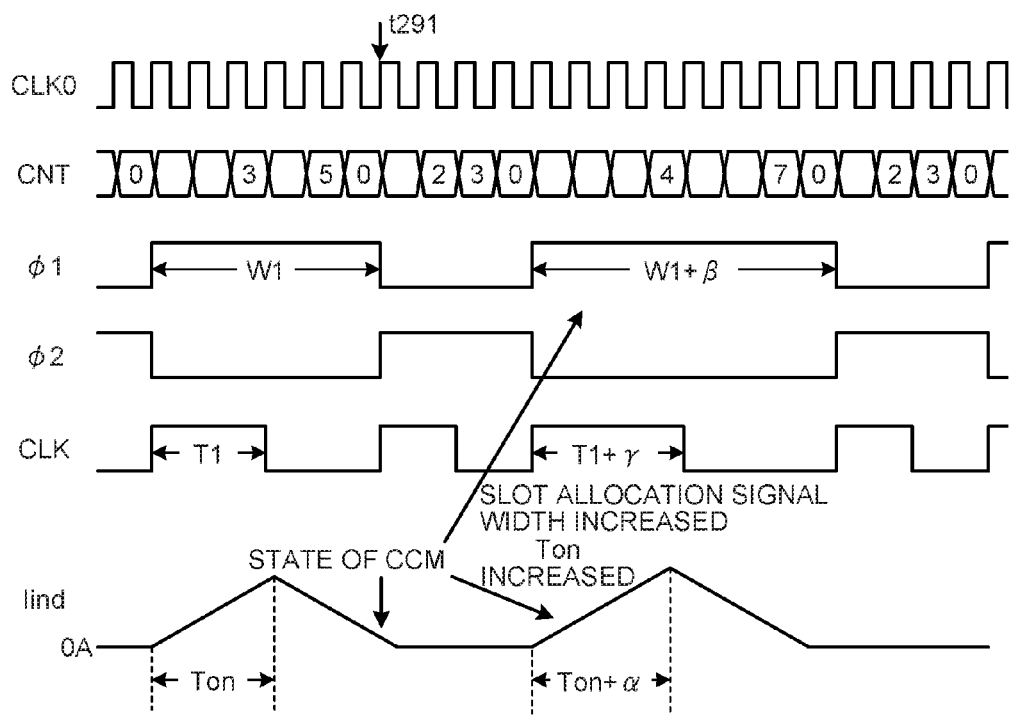
FIG. 76 is a diagram illustrating a control method for the power supply circuit according to a seventy-second embodiment.

FIG. 76 is a diagram illustrating a control method for the power supply circuit according to a seventy-second embodiment. Production of the slot allocation signals φ1 and φ2 and an example of a method of producing a clock signal are illustrated. The control method of this embodiment is implemented in the power supply circuit of the aforementioned embodiment in FIG. 74. For convenience, the control method will be discussed in the context of two channels, namely, by giving an example where the two slot allocation signals φ1 and φ2 are produced. The slot allocation signal φ1 is applied to the switch 19-1, and when it is at High level, a second end 200 of the inductor 16 and the output terminal 20-1 are connected. Similarly, the slot allocation signal φ2 is applied to the switch 19-2, and when it is at High level, the second end 200 of the inductor 16 and the output terminal 20-2 are connected. Adjusting durations for which the slot allocation signals φ1 and φ2 keep at High level permits a ratio of connection time of the inductor 16 to the output terminals 20-1 and 20-n to be adjusted.

The clock signal CLK0 is counted by the counter (not illustrated). At the time of counter number CNT of "0", the slot allocation signal φ1 is turned to High. For example, at the time the counter number CNT in the counter reaches a given number, if the slot allocation signal φ1 for the channel involved is at High level, the slot allocation signal φ1 falls. The given number set in advance in the counter may be varied according to a state of a load. Varying the given number set in the counter permits a width for which the slot allocation signal φ1 keeps at High level, namely, a duration to be varied. In simultaneous with the slot allocation signal φ1 falling, the counter resets its count number to "0". At this time, the slot allocation signal φ2 rises to High level.

A state of inductor current Iind at the time t291 the slot allocation signal φ falls is detected. For convenience, FIG. 76 illustrates only the inductor current Iind flowing in the channel 1. As mentioned above, because a voltage $V_{LX}$ at an output node 13 is varied according to the state of the inductor current Iind, detecting the output signal Zcp from the comparator 50 permits detection of the state, CCM or DCM. When the CCM is determined, a duration for which the slot allocation signal φ1 in the next cycle keeps at High level is increased to prolong a duration of slot allocation for the channel 1 connected to the output terminal 20-1. For example, the width for which the slot allocation signal φ1 keeps at High level in the next cycle is increased from W1 to W1 plus beta (W1+β). Simultaneously, a control to increase the ON-time of the PMOS switching transistor 12 is performed, and the ON-time of the PMOS switching transistor 12 in the next cycle is increased from Ton to Ton plus alpha (Ton+α). In this way, an amount of electric charge to the channel 1 in the state of CCM is increased. Also, since the duration of the slot allocation signal φ1 is increased, and besides, the ON-time of the PMOS switching transistor 12 is increased, it is possible to increase the amount of electric charge to the channel 1 with a reduced risk of falling into the state of CCM. A control to increase the given number set in the counter according to the output signal Zcp is performed, for example, in the state of CCM, and thereby, the duration for which the slot allocation signal φ1 keeps at High level is increased.

Adjustment of the duration of the clock signal CLK is also performed. For example, relative to a duration W1 during which the slot allocation signal φ1 keeps at High level, the duration during which the clock signal CLK keeps at High level is 1/2 under control. For example, turning the clock signal CLK to High level when the counter number in the counter is "0", and letting the clock signal fall when the counter number in the counter is 1/2 of the given number set in advance in the counter, it is possible to adjust the duration for which the clock signal CLK keeps at High level to 1/2 of the duration of the slot allocation signal φ1. For example, the duration during which the clock signal CLK keeps at High level is increased from T1 to T1 plus gamma (T1+γ). Adjusting the duration of the clock signal CLK according to the slot allocation signals φ1 and φ2, for example, permits the time at which comparators 24-1 and 24-2 detecting the output voltages Vout1 and Vout2 operate to accord with the time at which the channels switch.

In accordance with this embodiment, in producing the slot allocation signals φ1 and φ2 and the clock signal CLK that have different durations, they are adjusted according to states of loads by using the clock signal CLK. Appropriately setting the given number in the counter permits the slot allocation signals φ1 and φ2 and the clock signal CLK to be produced according to the number of channels.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply circuit comprising:
   an input terminal to which an input voltage is applied;
   an output node;
   a switching transistor that is connected between the input terminal and the output node;
   an inductor whose one end is connected to the output node;
   a first output terminal that is connected to another end of the inductor;
   a capacitor that is connected to the first output terminal, the capacitor being charged with current flowing in the inductor; and a control circuit that includes at least one of a first detection circuit configured to detect a first detection signal according to a state of the current flowing in the inductor and a second detection circuit configured to detect a second detection signal according to a result of comparison of a voltage at the first output terminal with a first reference voltage, the control circuit controlling an ON-time during which the switching transistor is turned on according to the first or second detection signal, wherein the control circuit controls to decrease the ON-time when the first detection circuit detects that the first detection signal indicates that the current flowing in the inductor is flowing from the output node to the other end at a time of detecting of the first detection signal, and the control circuit controls to decrease the ON-time when the second detection circuit detects that the second detection signal indicates that the voltage at the first output terminal is higher than the first reference voltage at a time of detecting of the second detection signal.

2. The power supply circuit according to claim 1, further comprising a plurality of the output terminals and a plurality of the capacitors, the output terminals being connected respectively with the capacitors and connected time-divisionally to the other end of the inductor.

3. The power supply circuit according to claim 1, further comprising a first comparison circuit that compares a voltage at the output node with a predetermined reference voltage and outputs the first detection signal.

4. The power supply circuit according to claim 1, further comprising a second comparison circuit that compares the voltage at the first output terminal with a second reference voltage different from the first reference voltage and supplies an output signal according a result of comparison to the second detection circuit.

5. The power supply circuit according to claim 1, wherein
the control circuit includes both the first and second detection circuits, and
the power supply circuit further comprises a mode control circuit that applies to the control circuit a mode switching signal that selectively enables one of the first and second detection circuits to operate.

6. The power supply circuit according to claim 1, wherein the second detection circuit includes a comparator circuit which compares the voltage at the first output terminal with the first reference voltage in synchronization with a predetermined clock signal so as to operate only for a period of time for which the clock signal is at high level.

7. A control method for a power supply circuit that is adapted to turn on a switching transistor connected between an input terminal to which an input voltage is applied and an output node and supply current via an inductor to a capacitor, so as to obtain an output voltage from a first output terminal connected to the capacitor, the control method comprising:

adjusting an ON-time during which the switching transistor is turned on, according to a state of current flowing in the inductor or a state of the output voltage, wherein
the ON-time is adjusted to decrease when the current flowing in the inductor is flowing from the output node to the capacitor at a time of detecting of the current, and
the ON-time is adjusted to decrease when the output voltage is higher than a reference voltage at a time of detecting of the output voltage.

8. The control method for the power supply circuit according to claim 7, further comprising:

detecting the state of the current flowing in the inductor or the state of the output voltage at a time immediately before the switching transistor is turned on.

9. The control method for the power supply circuit according to claim 8, wherein
the detecting the state of the current flowing in the inductor includes comparing a voltage at the output node with a predetermined reference potential, and
the adjusting the ON-time includes decreasing the ON-time of the switching transistor when the voltage at the output node is lower than the predetermined reference potential in the detecting the state of the current flowing in the inductor.

10. The control method for the power supply circuit according to claim 7, further comprising:
detecting the state of the current flowing in the inductor or the state of the output voltage at a time at which a predetermined time has elapsed after the switching transistor is turned on.

11. The control method for the power supply circuit according to claim 10, wherein the predetermined time is a time from turning on the switching transistor to turning on the switching transistor next time.

12. The control method for the power supply circuit according to claim 7, wherein
the power supply circuit includes a second output terminal,
the control method for the power supply circuit further comprises:
connecting the first and second output terminals with the inductor in a time-division manner; and
detecting the state of the current flowing in the inductor at a time different from a time at which an output terminal to be connected to the inductor is switched between the first and second output terminals.

13. The control method for the power supply circuit according to claim 12, wherein the detecting the state of the current flowing in the inductor is performed in advance of the time at which switching of connection between the inductor and the first and second output terminals is performed.

14. The control method for the power supply circuit according to claim 7, further comprising:
comparing the output voltage with a predetermined reference voltage in synchronization with a predetermined clock signal to output a detection signal; and
decreasing the ON-time of the switching transistor when the detection signal that indicates that the output voltage is higher than the predetermined reference voltage is detected.

15. The control method for the power supply circuit according to claim 7, further comprising:
comparing the output voltage with a predetermined reference voltage in synchronization with a predetermined clock signal to output a detection signal; and
decreasing the ON-time of the switching transistor when the detection signal that indicates that the output voltage is higher than the predetermined reference voltage is detected continuously.

16. The control method for the power supply circuit according to claim 7, wherein
the power supply circuit includes:
a second output terminal;
a first switch provided between the first output terminal and the inductor; and
a second switch provided between the second output terminal and the inductor, the control method for the power supply circuit further comprises:
generating a predetermined clock signal;
generating a slot allocation signal having a duration that corresponds to one period of the clock signal; and
selectively supplying the slot allocation signal to the first and second switches to switchably connect the first and second output terminals with the inductor in response to the slot allocation signal.

* * * * *